US012784393B1

(12) United States Patent
Curro

(10) Patent No.: US 12,784,393 B1
(45) Date of Patent: Nov. 3, 2026

(54) TECHNIQUES FOR ENHANCED IMAGE CAPTURE USING A COMPUTER-VISION NETWORK

(71) Applicant: Hover Inc., San Francisco, CA (US)

(72) Inventor: Domenico Curro, San Francisco, CA (US)

(73) Assignee: Hover Inc., San Francisco, CA (US)

( * ) Notice: Subject to any disclaimer, the term of this patent is extended or adjusted under 35 U.S.C. 154(b) by 229 days.

(21) Appl. No.: 18/819,949

(22) Filed: Aug. 29, 2024

Related U.S. Application Data

(63) Continuation of application No. 18/495,336, filed on Oct. 26, 2023, now abandoned, which is a continuation of application No. 17/163,105, filed on Jan. 29, 2021, now abandoned.

(60) Provisional application No. 63/140,716, filed on Jan. 22, 2021, provisional application No. 63/059,093, filed on Jul. 30, 2020, provisional application No.
(Continued)

(51) Int. Cl.

| | |
|---|---|
| ***G06K 9/00*** | (2022.01) |
| ***G06F 18/2113*** | (2023.01) |
| ***G06F 18/214*** | (2023.01) |
| ***G06F 18/24*** | (2023.01) |
| ***G06N 5/04*** | (2023.01) |

(Continued)

(52) U.S. Cl.
CPC ........ *G06V 10/255* (2022.01); *G06F 18/2113* (2023.01); *G06F 18/2148* (2023.01); *G06F 18/24* (2023.01); *G06N 5/04* (2013.01); *G06N 20/00* (2019.01)

(58) Field of Classification Search
CPC ......... G06V 10/255; G06N 5/04; G06N 20/00
See application file for complete search history.

(56) References Cited

U.S. PATENT DOCUMENTS 9,159,164 B2 10/2015 Ciarcia
9,531,957 B1 12/2016 George et al.
(Continued)

FOREIGN PATENT DOCUMENTS

EP 1981268 B1 * 1/2017 .......... H04N 5/2723

OTHER PUBLICATIONS

Building Segmentation From Airborne VHR Images Using Mask R-CNN, K. Zhou et al., ISPRS, 2019, pp. 155-161 (Year: 2019).*
(Continued)

*Primary Examiner* — Jayesh A Patel
(74) *Attorney, Agent, or Firm* — Kilpatrick Townsend & Stockton LLP

(57) ABSTRACT

Disclosed are techniques for enhancing two-dimensional (2D) image capture of subjects (e.g., a physical structure, such as a residential building) to maximize the feature correspondences available for three-dimensional (3D) model reconstruction. More specifically, disclosed is a computer-vision network configured to provide viewfinder interfaces and analyses to guide the improved capture of an intended subject for specified purposes. Additionally, the computer-vision network can be configured to generate a metric representing a quality of feature correspondences between images of a complete set of images used for reconstructing a 3D model of a physical structure. The computer-vision network can also be configured to generate feedback at or before image capture time to guide improvements to the quality of feature correspondences between a pair of images.

20 Claims, 67 Drawing Sheets

Related U.S. Application Data

63/014,248, filed on Apr. 23, 2020, provisional application No. 62/968,977, filed on Jan. 31, 2020.

(51) Int. Cl.

| | |
|---|---|
| ***G06N 20/00*** | (2019.01) |
| ***G06V 10/20*** | (2022.01) |

(56) References Cited

U.S. PATENT DOCUMENTS

| | | | | |
|---|---|---|---|---|
| 9,716,826 | B2 | 7/2017 | Wu et al. | |
| 9,721,177 | B2 | 8/2017 | Lee et al. | |
| 9,826,145 | B2 | 11/2017 | Malgimani et al. | |
| 10,038,838 | B2 | 7/2018 | Castillo et al. | |
| 10,382,673 | B2 | 8/2019 | Upendran et al. | |
| 11,200,429 | B1 * | 12/2021 | Evans | G01S 17/58 |
| 2008/0089577 | A1 | 4/2008 | Wang | |
| 2011/0157406 | A1 * | 6/2011 | Tauchi | H04N 23/635 348/222.1 |
| 2011/0285874 | A1 | 11/2011 | Showering et al. | |
| 2012/0105647 | A1 | 5/2012 | Yoshizumi | |
| 2013/0129156 | A1 | 5/2013 | Wang et al. | |
| 2017/0094184 | A1 | 3/2017 | Gao et al. | |
| 2017/0208245 | A1 | 7/2017 | Castillo et al. | |
| 2017/0310884 | A1 | 10/2017 | Li | |
| 2018/0198976 | A1 | 7/2018 | Upendran et al. | |
| 2018/0198978 | A1 | 7/2018 | Cho et al. | |
| 2018/0220066 | A1 | 8/2018 | Kitamura | |
| 2018/0300855 | A1 | 10/2018 | Tang et al. | |
| 2019/0174056 | A1 | 6/2019 | Jung et al. | |
| 2019/0236394 | A1 | 8/2019 | Price et al. | |
| 2019/0311202 | A1 | 10/2019 | Lee et al. | |
| 2019/0385026 | A1 | 12/2019 | Richeimer et al. | |
| 2020/0202533 | A1 | 6/2020 | Cohen et al. | |
| 2021/0004648 | A1 | 1/2021 | Ghosh et al. | |
| 2021/0097691 | A1 * | 4/2021 | Liu | G06N 3/02 |
| 2021/0174116 | A1 * | 6/2021 | Yang | G06F 18/22 |

OTHER PUBLICATIONS

Accurate Object Localization with Shape Masks, Marcin Marszałek et al., IEEE, 2007, pp. 1-8 (Year: 2007).*

Accurate Object Recognition with Shape Masks, Marcin Marszałek et al., IJCV, 2012, pp. 191-209 (Year: 2012).*

From contours to ground truth: How to evaluate edge detectors by filtering, Hasan Abdulrahman et al., HAL, 2018, pp. 1-11 ( Year: 2018).*

Automatic Building Segmentation—Convolutional Networks, Guangming Wu et al., MDPI, 2018, pp. 1-18 (Year: 2018).*

U.S. Appl. No. 17/163,043, "Final Office Action", Apr. 22, 2024, 21 pages.

U.S. Appl. No. 17/163,043, "Non-Final Office Action", Aug. 4, 2023, 16 pages.

U.S. Appl. No. 17/163,105, "Notice of Allowance", Jul. 26, 2023, 10 pages.

U.S. Appl. No. 18/495,336, "Notice of Allowance", May 30, 2024, 11 pages.

Bischke, et al., "Multi-Task Learning for Segmentation of Building Footprints with Deep Neural Networks", Institute of Electrical and Electronics Engineers, Sep. 2019, pp. 1480-1484.

Brostow, et al., "Semantic Object Classes in Video: A High-Definition Ground Truth Database", Pattern Recognition Letters, vol. 30, No. 2, Jan. 15, 2009, pp. 88-97.

CA3163137, "Office Action", Aug. 8, 2023, 4 pages.

CA3163137, "Office Action", May 15, 2024, 4 pages.

EP21708442.5, "Intention to Grant", Mar. 13, 2024, 9 pages.

Hegarty, et al., "SAMATS—Triangle Grouping and Structure Recovery for 3D Building Modeling and Visualization", Technological University Dublin, Digital Media Centre, Jan. 12, 2005, 15 pages.

Huang, et al., "Building Extraction from Multi-Source Remote Sensing Images Via Deep Deconvolution Neural Networks", Institute of Electrical and Electronics Engineers, Jul. 2016, pp. 1835-1838.

Kisantal, et al., "Augmentation for Small Object Detection", Available Online at: https://arxiv.org/pdf/1902.07296.pdf, Feb. 19, 2019, pp. 1-15.

PCT/US2021/015850, "International Preliminary Report on Patentability", Aug. 11, 2022, 16 pages.

PCT/US2021/015850, "International Search Report and Written Opinion", Jul. 12, 2021, 21 pages.

PCT/US2021/015850, "Invitation to Pay Additional Fees and, Where Applicable, Protest Fee", May 19, 2021, 5 pages.

Tarantino, et al., "Extracting Buildings from True Color Stereo Aerial Images Using a Decision Making Strategy", Remote Sensing, vol. 3, Issue 8, Jul. 25, 2011, pp. 1553-1567.

Wen, et al., "Automatic Building Extraction from Google Earth Images under Complex Backgrounds Based on Deep Instance Segmentation Network", Sensors, vol. 19, No. 2, Jan. 15, 2019, pp. 1-16.

Wirtz, et al., "Semiautomatic Generation of Semantic Building Models From Image Series", Proceedings of SPIE-The International Society for Optical Engineering, Feb. 2011, 8 pages.

Wu, et al., "Automatic Building Segmentation of Aerial Imagery using Multi-Constraint Fully Convolutional Networks", MDPI, Remote Sens., vol. 10, No. 3, Mar. 6, 2018, pp. 1-18.

Zhou, et al., "Building Segmentation from Airborne Vhr Images using Mask R-Cnn", International Society for Photogrammetry and Remote Sensing, Jun. 2019, pp. 155-161.

U.S. Appl. No. 17/163,043, "Non-Final Office Action", Jan. 13, 2025, 33 pages.

Badrinarayanan, et al., "SegNet: A Deep Convolutional Encoder-Decoder Architecture for Image Segmentation", Institute of Electrical and Electronics Engineers Transactions on Pattern Analysis and Machine Intelligence, vol. 39, No. 12, Jan. 1, 2017, pp. 2481-2495.

EP24188777.7, "Extended European Search Report", Oct. 2, 2024, 10 pages.

* cited by examiner

Attorney Docket No: 105582-1461961-000640US

| | | | | | | | | | | | | | | | | | | | | |
|---|---|---|---|---|---|---|---|---|---|---|---|---|---|---|---|---|---|---|---|---|
| | | | | | | | | | | | | | | | | | | | | |
| | | | | 1 | 1 | 1 | | | | | | | | | | | | | | |
| | | | 1 | 3 | 3 | 4 | 4 | 4 | 1 | 1 | 1 | 1 | 1 | | | | | | | |
| | | 1 | 1 | 3 | 5 | 5 | 5 | 5 | 5 | 5 | 5 | 5 | 5 | 5 | 3 | | | | | |
| | | 1 | 3 | 5 | 5 | 5 | 5 | 5 | 5 | 5 | 5 | 5 | 5 | 5 | 5 | 5 | 4 | | | |
| | 1 | 3 | 3 | 5 | 5 | 5 | 5 | 5 | 5 | 5 | 5 | 5 | 5 | 5 | 5 | 5 | 5 | 5 | | |
| | 1 | 3 | 3 | 5 | 5 | 5 | 5 | 5 | 5 | 5 | 5 | 5 | 5 | 5 | 5 | 5 | 5 | 5 | 3 | |
| | 1 | 3 | 3 | 5 | 5 | 5 | 5 | 5 | 5 | 5 | 5 | 5 | 5 | 5 | 5 | 5 | 5 | 5 | 3 | |
| | 1 | 3 | 3 | 5 | 5 | 5 | 5 | 5 | 5 | 5 | 5 | 5 | 5 | 5 | 5 | 5 | 5 | 5 | 3 | |
| | 1 | 3 | 3 | 5 | 5 | 5 | 5 | 5 | 5 | 5 | 5 | 5 | 5 | 5 | 5 | 5 | 5 | 5 | 3 | |
| | 1 | 3 | 3 | 5 | 5 | 5 | 5 | 5 | 5 | 5 | 5 | 5 | 5 | 5 | 5 | 5 | 5 | 5 | 3 | |
| | 1 | 3 | 3 | 5 | 5 | 5 | 5 | 5 | 5 | 5 | 5 | 5 | 5 | 5 | 5 | 5 | 5 | 5 | 3 | |
| | | | 1 | 3 | 3 | 5 | 5 | 5 | 5 | 5 | 5 | 5 | 5 | 5 | 5 | 5 | 4 | 3 | | |
| | | | | | | | | | | 1 | 1 | 4 | 4 | 3 | | | | | | |

FIG. 28A

| Method | Threshold Value (rounded down) |
|---|---|
| Simple Average<br>-highest summation value = 5<br>-lowest summation value = 1 | 3 |
| Weighted Average<br># of pixels with summation value of 5: 138<br># of pixels with summation value of 4: 7<br># of pixels with summation value of 3: 29<br># of pixels with summation value of 2: 0<br># of pixels with summation value of 1: 22 | 4 |
| Median | 5 |

FIG. 28B

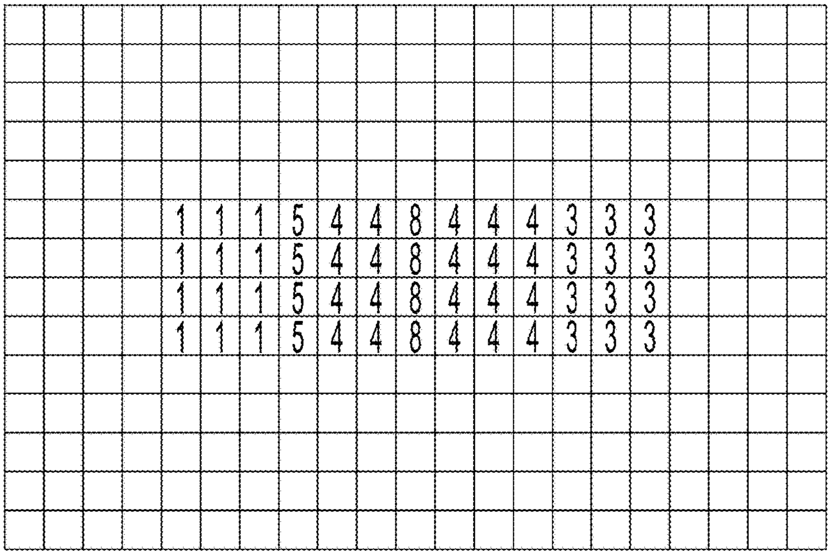

Accumulated mask

| Method | Threshold Value (rounded down) |
| --- | --- |
| Simple Average<br>-highest summation value = 8<br>-lowest summation value = 1 | 4 |
| Weighted Average<br># of pixels with summation value of 8: 4<br># of pixels with summation value of 7: 0<br># of pixels with summation value of 6: 0<br># of pixels with summation value of 5: 4<br># of pixels with summation value of 4: 20<br># of pixels with summation value of 3: 12<br># of pixels with summation value of 2: 0<br># of pixels with summation value of 1: 12 | 3 |
| Median (average of two middle values) | 3 |

FIG. 33

TECHNIQUES FOR ENHANCED IMAGE CAPTURE USING A COMPUTER-VISION NETWORK

CROSS-REFERENCE TO RELATED APPLICATIONS

This application is a continuation of U.S. patent Ser. No. 18/495,336, filed Oct. 26, 2023; which is a continuation of U.S. patent application Ser. No. 17/163,105, filed Jan. 29, 2021; which claims the priority benefit of U.S. Provisional Patent Application Nos. 62/968,977, filed Jan. 31, 2020; 63/014,248, filed Apr. 23, 2020; 63/059,093, filed Jul. 30, 2020; and 63/140,716, filed Jan. 22, 2021; the disclosure of each of which is incorporated by reference herein in its entirety for all purposes.

This application is also related to co-owned U.S. patent application Ser. No. 15/348,038 titled, "DIRECTED IMAGE CAPTURE," filed on Nov. 10, 2016, now issued as U.S. Pat. No. 10,038,838, and co-owned U.S. patent application Ser. No. 15/404,044 titled, "AUTOMATED GUIDE FOR IMAGE CAPTURING FOR 3D MODEL CREATION," filed on Jan. 11, 2017, now issued as U.S. Pat. No. 10,382,673. The contents of each of the above listed patents are hereby incorporated by reference in their entirety for all purposes.

BACKGROUND OF THE INVENTION

A three-dimensional (3D) model of a physical structure can be generated by executing computer-vision techniques on two-dimensional (2D) images of the physical structure. The images can be captured from multiple viewpoints via aerial imagery, specialized camera-equipped vehicles, or by a user holding a camera at ground level. The 3D model can be a digital representation of the real-world physical structure in a 3D space. While computer-vision techniques and capabilities continue to improve, a limiting factor in any computer-vision pipeline is the input image itself. Low resolution photos, blur, occlusion, subjects out of frame, and no feature correspondences between images all limit the full scope of analyses that computer-vision techniques can provide.

SUMMARY OF THE INVENTION

Certain aspects of the present disclosure relate to a computer-implemented method. The computer-implemented method can include receiving a plurality of ground truth images. Each ground truth image of the plurality of ground truth images can depict one or more physical structures and being associated with a ground truth mask for a target physical structure of the one or more physical structures. The computer-implemented method can include, for each ground truth image of the plurality of ground truth images: generating a candidate crop portion for the ground truth image, generating a filter overlay that fits within the generated candidate crop portion, and determining whether the generated filter overlay includes a threshold percentage of pixels depicting the target physical structure. In response to determining that the generated filter overlay includes the threshold percentage of pixels depicting the target physical structure, the computer-implemented method can include convolving the generated filter overlay with the ground truth mask associated with the ground truth image. Convolving can include validating one or more pixel locations representing a center of the generated filter overlay. The computer-implemented method can include identifying a pixel within the one or more validated pixel locations as an augmented crop image center, and generating an augmented crop image based on the augmented crop image center. The computer-implemented method can also include training a machine-learning model using the augmented crop image generated for each ground truth image of the plurality of ground truth images. Other embodiments of this aspect include corresponding computer systems, apparatus, and computer programs recorded on one or more computer storage devices, each configured to perform the actions of the methods.

Implementations may include one or more of the following features. The computer-implemented method can include generating a first plurality of first augmented crop images. Each of the first augmented crop images within the first plurality can be a single randomized representation of one of the plurality of ground truth images. The computer-implemented method can include grouping the plurality of first augmented crop images into a first epoch; training the machine-learning model on the first epoch; and generating a second plurality of second augmented crop images. Each of the second augmented crop images within the second plurality can be a single randomized representation of another one of the plurality of ground truth images. The computer-implemented method can include grouping the plurality of second augmented crop images into a second epoch; and training the machine-learning model on the second epoch. The trained machine-learning model can be trained to detect the target physical structure from amongst the one or more physical structures. Training the machine-learning model can further include: repeating the generating, grouping, and training steps for N epochs, and where the N epochs ends at convergence. Generating the candidate crop portion can further include selecting a proportional subset of the ground truth image within a border of the ground truth image. Generating the filter overlay can further include selecting a shape that does not exceed a boundary of the candidate crop portion. The shape can be biased for density at its center. The threshold percentage of pixels can include a lower threshold and an upper threshold. Detecting the target physical structure can include determining a target of interest center associated with classified pixels of the target physical structure. Implementations of the described techniques may include hardware, a method or process, or computer software on a computer-accessible medium.

Certain aspects of the present disclosure can include a computer-program product tangibly embodied in a non-transitory machine-readable storage medium, including instructions configured to cause a processing apparatus to perform operations including the methods described above and herein.

Certain aspects of the present disclosure can include a system. The system may comprise: one or more processors; and a non-transitory computer-readable storage medium containing instructions which, when executed on the one or more processors, cause the one or more processors to perform operations including the methods described above and herein.

The term "embodiment" and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

BRIEF DESCRIPTION OF THE DRAWINGS

FIGS. 28A-28B illustrate an example of an accumulated mask valuation and threshold value for filtering, according to certain aspects of the present disclosure.

FIGS. 30-35 illustrate an example of segmentation mask smoothing for a dynamic object, according to certain aspects of the present disclosure.

DETAILED DESCRIPTION OF THE INVENTION

Figure 1:
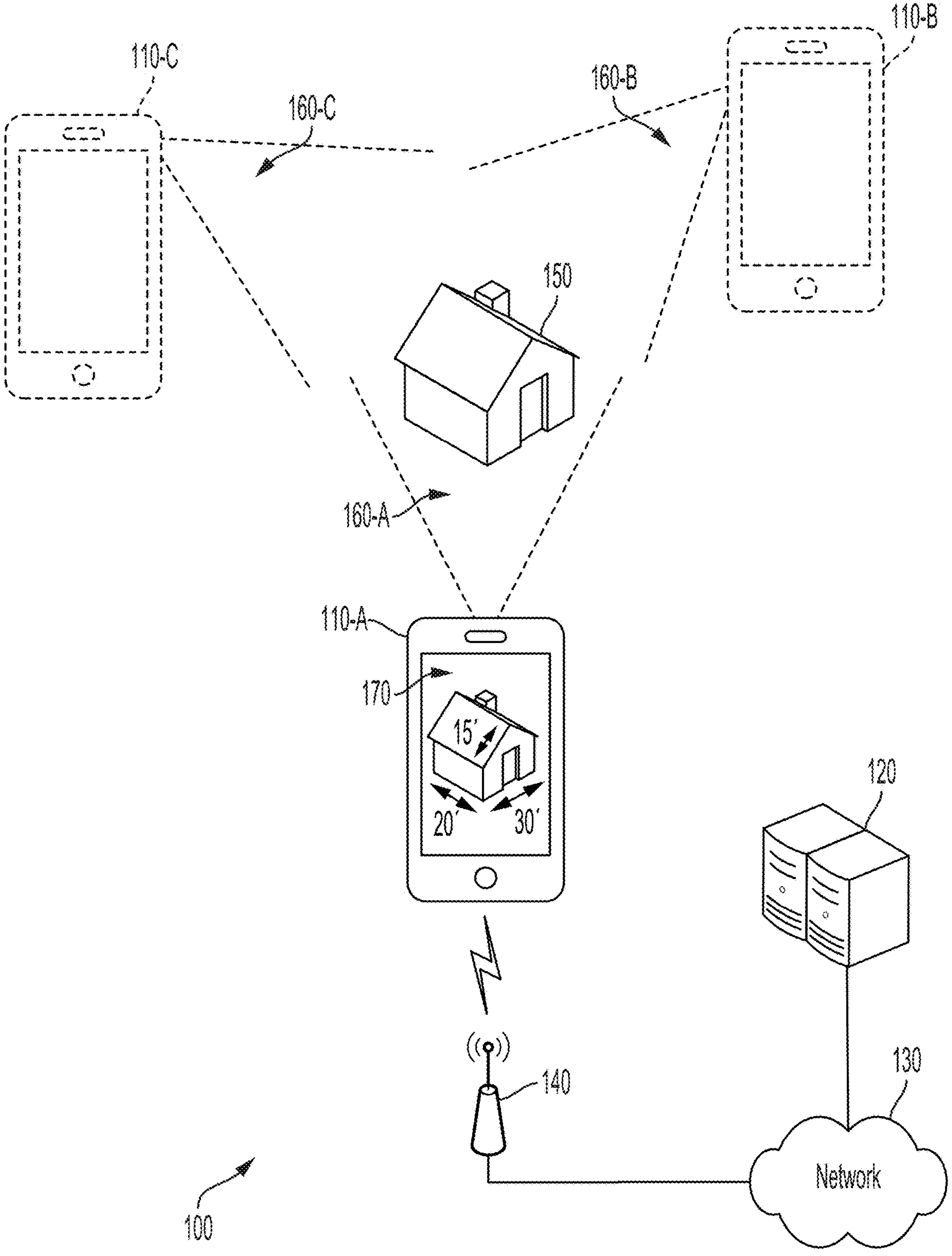
FIG. 1 is a block diagram illustrating an example of a network environment, according to certain aspects of the present disclosure.

Computer-vision techniques can be executed to classify pixels of a 2D image into various classes in a process called image segmentation. The accuracy of pixel classification by the computer-vision techniques can be impacted by several factors, including lighting and ambient conditions, contrast within the image, quality of the classifier or the imager and its sensors, computational resources, frame rate, occlusions and motions of the camera. For stationary objects, other factors being equal, pixel variation can largely be attributed to camera motion. For example, a user holding a camera will invariably impart some degree of motion into the camera because no human is rigid. Even in cameras stabilized with tools, such as tripods, slight scene motions like moving leaves near a house or flags waving due to the wind or the other aforementioned factors will introduce image noise. During image segmentation, the image noise can reduce the utility of the computer-vision techniques.

Further, modeling a physical structure in a 3D space using computer-vision techniques can involve capturing a set of 2D images of the physical structure from various viewpoints. The ability of computer-vision techniques to reconstruct a 3D model of the physical structure is impacted by the number and quality of feature correspondences between pairs of images within the set of images. For example, when a set of images is deficient in feature correspondences between pairs of images, the computer-vision techniques face technical challenges in reconstructing a 3D model. Often, however, it is difficult to recapture a new set of images to improve the number and quality of feature correspondences because, for instance, a user who captured the original set of images is no longer near the physical structure. At the time of capturing the set of images, any deficiency in number or quality of feature correspondences between pairs of images is often goes undetected, which reduces the utility of the computer-vision techniques.

The present disclosure provides a technical solution to the technical challenges described above. For instance, the present disclosure generally relates to techniques for enhancing two-dimensional (2D) image capture of subjects (e.g., a physical structure, such as a residential building) to maximize the feature correspondences available for three-dimensional (3D) model reconstruction. More specifically, the present disclosure is related to a computer-vision network configured to provide viewfinder interfaces and analyses to guide the improved capture of an intended subject for specified purposes. Additionally, the computer-vision network can be configured to generate a metric representing a quality of feature correspondences between images of a complete set of images used for reconstructing a 3D model of a physical structure. The computer-vision network can also be configured to generate feedback at or before image capture time to guide improvements to the quality of feature correspondences between a pair of images.

Certain aspects and features of the present disclosure relate to a computer-vision network configured to maximize feature correspondences between images of a physical structure to improve the reconstruction of a 3D model of that physical structure. The computer-vision network can detect features of a physical structure within each individual image of a set of images that capture the physical structure from multiple viewpoints. For example, a feature of the physical structure can be a 2D line (e.g., a fascia line), point (e.g., a roof apex), corner, or curvature point detected in a 2D image. The computer-vision network can also detect correspondences between features detected in one image and other features detected in another image (herein after referred to as "feature correspondence" or interchangeably with "feature match"). A feature correspondence can represent that one feature detected in one image is located at the same 3D position as a feature detected in another image. Computer-vision techniques can be executed to reconstruct a 3D model of the physical structure using the feature correspondences detected between images of the set of images of the physical structure. The number and quality (e.g., confidence) of feature correspondences between images, however, can impact a quality of the reconstructed 3D model or potentially can impact the ability of computer-vision techniques to reconstruct a 3D model at all.

Accordingly, certain aspects and features of the present disclosure relate to techniques for maximizing the number and quality of features detected within an individual image and/or maximizing the number and quality of feature correspondences between images of an image pair to improve the scope of analyses that computer-vision techniques can provide with respect to reconstructing a 3D model of a physical structure.

In some implementations, the computer-vision network can include an intra-image parameter evaluation system configured to guide a user to improve a framing of a physical structure captured within a viewfinder of the user device. The intra-image parameter evaluation system can automatically detect instances in which a target physical structure is out of the frame of a display of a user device (e.g., a mobile device embedded with an image capturing device, such as a camera), and in response, can generate instructive prompts that guide the user to re-frame the physical structure. Framing the physical structure within a display before capturing the image can maximize the number and quality of features detected within the captured image. In some implementations, the intra-image parameter evaluation system can be configured to generate temporally smoothed bounding boxes to fit segmentation masks associated with a target physical structure that mitigate segmentation model noise or image noise caused by unavoidable user motion.

In some implementations, the intra-image parameter evaluation system can be configured to detect whether a point on a surface of the physical structure is suitable for 3D model reconstruction. This may be calculated as an angular perspective score derived from an angle between a line or ray from the focal point of the camera to the point and the orientation of the surface or feature on which the point lies. The angle between the focal point of the camera and the surface of the physical structure informs a degree of depth information that can be extracted from the resulting captured image. For example, an angle of 45 degrees between the focal point of the camera and the surface of a physical structure can provide optimal image data for extracting depth information, which improves the use of computer-vision techniques to reconstruct a 3D model of the physical structure. Accordingly, the intra-image parameter evaluation system can be configured to detect the angle between the focal point of the camera and the surface of the physical structure within the camera's field of view, and generate a metric that represents the degree to which the detected angle is suitable for 3D model reconstruction. As an illustrative example, an image that is captured, such that the camera's image plane is flat with or parallel to a surface of the physical structure, may not capture image data that can provide extractable depth information, and thus, the resulting metric for points on that surface may be zero or near-zero. Conversely, an image that captures points with an angle of 45 degrees between a focal point of the camera and a surface of the physical structure (on which the points lie) may capture an optimal amount of image data that can be used to extract depth information, and thus, the result metric may be much higher (e.g., "1" on a scale of "0" to "1"), indicating a suitable data capture for the purpose of 3D model reconstruction. The intra-image parameter evaluation system can generate an instructive prompt while a user is framing the physical structure within a viewfinder of the user device (e.g., camera) based on the metric, thereby guiding the user to capture images with an optimal angle relative to the surface of the physical structure. In some implementations, a native application executing on a user device provides a coarse augmented reality (AR) output and a subtended angle check. For instance, camera poses surrounding the physical structure generated by AR systems can provide early feedback as to both the surface orientation metric mentioned previously, as well as feature correspondence matches with previous images. In some embodiments, the imager's field of view is used as a subtended angle for capture of points, and the AR pose output can predict whether the instant pose and subtended angle provides any overlap with features relative to a previous pose and subtended angle. Accordingly, without performing a feature correspondence detection between images, at certain distances between poses or subtended angles between poses, the intra-image parameter evaluation system may not qualify or evaluate the captured image. Instead, the intra-image parameter evaluation system prompt the user to adjust the pose (either by translation or rotation or both) to meet the coarse AR check before evaluating the image within the display. These implementations can improve the quality of depth information that can be extracted from the captured image.

In some implementations, the intra-image parameter evaluation system can generate a secondary mask, which is applied to the segmented image to discern which object in the viewfinder is the object of interest for image capture. For example, when capturing residential homes for subsequent 3D modeling, neighboring buildings can be interpreted as part of a single structure in the display. The secondary mask can serve as a data augmentation input to intermediately crop the segmented portion of the image, thereby eliminating display of segmented objects in the display that are not the object of interest.

In some implementations, the intra-image parameter evaluation system can include an artificial intelligence model (e.g., a deep learning segmentation model) that can be trained with a subset of augmented crop images representing a target of interest within an image. This model in turn can inform, when deployed on a device in real time, which object within a field of view of a capture device is the intended target to be captured when multiple objects of the same classification are presented. For example, when multiple homes are viewable in a camera field of view, the trained model can detect which home is the target home for appropriate framing according to the techniques described above and herein.

In some implementations, the computer-vision network can also include an inter-image parameter evaluation system configured to maximize the number and quality of feature correspondences between a pair of images captured during an image capture session. The computer-vision network can be executed using a native application running on a user device, such as a smartphone. The native application can initiate an image capture session that enables a user to capture a set of images of a target physical structure from multiple viewpoints. For example, the native application can initiate the image capture session, and the user can walk in a loop around a perimeter of the physical structure, while periodically capturing an image of the physical structure. In some implementations, each image captured during the image capture session can be stored at the user device and evaluated in real time. In other implementations, each image can be stored after capture and immediately transmitted to a cloud server for evaluation. The inter-image parameter evaluation system can evaluate the complete set of images captured by the user as the user completed the loop around the perimeter of the physical structure. In some implementations, evaluating the complete set of images can include generating a 3D coverage metric that represents a degree to which the feature correspondences between each pair of images in the set of images share a sufficient number or quality of feature correspondences. A quality of a feature correspondence can represent a confidence associated with the feature correspondence, co-planarity, collinearity, covariance, gauge freedom, trifocal tensor, and loop closure metric associated with the feature correspondence. For example, if the set of images captured by the user does not include an image of a south-facing side of the physical structure, then there may be an insufficient feature correspondence between an image of the west-facing side of the physical structure and the east-facing side of the physical structure, if the user walked in a clockwise loop around the perimeter of the physical structure. The 3D coverage metric can be evaluated by the native application before the set of images is transmitted to a cloud server for 3D model reconstruction to determine whether any additional images need to be captured to fill in the gaps left by uncovered areas of the physical structure in the original set of images.

In some implementations, the inter-image parameter evaluation system can be configured to detect, in real time, whether an immediately captured image satisfies a 3D reconstruction condition with respect to a preceding image captured. For example, the 3D reconstruction condition can be a condition that requires a pair of images to have a threshold number of feature correspondences. As another example, the 3D reconstruction condition can be a condition that requires a pair of images to have features correspondences that are not located on the same plane or line (e.g. regardless of the number of feature correspondences). The present disclosure is not limited to these examples, and any quality attribute (e.g., covariance, gauge freedom, trifocal tensor, and loop closure metric) of a feature correspondence can be used in association with the 3D reconstruction condition. As each image is captured during the image capture session, the inter-image parameter evaluation system can detect in real time whether that captured image satisfies the 3D reconstruction condition with respect to a preceding captured image. If the 3D reconstruction condition is satisfied, then the native application can generate a feedback notification on the display of the user device to guide the user to continue capturing images to complete the set of images. If the 3D reconstruction condition is not satisfied, then the native application can generate a feedback notification on the display of the user device to guide the user to recapture that image (either from that location or from another location). In some implementations, the native application can triangulate a location of a preceding image with the location of the physical structure to predict a new location for the user to walk to for recapturing the image. The native application can guide the user to walk to the new location by indicating an action (e.g., "Please walk back 5 steps") in the feedback notification.

FIG. 1 is block diagram illustrating an example of a network environment 100, according to certain aspects of the present disclosure. Network environment 100 may include user device 110 and server 120. User device 110 may be any portable (e.g., mobile devices, such as smartphones, tablets, laptops, application specific integrated circuits (ASICs), and the like) or non-portable computing device (e.g., desktop computer, electronic kiosk, and the like). User device 110 may be connected to gateway 140 (e.g., a Wi-Fi access point), which provides access to network 130. Network 130 may be any public network (e.g., Internet), private network (e.g., Intranet), or cloud network (e.g., a private or public virtual cloud). User device 110 may communicate with server 120 through network 130.

A native or web application may be executing on user device 110. The native or web application may be configured to perform various functions relating to analyzing an image or a set of images of a physical structure, such as a house. As an illustrative example, the native or web application may be configured to perform a function that captures a set of images of house 150 and transmits the set of images to server 120 to execute computer-vision techniques, such as reconstructing a 3D model from the set of images. A user may operate user device 110 to capture the set of images by capturing an image of house 150 from positions A, B, and C. The user may operate user device 110 to capture an image of house 150 within a field of view 160-A at position A (indicated by user device 110-A as shown in FIG. 1). The user may operate user device 110 to capture an image of house 150 within a field of view 160-B at position B (indicated by user device 110-B as shown in FIG. 1). The user may also operate user device 110 to capture an image of house 150 within a field of view 160-C at position C (indicated by user device 110-C as shown in FIG. 1). The user may walk around house 150 from position A to position B to position C to capture a complete set of images.

In some implementations, the native or web application can be configured to execute computer-vision techniques to detect if the complete set of images leaves any uncovered areas of house 150. An uncovered area of house 150 can indicate a side or edge of house 150 that is not captured by an image in the set of images. Further, uncovered areas of house 150 create technical challenges when user device 110 or server 120 reconstructs a 3D model using the set of images because user device 110 or server 120 may not have sufficient image data from which reconstruct the 3D model of house 150.

Additionally, in some implementations, the native or web application can be configured to execute computer-vision techniques to detect if a given image satisfies a 3D reconstruction condition with respect to the previous image captured. As an illustrative example, a 3D reconstruction condition may be a condition requiring that two images are to share a threshold number of feature correspondences between the two images and/or a threshold number of different planes or lines on which the feature correspondences are detected. If the features are matched on a single plane or line, then server 120 may not have sufficient information to reconstruct the 3D model of house 150. A feature can represent a structural intersection of house 150 (e.g., a keypoint or a front apex of a roof). A feature correspondence can represent a feature in one image that is associated with the same 3D point as a feature in another image. The native or web application can detect whether each captured image satisfies the 3D reconstruction condition with respect to a preceding image. If server 120 determines that two images satisfy the 3D reconstruction condition, then the native or web application enables the user to capture the next image in the set of images. If, however, server 120 determines that a second image of two images does not satisfy the 3D reconstruction condition with respect to a first image of the two images, then the native or web application can generate feedback to notify the user that the second image was not captured or stored and guide the user to a different location for recapturing a second image that does satisfy the 3D reconstruction condition with respect to the first image. If a series of images are taken, server 120 may select images that satisfy the 3D reconstruction condition, despite native or web application hosting additional images of house 150.

The present disclosure is not limited to performing the above-described functionality on server 120. The functionality can be entirely performed on user device 110 without the need for server 120. Additionally, the present disclosure is not limited to the use of a native or web application executing on user device 110. Any executable code (whether or not the code is a native or web application) can be configured to perform at least a part of the functionality.

The native or web application can transmit the complete set of images (e.g., captured from positions A, B, and C) to server 120 for analysis. Server 120 can analyze the complete set of 2D images to automatically detect or compute the 3D dimensions of house 150 by evaluating the feature correspondences detected between images of the set of images. For example, in response to receiving the set of images capturing various angles of house 150 from user device 110, the native or web application may display a final image 170, which is a visualization of a reconstructed 3D model of house 150. In some examples, the final image 170 can be presented over the image of house 150 on a display of user device 110.

Figure 2:
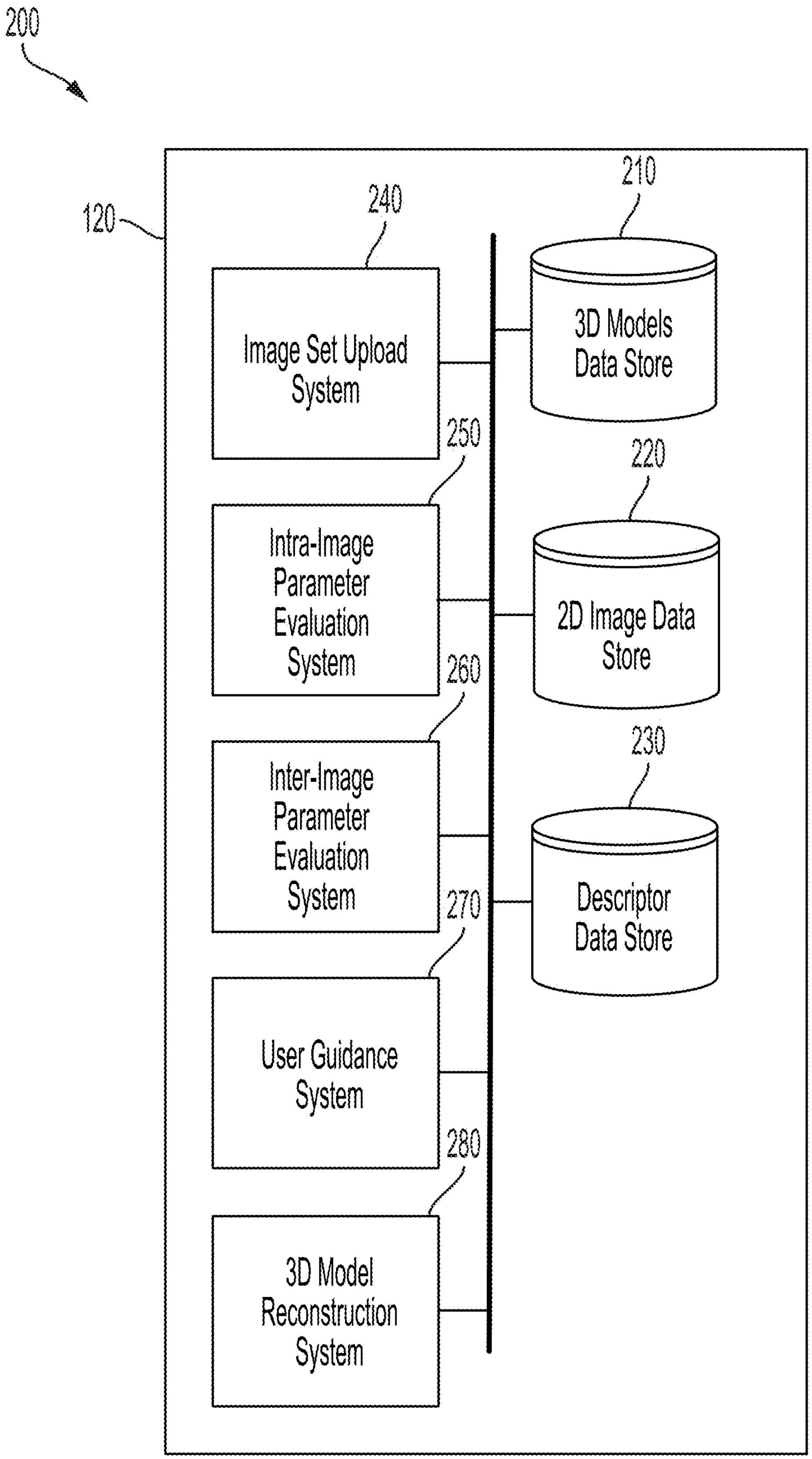
FIG. 2 is a block diagram illustrating another example of a network environment, according to certain aspects of the present disclosure.

FIG. 2 is a block diagram illustrating components of server 120, according to certain aspects of the present disclosure. In some implementations, server 120 may include several components, including 3D model data store 210, 2D image data store 220, and descriptor data store 230. Server 120 may be one or more processors or processing apparatuses (e.g., a stack of servers at a data center) configured to execute executable code that performs various functions, according to certain implementations described herein. The executable code may be stored in a memory (not shown) associated with server 120. Server 120 may be used to train and/or execute artificial-intelligence (AI) models of a computer-vision network, according to certain implementations described herein. In some implementations, one or more components of server 120 can be included in or executable by a native application running on a user device. In this case, the image evaluation can be performed directly on a user device, rather than at server 120.

3D model data store 210 may be configured to include a data structure that stores one or more existing 3D models of physical structures. Non-limiting examples of a 3D model of a physical structure include a CAD model, a 3D shape of a cuboid with an angled roof, a pseudo-voxelized volumetric representation, mesh geometric representation, a graphical representation, a 3D point cloud, or any other suitable 3D model of a virtual or physical structure. The 3D models of physical structures may be generated by a professional or may be automatically generated (e.g., a 3D point cloud may be generated from a 3D camera).

2D image data store 220 may store 2D images of physical structures. The 2D images may be captured by professionals or users of the native or web application, or may be generated automatically by a computer (e.g., a virtual image). Referring to the example illustrated in FIG. 1, the images of house 150, which is captured by user device 110 at position A, B, and C, may be transmitted to server 120 and stored in 2D image data store 220. The images stored in 2D image data store 220 may also be stored in association with metadata, such as the focal length of the camera that was used to capture the image, a resolution of the image, or a date and/or time that the image was captured. In some implementations, the images stored in 2D image data store 220 may depict top-down views of physical structures (e.g., aerial images or drone-captured images). In other implementations, the 2D image data store 220 may store images depicting ground-level views of houses, which can be evaluated using the computer-vision network described in certain implementations herein. Server 120 may process the images to generate descriptors, for example, by detecting a set of 14 keypoints within an image.

The images stored in 2D image data store 220 and/or the 3D models stored in 3D model data store 210 may serve as inputs to machine-learning or artificial-intelligence models. The images and/or the 3D models may be used as training data to train the machine-learning or artificial-intelligence models or as test data to generate predictive outputs. Machine-learning or artificial-intelligence models may include supervised, unsupervised, or semi-supervised machine-learning models.

Image set upload system 240 can be configured to open an intermediate image capture session, which can create a progressive image transmission link between user device 110 and server 120. As the user operates user device 110 to capture images for a set of images (that will be transmitted to server 120 for 3D reconstruction), the captured images are individually uploaded to server 120 using the image transmission link established by the intermediate image capture session. For example, the images can be uploaded to server 120 and stored in 2D image data store 220. If user device 110 loses connectivity to server 120 before the set of images is complete, then the images that have been captured prior to the loss of connectivity are preserved at server 120. Server 120 can perform 3D model reconstruction techniques using the available images stored at server 120. In some implementations, the native or web application running on user device 110 can selectively subsample one or more images of the set of images. The subsampling of the one or more images of the set of images can reduce the resolution of the one or more images, and thus, reduces the total amount of bandwidth needed to upload the images to server 120 for 3D model reconstruction and reduces the amount of time needed to upload the set of images from user device 110 to server 120 for 3D model reconstruction. In some implementations, image set upload system 240 can enable a 3D model of a physical structure to be reconstructed, at least in part, as each image is received during the intermediate image capture session. Image set upload system 240 can evaluate the received images to recognize any gaps in coverage of the physical structure. In some implementations, image set upload system 240 can determine a complexity of the physical structure being captured and whether additional images are needed to complete or facilitate the 3D model reconstruction of the physical structure. Image set upload system 240 can also generate a confirmation that the received images, which are received so far, provide a sufficient number and quality of feature correspondences to enable a 3D model to be reconstructed from the image data received. Image set upload system 240 can also evaluate each received image individually to determine whether the image is of a poor quality (e.g., poor lighting conditions, house not framed properly, etc.).

Intra-image parameter evaluation system 250 can be configured to perform an evaluation on each individual image as it is being captured or after it is captured. In some implementations, the evaluation can include detecting a target physical structure within a camera's viewfinder or display (hereinafter either may be referred to simply as a "display"). Detecting the target physical structure can include performing one or more image segmentation techniques, which include inputting a 2D image into a trained classifier to detect pixels relating to the target physical structure, such as a house. When the target physical structure is detected, the intra-image parameter evaluation system 250 can determine the dimensions of a bounding box and render the bounding box around the target physical structure. The bounding box may be a convex hull or quadrilateral otherwise that contains the image data of target physical structure. A pixel evaluator at the display's border may use a logic tool to determine whether display pixels at the display's boundary (or within a range of the boundary) include the bounding box or not. A pixel value at the display boundary held by the bounding box can indicate that the target physical structure is not fully in the camera's field of view. Corrective instructions can be displayed to the user, preferably concurrent with the camera's position, but in some implementations, subsequent to a pixel evaluation at a given camera position, based on the pixel evaluation. For example, if the pixel evaluator detects bounding box values on the top border of the display, an instructive prompt to pan the camera upwards (either by translating or rotating or both) is displayed. If the pixel evaluator detects bounding box values at the upper and lower borders, then a prompt for the camera user to back up and increase distance between the subject and the camera is displayed.

In some implementations, intra-image parameter evaluation system 250 can generate a segmentation mask, and then apply the segmentation mask to the display image. The segmentation mask may be trained separately to detect certain objects in an image. The segmentation mask may be overlaid on the image, and a pixel evaluator determines whether a segmentation pixel is present at the border of the display. In some implementations, intra-image parameter evaluation system 250 can display corrective instructions based on a threshold number of pixels from a border of the display. In some implementations, the threshold number can be a percentage of boundary pixels that are associated with a segmentation mask pixel relative to all other pixels along the boundary. In some implementations, the threshold number can be a function of a related pixel dimension of the segmented subject and the number of segmented pixels present at the display border.

Inter-image parameter evaluation system 260 can be configured to perform an evaluation of a complete set of 2D images, for example, which was captured during an image capture session. A complete set of 2D images can represent a plurality of 2D images that capture a physical structure from multiple angles. For example, continuing with the example illustrated in FIG. 1, as the user walks around house 150, the user operates user device 110 to capture the set of images, including an image at position A, another image at position B, and yet another image at position C. The set of images is completed when the user returns to a starting position (e.g., position A) and completes the loop around the perimeter of the physical structure. The native or web application executing on user device 110 can initiate the image capture session, which enables the user to begin capturing images of the physical structure from various angles, and which then stores each captured image. In some implementations, the image capture session can be the intermediate image capture session initiated by the image set upload system 240, described above.

Inter-image parameter evaluation system 260 can generate a 3D coverage metric for the complete set of 2D images, which was captured during the image capture session. The 3D coverage metric can be any value (e.g., a text string, a category, a numerical score, etc.) that represents a degree to which the set of 2D images is suitable for 3D model reconstruction. For example, the degree to which a set of 2D images is suitable for 3D model reconstruction can be inversely proportional to the degree to which uncovered areas of the physical structure remain after the complete set of 2D images has been captured. An uncovered area of the physical structure can be an edge or side of the physical structure that is not captured in pixels of any 2D image of the complete set of 2D image. The inter-image parameter evaluation system 260 can detect uncovered areas of the physical structure from the complete set of 2D images using techniques described herein (e.g., with respect to FIGS. 44-50). Further, inter-image parameter evaluation system 260 can reflect the degree to which there are uncovered areas of the physical structure in the 3D coverage metric.

In some implementations, inter-image parameter evaluation system 260 can evaluate the complete set of images to determine a difficulty with respect to reconstructing a 3D model using the set of images. For example, a difficulty of reconstructing the 3D model from the set of images can be informed by the angles formed by a point's position on a surface of a house in an image back to the imager (e.g., from the focal point of the camera). As an illustrative example, inter-image parameter evaluation system 260 can generate or retrieve an orthogonal view of a top of a target physical structure, and then can determine a plurality of points along the edges of the physical structure as viewed orthogonally. Each point can be assigned a value representing an angle relative to the imager at which that point was captured in an image of the set of images. The angle can be calculated between lines from the focal point of the camera to the point and the surface that point falls on. The various points can then be projected on a unit circle. The unit circle can be segmented into even segments (e.g., 8 even segments or slices). The arc of each segment can be associated with the angular perspective score of the plurality of points associated with such segment. For the points associated with each segment (e.g., the points on the arc of each segment), inter-image parameter evaluation system 260 can determine a median of the values of the plurality of points associated with that arc. The result can be a unit circle divided into multiple segments, such that each segment is associated with a single value. Further, the resulting unit circle with each segment associated with a single value can represent a difficulty of the 3D model reconstruction, or where additional images should be obtained to improve the angular perspective score for that region of the unit circle. The various outputs (individual points score or arc in a unit score), indicate the degree that an image was captured with minimal angle (e.g., an image plane was parallel to a surface orientation of the physical structure) relative to the surface of the physical structure, which reflects difficulty in 3D reconstruction.

User guidance system 270 can be configured to generate a feedback notification in real-time after an image is captured during the image capture session. The feedback notification can represent whether or not the captured image satisfies a 3D reconstruction condition with respect to a preceding captured image, for example, the immediately preceding image frame that was captured. If the 3D reconstruction condition is satisfied, then user guidance system 270 can generate a feedback notification indicating that the image has been captured and stored in association with the image capture session. If, however, the 3D reconstruction condition is not satisfied, then user guidance system 270 can generate a feedback notification indicating that the image was not stored in association with the image capture session. In some implementations, user guidance system 270 can also determine a new location to which the user should walk to re-capture an image that does satisfy the 3D reconstruction condition. As only a non-limiting example, the 3D reconstruction condition can be a condition that the most-recently captured image and the immediately preceding image share a threshold number of feature correspondences (e.g., a keypoint match) and that the feature correspondences are associated with a threshold number of different planes or lines. Two images that satisfy the 3D reconstruction condition can provide a sufficient number of feature correspondences to enable a 3D modeling system to reconstruct a 3D model of the physical structure.

3D model reconstruction system 280 can be configured to construct a 3D representation of a physical structure (e.g., residential building) using the complete set of images of the physical structure. The complete set of 2D images of the physical structure includes images depicting the physical structure from various angles, such as from a smart phone, to capture various geometries and features of the building. 3D model reconstruction system 280 can be configured to detect corresponding features between two or more images to reconstruct the physical structure in a 3D space based on those corresponding features. In some implementations, 3D model reconstruction system 280 can be configured to execute multi-image triangulation techniques to facilitate reconstructing a 3D model of a target subject (e.g., of a real-world residential building) from a set of 2D images of the target subject. 3D model reconstruction system 280 can detect a correspondence between a feature of one image to another feature of another one or more images, and then triangulate camera poses associated with those features to reconstruct the 3D model. For example, a feature can be a 2D line, point, corner, or curvature point detected in a 2D image. Then, 3D model reconstruction system 280 can establish the correspondence of these features between any pair of images. 3D model reconstruction system 280 can triangulate these 2D correspondences to reconstruct the 3D model of the physical structure.

Figure 3:
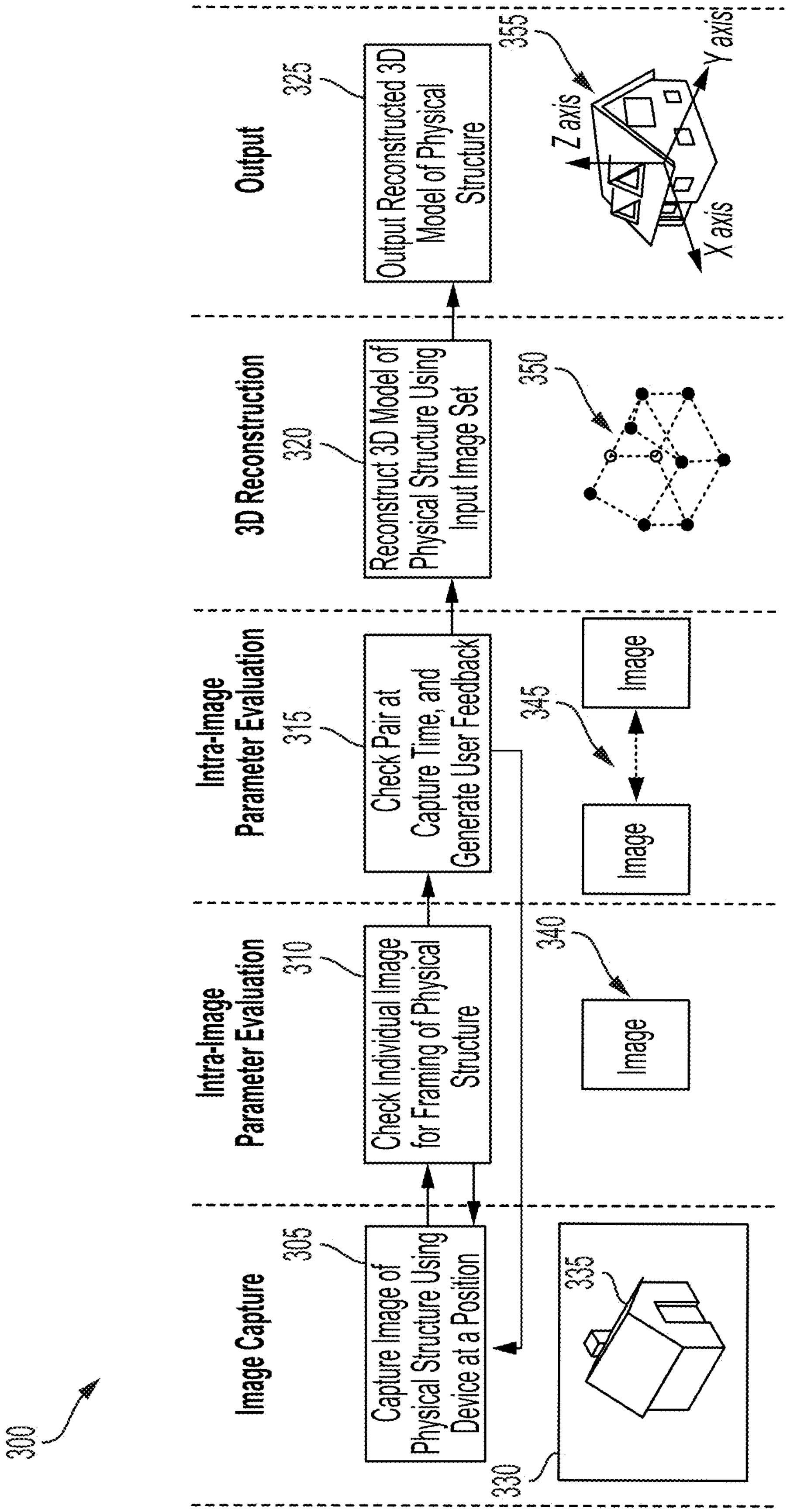
FIG. 3 is a diagram illustrating an example of a process flow for capturing a set of images for 3D model reconstruction, according to certain aspects of the present disclosure.

FIG. 3 is a diagram illustrating an example of a process flow for maximizing feature correspondences detected or captured in a set of 2D images to improve 3D model reconstruction, according to certain aspects of the present disclosure. Process flow 300 may represent certain operations performed by a computer-vision network for maximizing feature correspondences captured in 2D images for the purpose of constructing a 3D model of a house 335 captured in a set of 2D images, including 2D image 330. Process flow 300 may be performed, at least in part, by any of the components illustrated in FIGS. 1-2, such as user device 110, server 120 (or any of its components illustrated in FIG. 2), 2D image data store 220, and 3D model data store 210. Further, process flow 300 may be performed using a single network or multiple networks to evaluate each individual image captured during an image capture session and/or each pair of images to improve the quality of image data provided to 3D model reconstruction system 280 for 3D model reconstruction.

At block 305, user device 110 can execute a native application configured to capture a set of 2D images for the purpose of reconstructing a 3D model of a physical structure. The native application can initiate an image capture session that enables a user to capture multiple images of a physical structure. The image capture session can store each individual image captured (e.g., at user device 110 or at server 120 using a cloud network) and evaluate the captured image individually and in relation to one or more other images (e.g., any immediately preceding images captured in a set of images).

At block 310, intra-image parameter evaluation system 250 can evaluate each individual image as the image is being captured or after the image is captured. For example, as described in greater detail with respect to FIGS. 4-20, intra-image parameter evaluation system 250 can generate a guiding indicator on a display of user device 110 to guide the user to frame a physical structure within the display before capturing image 340. The guiding indicator can guide the user to capture as many features as possible per image, thereby maximizing the opportunity that at least one feature in an image will have a correspondence with another feature in another image and allowing that maximized feature correspondences to be used for reconstructing a 3D model of the physical structure in a 3D space. For example, while the user is attempting to capture an image of the physical structure, the native application can detect whether the physical structure is framed properly. If the physical structure is not framed properly, the native application can display a guiding indicator, which can visually (or audibly, in some implementations) guide the user to frame the physical structure within the display to maximize detectable features within the image data depicting the physical structure. Other aspects of image 340 can be evaluated in addition to or in lieu of the evaluation of the framing of the physical structure. In some implementations, if the entirety of the physical structure cannot fit within a viewfinder of user device 110, then intra-image parameter evaluation system 250 can detect whether a sub-structure of the physical structure is properly framed within the display (as described with respect to FIGS. 36-43B).

At block 315, inter-image parameter evaluation system 260 can evaluate each pair of images 345 while the image capture session is active (e.g., actively capturing and storing images associated with the session). Upon capturing an image, the inter-image parameter evaluation system 260 can evaluate the captured image with respect to a preceding image captured during the image capture session to determine if the pair of images 345 satisfies a 3D reconstruction condition. For example, inter-image parameter evaluation system 260 can determine whether a captured image shares sufficient feature correspondences with respect to a preceding captured image to maximize the number of feature correspondences available between the pair of images 345, thereby ensuring the image data has sufficient inputs available for reconstructing the 3D model. In some implementations, a sufficiency of feature correspondences can be determined by comparing a number of feature correspondences between the pair of images 345 to a threshold value. If the number of feature correspondences is equal to or above the threshold value, then inter-image parameter evaluation system 260 can determine that the feature correspondence between the pair of images 345 is sufficient. In some implementations, a sufficiency of feature correspondences can be determined by identifying a number of different planes and/or lines, on which the feature correspondences between the pair of images 345 are detected. If the number of different planes or lines associated with the detected feature correspondences is equal to or above a threshold, then inter-image parameter evaluation system 260 can determine that the pair of images 345 provides a diversity of planes or lines to allow the 3D model of the physical structure to be reconstructed. For instance, if many feature correspondences are detected between the pair of images 345, but the feature correspondences are detected on the same plane, then 3D model reconstruction system 280 may not have sufficient image data to reconstruct the 3D model of the physical structure. However, if fewer feature correspondences are detected, but the feature correspondences are detected on different planes, then 3D model reconstruction system 280 may have sufficient image data to reconstruct the 3D model of the physical structure. Any quality metric (e.g., a confidence associated with the feature correspondence, co-planarity, collinearity, covariance, gauge freedom, trifocal tensor, and loop closure metric) of a feature correspondence can be used for as a condition for the 3D reconstruction condition. If inter-image parameter evaluation system 260 determines that the pair of images 345 does not satisfy the 3D reconstruction condition, then the native application can generate a feedback notification that notifies the user that the image was not capture (or was not stored in association with the image capture session) and potentially guides the user to a new location to re-capture the image in a manner that does or is expected to satisfy the 3D reconstruction condition.

In some implementations, inter-image parameter evaluation system 260 can evaluate a complete set of 2D images after the image capture session has terminated. For example, the native application can terminate the image capture session if the user has completed a perimeter of the physical structure. Terminating the image capture session can include storing each captured image of the set of captured images and evaluating the set of captured images using user device 110. In some implementations, the set of captured images is not evaluated on user device 110, but rather is transmitted to server 120 for reconstructing the 3D model of the physical structure. Evaluating the complete set of 2D images can include generating a 3D coverage metric that represents a degree to which the set of 2D images is missing pixels that represent areas of the physical structure (e.g., a degree to which there are uncovered areas of the physical structure). In some implementations, if the 3D coverage metric is below a threshold value, then the native application can generate a feedback notification that indicates to the user that the set of 2D images captured during the image capture session does not provide sufficient feature correspondences for reconstructing a 3D model of the physical structure. The feedback notification can also indicate that a new set of 2D images needs to be captured. In some implementations, inter-image parameter evaluation system 260 can determine which areas of the physical structure are not depicted in the original set of 2D images, triangulate a location of user device 110 and the uncovered areas of the physical structure, and identify new candidate locations for the camera to re-capture one or more images. In these implementations, the user may only need to recapture one or more images to add image data to the original set of 2D images, and thus, would not need to recapture the entire set of 2D images.

At block 320, 3D model reconstruction system 280 can evaluate the image data included in the completed set of 2D images captured during the image capture session and reconstruct a 3D model 350 of the physical structure in a 3D space using one or more 3D model reconstruction techniques. The 3D model reconstruction performed by 3D model reconstruction system 280 can be improved due to the implementations described herein because these implementations guide a user to capture images that maximize the detected features in each individual image and maximize the detected feature correspondences between image pairs, such as successive images, which improves the ability of 3D model reconstruction system 280 to reconstruct the 3D model. At block 325, the computer-vision network may output a reconstructed 3D model 355 (potentially including one or more textures or colors rendered over the 3D model) representing a 3D model of the physical structure 335.

Described herein are various methods executable by intra-image parameter evaluation system 250. Intra-image parameter evaluation system 250 can be configured to analyze viewfinder or display contents to direct adjustment of a camera parameter (such as rotational pose) or preprocess a display contents before computer vision techniques are applied.

Though the field of photography may broadly utilize the techniques described herein, specific discussion will be made using residential homes as the exemplary subject of an image capture, and photogrammetry and digital reconstruction the illustrative use cases.

Though image analysis techniques can produce a vast amount of information, for example classifying objects within a frame or extracting elements like lines within a structure, they are nonetheless limited by the quality of the original image. Images in low light conditions or poorly framed subjects may omit valuable information and preclude full exploitation of data in the image. Simple techniques such as zooming or cropping may correct for some framing errors, but not all, and editing effects such as simulated exposure settings may adjust pixels values to enhance certain aspects of an image, but such enhancement does not replace pixels that were never captured (for example, glare or contrast differentials).

Specific image processing techniques may require specific image inputs, it is therefore desirable to prompt capture of a subject in a way that maximizes the potential to capture those inputs rather than rely on editing techniques in pre- or post-processing steps.

In three-dimensional (3D) modeling especially, two-dimensional (2D) images of a to-be-modeled subject can be of varying utility. For example, to construct a 3D representation of a residential building, a series of 2D images of the building can be taken from various angles, such as from a smart phone, to capture various geometries and features of the building. Identifying corresponding features between images is critical to understand how the images relate to one another and to reconstruct the subject in 3D space based on those corresponding features.

This problem is compounded for ground level images, as opposed to aerial or oblique images taken from a position above a subject. Ground level images, such as ones captured by a smartphone without ancillary equipment like ladders or booms, are those with an optical axis from the imager to the subject that is substantially parallel to the ground surface. With such imagery, successive photos of a subject are prone to wide baseline rotation changes, and correspondences between images are less frequent.

Figure 4:
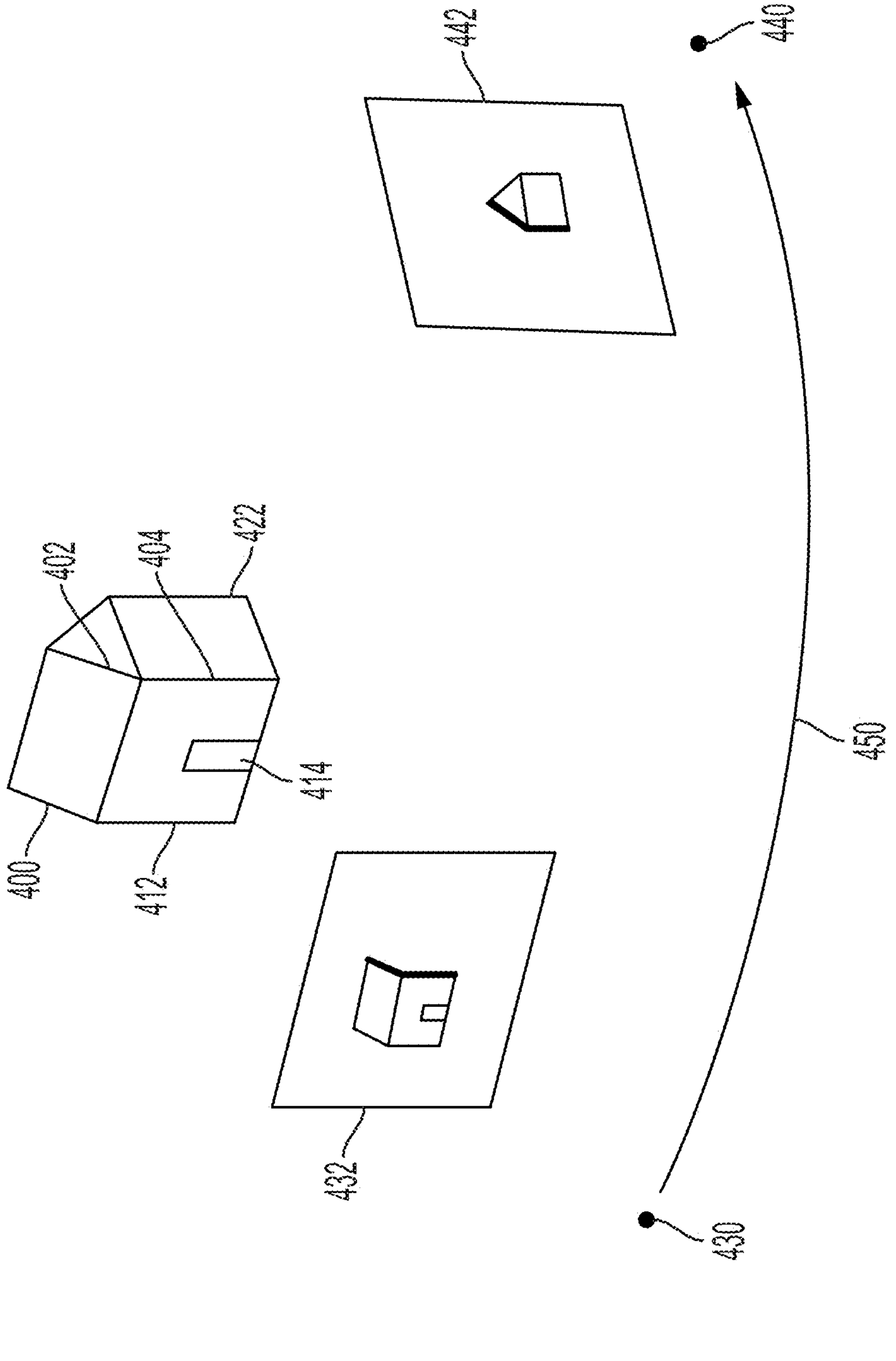
FIG. 4 illustrates an example of changes in features across ground-level camera views of a subject from different positions.

FIG. 4 illustrates this technical challenge for ground based images in 3D reconstruction. Subject 400 has multiple geometric features such as post 412, door 414, post 404, rake 402, and post 422. Each of these geometric features as captured in images represents useful data to understand how the subject is to be reconstructed. Not all of the features, however, are viewable from all camera positions. Camera position 430 views subject 400 through an image plane 432, and camera position 440 views subject 400 through an image plane 442. The rotation 450 between positions 430 and 440 forfeits many of the features viewable by both positions, shrinking the set of eligible correspondences to features 402 and 404 only.

Figure 5:
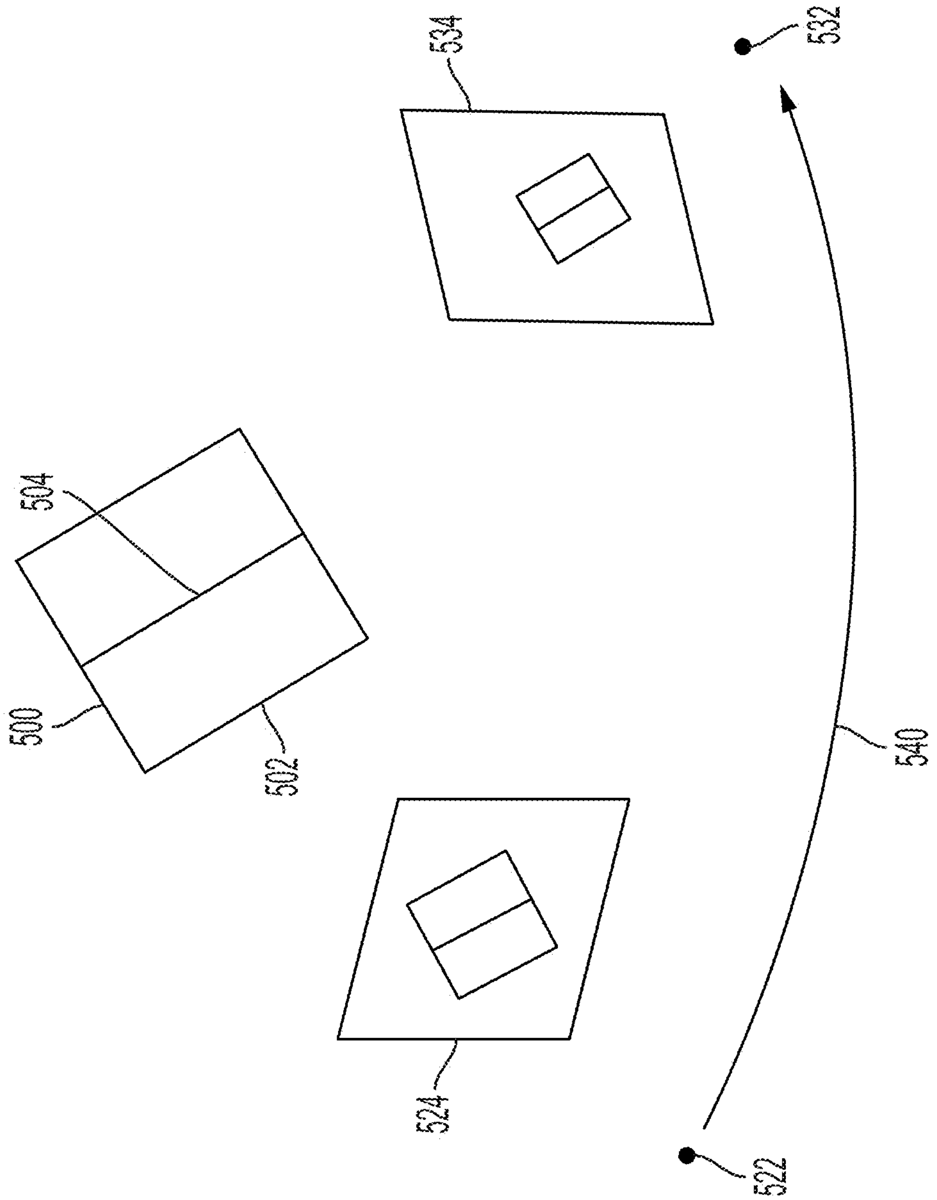
FIG. 5 illustrates an example of feature consistency across multiple aerial images.

This contrasts with aerial imagery that has an optical axis vector that will always have a common direction: towards the ground rather than parallel with. Because of this optical axis consistency in aerial imagery (or oblique imagery) whether from a satellite platform, high altitude aircraft, or low altitude drone, the wide baseline rotation problem of ground level images is obviated. Aerial and oblique images enjoy common correspondences across images as the subject consistently displays a common surface to the camera. In the case of building structures, this common surface is the roof. FIG. 5 illustrates this for subject roof 500 having features roofline 502 and ridgeline 504. FIG. 5 is a top plan view, meaning the imager is directly above the subject but one of skill in the art will appreciate that the principles illustrated by FIG. 5 apply to oblique images as well, wherein the imager is still above the subject but the optical axis is not directly down as in a top plan view. Because the view of aerial imagery is from above, the viewable portion of subject 502 appears only as an outline of the roof as opposed to the richer data of subject 400 for ground level images. As aerial camera position changes from position 522 to 532 by rotation 540, the view of subject roof 500 through either viewing pane 524 or 534 produces observation of the same features for correspondences.

It is critical then for 2D image inputs from ground level images to maximize the amount of data related to a subject, at least to facilitate correspondence generation for 3D reconstruction. In particular, proper framing of the subject to capture as many features as possible per image will maximize the opportunity that at least one feature in an image will have a correspondence in another image and allow that feature to be used for reconstructing the subject in 3D space.

In some embodiments, a target subject is identified within a camera's viewfinder or display (hereinafter referred to simply as a "display," and a bounding box is rendered around the subject. The bounding box may be a convex hull or quadrilateral otherwise that contains the subject. A pixel evaluator at the display's border may use a logic tool to determine whether pixels at or proximate to the display's boundary comprises the bounding box or not. A pixel value at the display boundary held by the bounding box indicates the subject is not fully in the camera's field of view. Corrective instructions can be displayed to the user, preferably concurrent with the camera's position but in some embodiments subsequent to a pixel evaluation at a given camera position, based on the pixel evaluation. For example, if the pixel evaluator detects bounding box values on the top border of the display, an instructive prompt to pan the camera upwards (either by translating or rotating or both) is displayed. If the pixel evaluator detects bounding box values at the upper and lower borders, then a prompt for the camera user to back up is displayed.

In some embodiments, a segmentation mask is applied to the display image. The segmentation mask may be trained separately to detect certain objects in an image. The segmentation mask may be overlaid on the image, and a pixel evaluator determines whether a segmentation pixel is present at the border of the display. In some embodiments, the pixel evaluator displays corrective instructions based on a threshold number of pixels. In some embodiments, the threshold number is a percentage of boundary pixels with a segmentation mask pixel relative to all other pixels along the boundary. In some embodiments, the threshold number is a function of a related pixel dimension of the segmented subject and the number of segmented pixels present at the display border.

These and other embodiments, and the benefits they provide, are described more fully with reference to the figures and detailed description.

Figure 6:
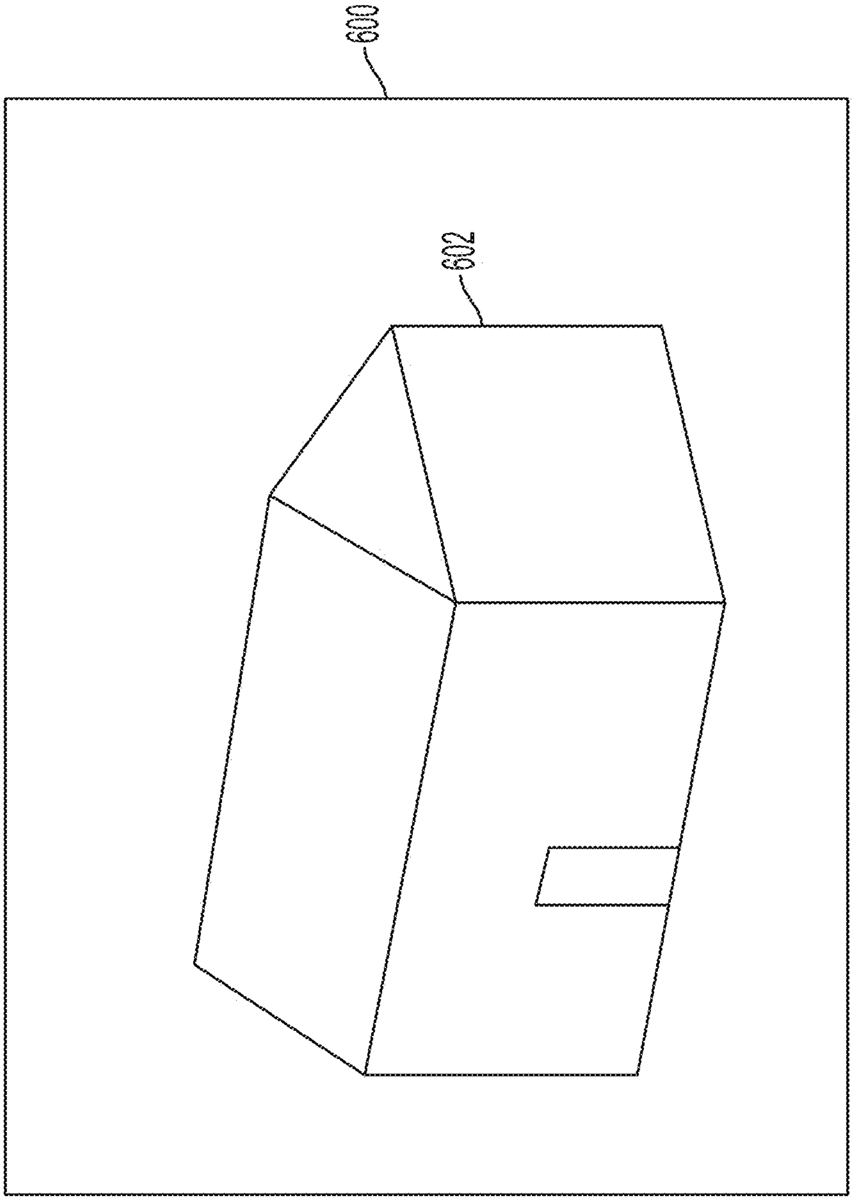
FIG. 6 illustrates an example of a framed subject in a camera display, according to certain aspects of the present disclosure.

FIG. 6 depicts display 600 with an image of subject 602 within. Display 600, in some embodiments, is digital display having a resolution of a number of pixels in a first dimension and a number of pixels in a second dimension. Display 600 may be a smartphone display, a desktop computer display or other display apparatuses. Digital imaging systems themselves typically use CMOS sensors, and a display coupled to the CMOS sensor visually represents the data collected on the sensor. When a capture event is triggered (such as through a user interface, or automatic capture at certain timestamps or events) the data displayed at the time of the trigger is stored as the captured image.

As discussed above, captured images vary in degree of utility for certain use cases. Techniques described herein provide displayed image processing and feedback to facilitate capturing and storing captured images with rich data sets.

In some embodiments, an image based condition analysis is conducted. Preferably this analysis is conducted concurrent with rendering the subject on the display of the image capture device, but in some embodiments may be conducted subsequent to image capture.

Figure 7:
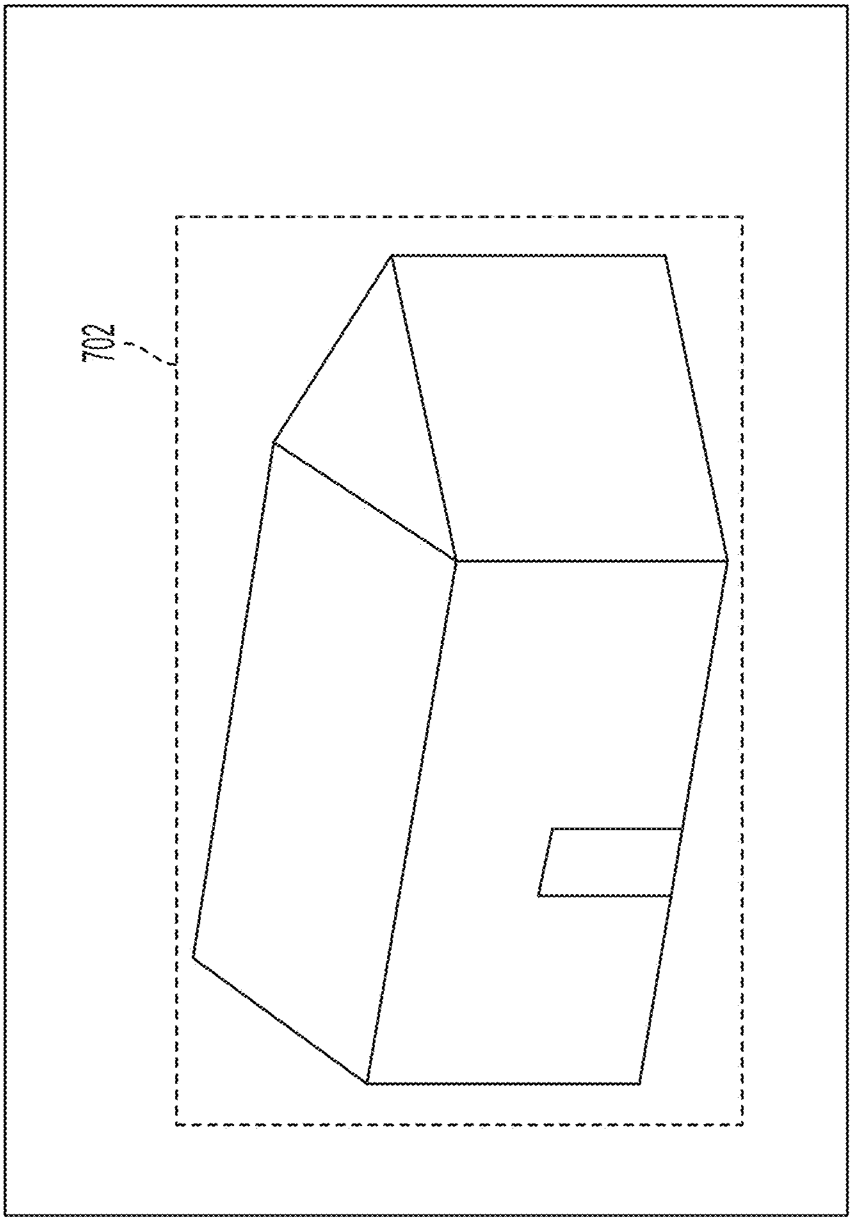
FIG. 7 illustrates an example of a bounding box disposed around a subject in a display, according to certain aspects of the present disclosure.

FIG. 7 illustrates the same display 600 and subject 602, but with a bounding box 702 overlaid on subject 602. In some implementations, bounding box 702 is generated about the pixels of subject 602 using tensor product transformations, such as a finite element convex function or Delauney triangulation. In some implementations, the bounding box is projected after a target location function is performed to identify the location of the subject in the display.

A bounding box is a polygon outline that contains at least all pixels of a subject within. In some embodiments, the bounding box is a convex hull. In some embodiments, and as illustrated in the figures, the bounding box is a simplified quadrilateral. In some embodiments, the bounding box is shown on display 600 as a line (bounding box 702 is a dashed representation for ease of distinction with other aspects in the figures; other visual cues of representations are within the scope of the invention). In some embodiments, the bounding box is rendered by the display but not shown, in other words the bounding box lines have a pixel value, but display 600 does not project these values.

Figure 8:
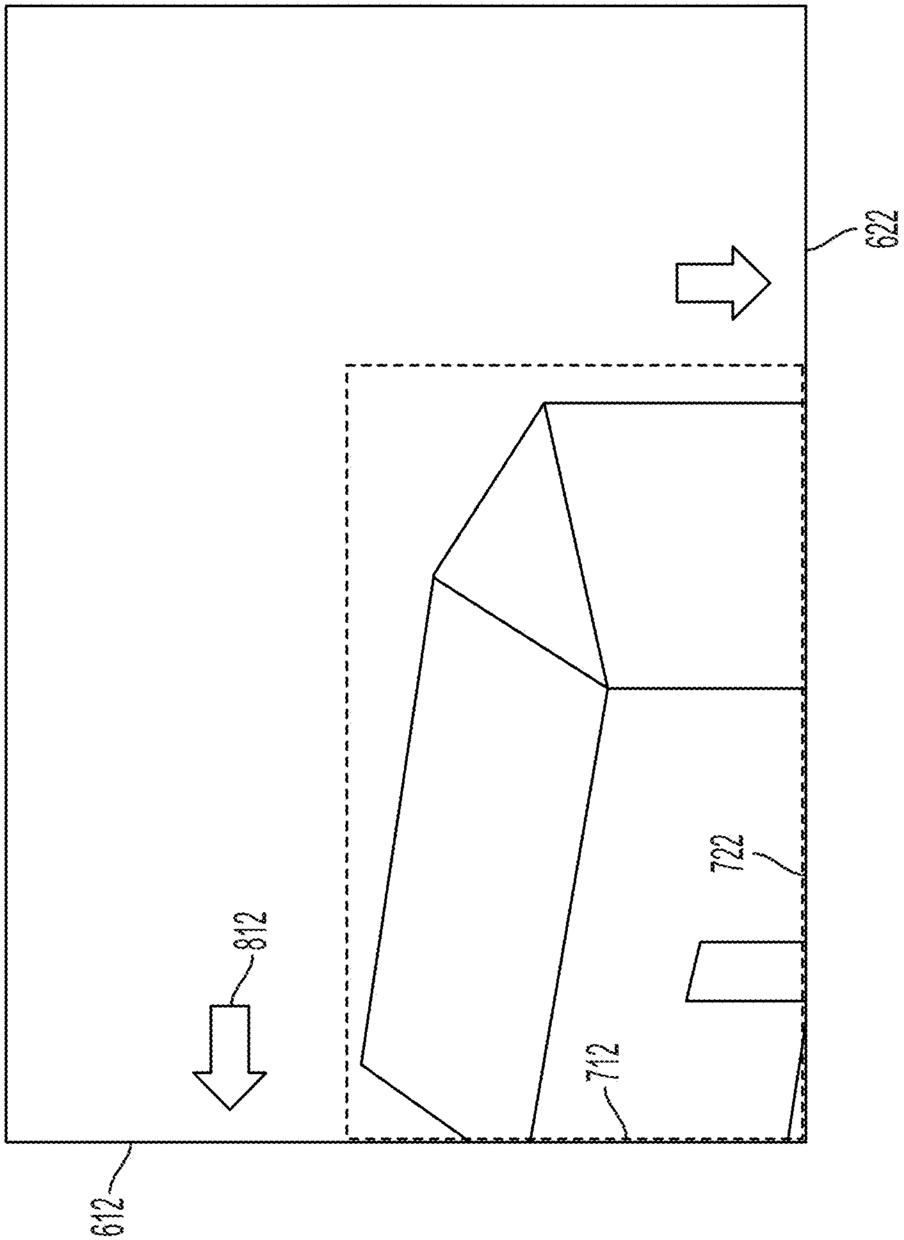
FIG. 8 illustrates an example of a subject that is not framed in a camera display, according to certain aspects of the present disclosure.

In FIG. 8, subject 602 is not centered in display 600. As such, certain features would not be captured in the image if the trigger event were to occur, and less than the full data potential would be stored. Bounding box 702 is still overlaid, but because the subject extends out of the display's boundaries, bounding box sides 712 and 722 coincide with display boundaries 612 and 622 respectively.

In some implementations, a border pixel evaluator runs a discretized analysis of a pixel value at the display 600 boundary. In the discretized analysis, the border pixel evaluator determines if a pixel value has a value held by the bounding box. In some embodiments, the display 600 rendering engine stores color values for a pixel (e.g. RGB) and other representation data such as bounding box values. If the border pixel evaluator determines there is a bounding box value at a border pixel, a framing condition is flagged and an instructive prompt is displayed in response to the location of the boundary pixel with the bounding box value.

For example, if the framing condition is flagged in response to a left border pixel containing a bounding box value, an instructive prompt to pan the camera to the left is displayed. Such instructive prompt may take the form of an arrow, such as arrow 812 in FIG. 8, or other visual cues that indicate attention to the particular direction for the camera to move. Panning in this sense could mean a rotation of the camera about an axis, a translation of the camera position in a plane, or both. In some embodiments, the instructive prompt is displayed concurrent with a border pixel value containing a bounding box value. In some embodiments, multiple instructive prompts are displayed. FIG. 8 illustrates a situation where the left display border 612 and bottom display border 622 have pixels that contain a bounding box value and have instructive prompts responsively displayed to position the camera such that the subject within the bounding box is repositioned in the display and no bounding box pixels are present at a display border.

In some implementations, a single bounding box pixel (or segmentation mask pixel as described below) at a boundary pixel location will not flag for instructive prompt. A string of adjacent bounding box or segmentation pixels is required to initiate a condition flag. In some embodiments, a string of at least eight consecutive boundary pixels with a bounding box or segmentation mask value will initiate a flag for an instructive prompt.

Figure 9:
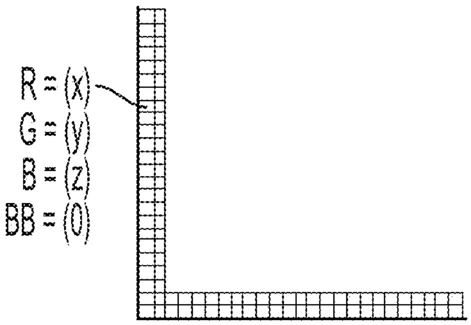
FIGS. 9-11 illustrate examples of boundary pixel relationships for instructive panning prompts on a display, according to certain aspects of the present disclosure.
Figure 10:
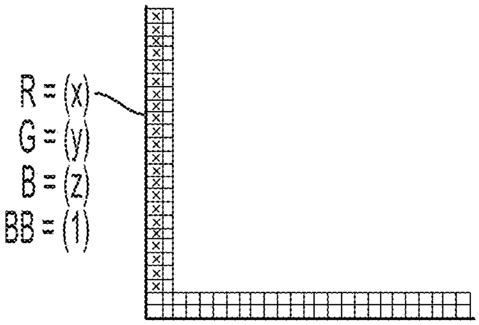
Figure 11:
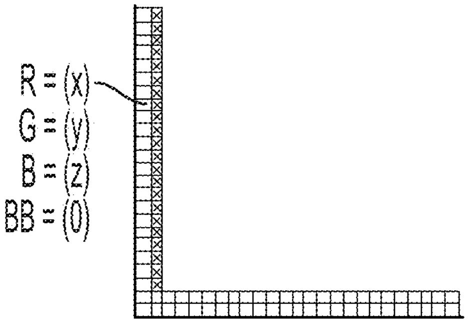

FIGS. 9-11 illustrates select rows and columns of display pixels adjacent a display border. A pixel value is depicted conveying the image information (RGB values as shown), as well as a field for a bounding box value. For exemplary purposes only, a "zero" value indicates the bounding box does not occupy the pixel. FIGS. 9-11 show only the first two lines of pixels adjacent the display border for ease of description. FIG. 10 illustrates a situation where a bounding box occupies pixels at the boundary of a display (as illustrated by the grayscale fill of the pixels, one of skill in the art will appreciate that image data such as RGB values may also populate the pixel). As shown, the bounding box value for the border pixel evaluator is "one." In some embodiments, the presence of a bounding box value of one at a display border pixel causes the corresponding instructive prompt, and the prompt persists in the display as long as a border pixel or string of border pixels has a "one" value for the bounding box.

In some implementations, even when the border pixel value is "zero" the instructive prompt may display if there is a bounding box value in a pixel proximate to the border pixels. For example, in FIG. 11 the display pixels immediately adjacent to the border have a zero value for bounding box presence, but the next row of pixels comprise bounding box values. This may result from noisy input for the bounding box that may preclude precise pixel placement for the bounding box, or camera resolution may be so fine that slight camera motions could place a bounding box practically at the border, despite border pixels not explicitly holding a bounding box value. In some embodiments the instructive prompt will display if there is a bounding box value of "one" proximate to display boundary as in FIG. 11. In some embodiments the pixel separation for being proximate to a display boundary is less than two pixels, in some embodiments it is less than five pixels, in some embodiments it is less than ten pixels; in some embodiments, the threshold value is a percentage of the total display size. For example, if the display is x pixels wide, then the border pixels for evaluation is x/100 pixels and any bounding box value of "one" within that x/100 pixel area will trigger display of the instructive prompt.

Figure 12:
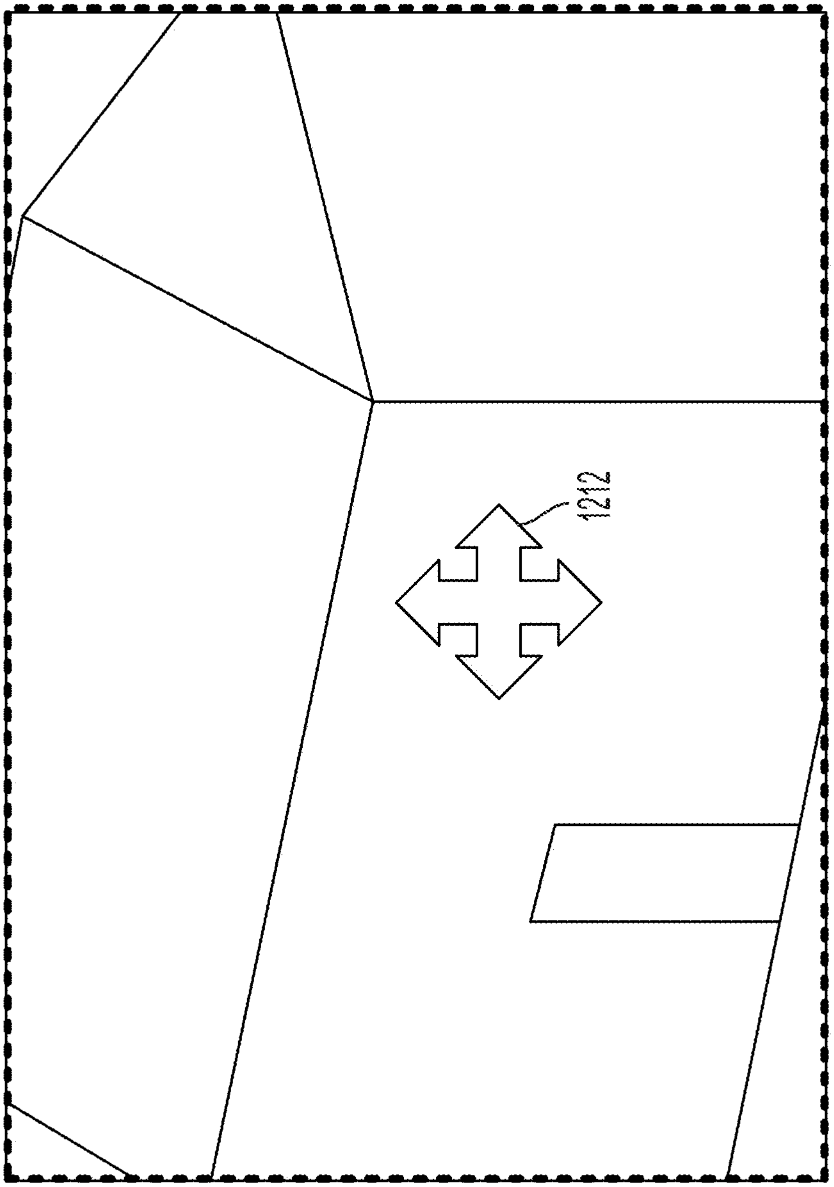
FIGS. 12-13 illustrate examples of instructive prompts for moving along an optical axis, according to certain aspects of the present disclosure.
Figure 13:
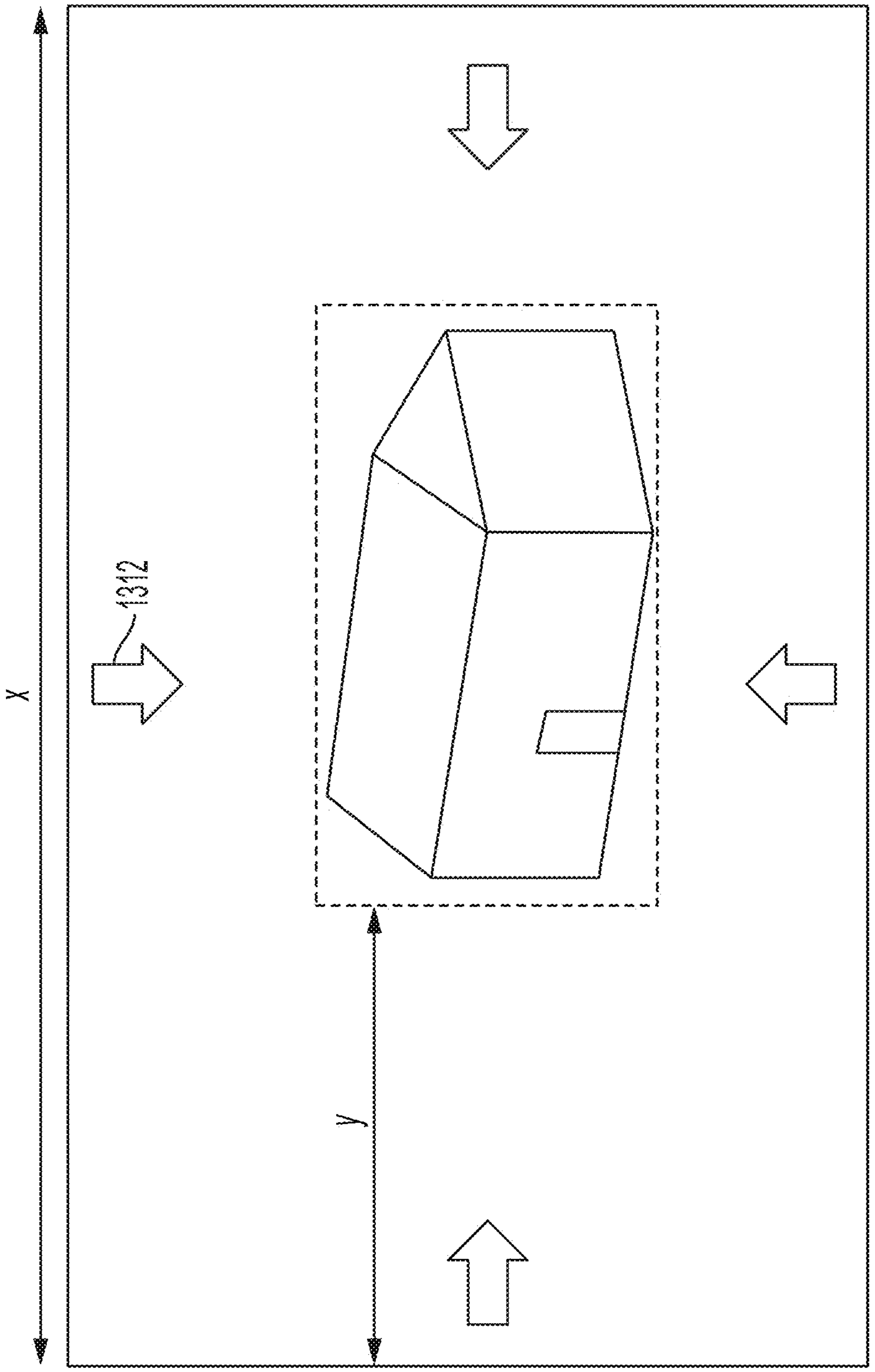

FIG. 12 illustrates a situation when the bounding box occupies all boundary pixel values, suggesting the camera is too close to the subject. Instructive prompt 1212 indicates the user should back up, though text commands or verbal commands are enabled as well. Conversely, FIG. 13 depicts a scenario where the bounding box occupies pixels far from the boundary and instructive prompts 1312 are directed to bringing the camera closer to the subject or to zoom the image closer. In determining whether a subject is too far from the camera, a relative distance of a bounding box value and a border pixel is calculated. For example, for a display x pixels wide, and a bounding box value around a subject occurs y pixels from a display boundary, a ratio of x:y is calculated. Smaller ratios, such as less than 5:1 (i.e. for a 1064 pixel wide display, the bounding box displays less than 213 pixels from a display border) would not trigger instructive prompt 1312 for a closer subject capture. Various other sensitivities could apply, such that larger or smaller ratios to achieve the intended purpose for the particular use or camera are enabled. Unlike depth of field adjustments in photography, which prompts camera position changes to position subjects in a camera's (or cameras) focal plane, placement prompts as described herein relate to changes to position the subject in the camera's display.

The interaction between a closer subject capture as described in relation to FIG. 13 and a border threshold as described in FIG. 12 should also be considered. An overly large border threshold would prompt the user or camera to back up (as the bounding box is more likely to abut a larger buffer region around the display boundaries), perhaps so far that it triggers the closer subject prompts to simultaneously instruct the user or camera to get closer. In some embodiments, a mutual threshold value for the display is calculated. In some embodiments, the mutual threshold value is a qualitative score of how close a bounding box is to boundary separation threshold. The closer subject prompt then projects a feedback for how close a bounding box edge is to the separation threshold; the separation threshold value, then, is an objective metric for the closer subject prompt to measure against.

Figure 14:
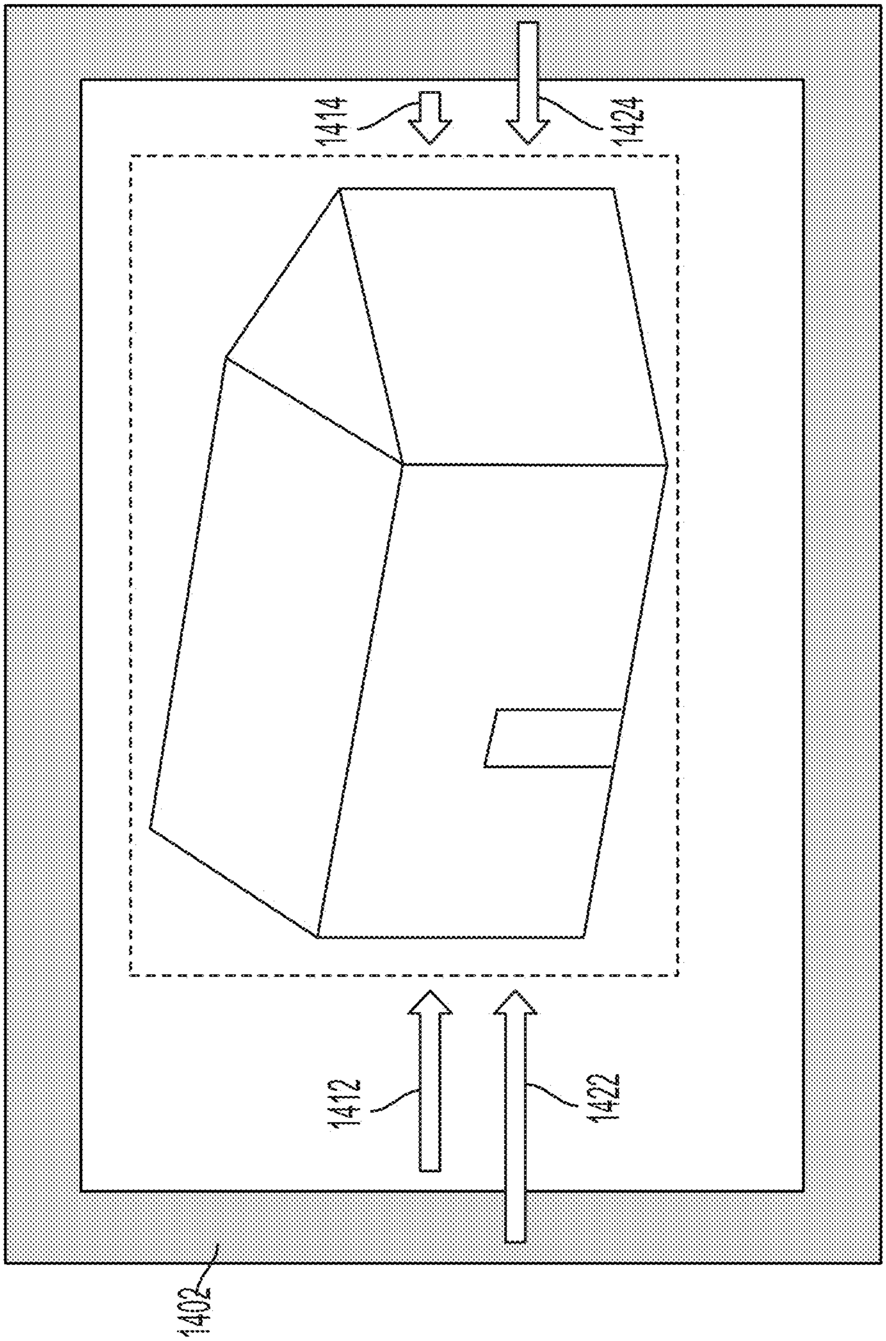
FIG. 14 illustrates an example of a boundary threshold relationship with a subject framing, according to certain aspects of the present disclosure.

FIG. 14 illustrates a sample display balancing the close and far competing distances with a mutual threshold value. FIG. 14 depicts boundary threshold region 1402, indicating that any bounding box values at pixels within the region 1402 implies the camera is too close to the subject and needs to be distanced farther to bring the subject farther from the display borders. In some embodiments, an instructive prompt 1412 or 1414 indicates the distance of a bounding box value to the threshold region 1402, and ratios as discussed with reference to FIG. 13 are made as to the display area within threshold region 1402 and not the overall display size. Similarly, in some embodiments there is no threshold region and the prompts 1422 and 1424 indicate the degree the camera should be adjusted to bring the subject more within the display boundaries directly. It will be appreciated that prompts 1412, 1414, 1422 and 1424 are dynamic in some embodiments, and may adjust in size or color to indicate suitability for the subject within the display. Though not pictured, status bars ranging from red (the bounding box is far from a boundary or threshold region) or green (the bounding box is near or at the display boundary or threshold region) are within the scope of invention, and not just the arrows as illustrated in FIG. 14.

In the context of "close" and "far," in some embodiments, a bounding box within five percent (as measured against the display's overall pixel dimension in a given direction) from the boundary or threshold region may be "close" while distances over twenty percent may be "far," with intermediate indicators for ranges in between.

Figure 15:
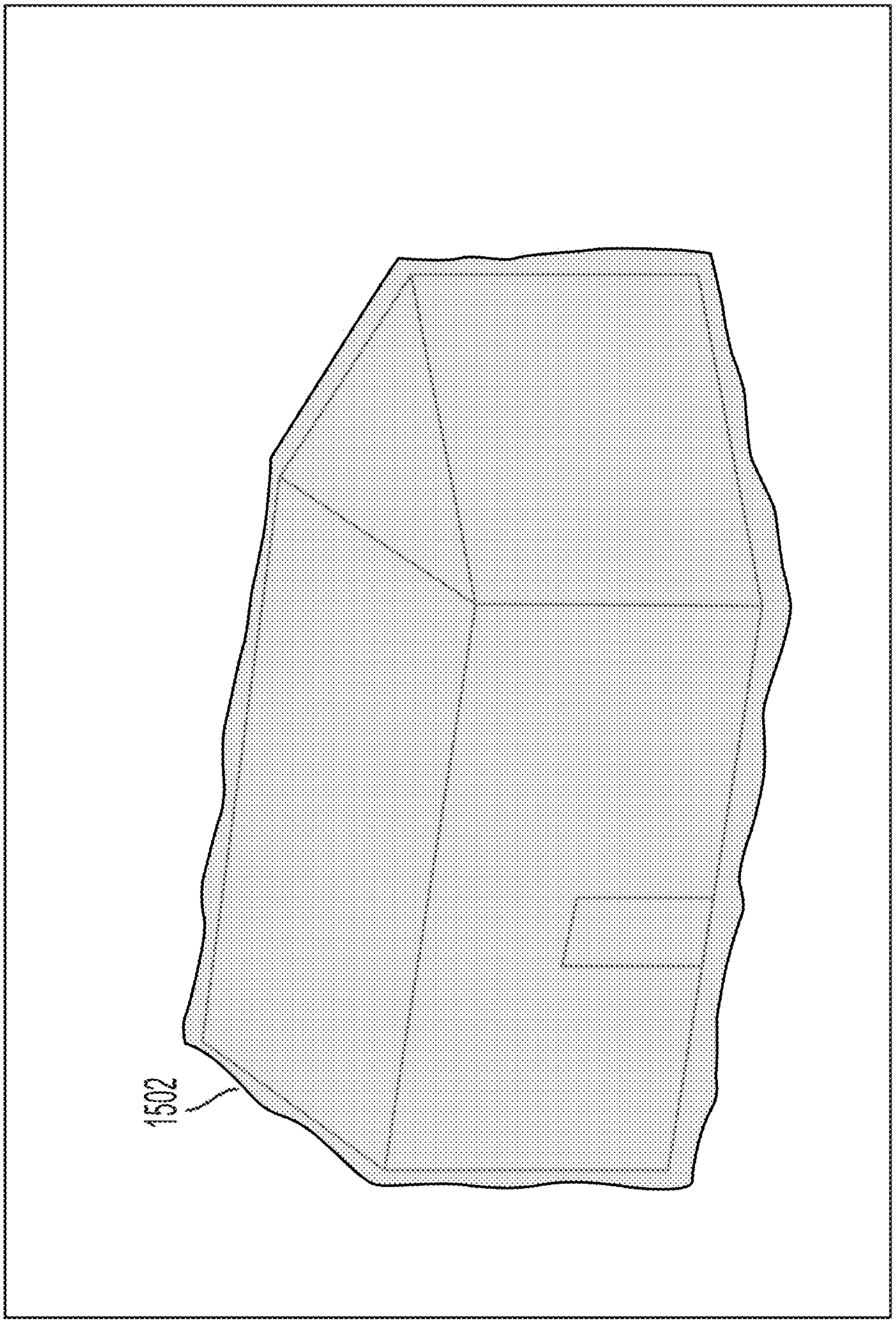
FIG. 15 illustrates an example of a segmentation mask overlaid on a subject, according to some embodiments.

While bounding boxes are a simple and straightforward tool for analyzing an image position within a display, segmentation masks may provide more direct actionable feedback. FIG. 15 illustrates a segmentation mask 1502 overlaid on subject 602. Segmentation mask 1502 may be generated by a classifier or object identification module of an image capture device; MobileNet is an example of a classifier that runs on small devices. The classifier may be trained separately to identify specific objects within an image and provide a mask to that object. The contours of a segmentation mask are typically irregular at the pixel determination for where an object begins and the rest of the scene ends and can be noisy. As such, mask 1502 need not be, and rarely is, a perfect overlay of subject 602.

This noisy overlay still provides a better approximation of the subject's true presence in the display. While a bounding box ensures all pixels of a subject are within, there are still many pixels within a bounding box geometry that do not depict the subject.

Figure 16:
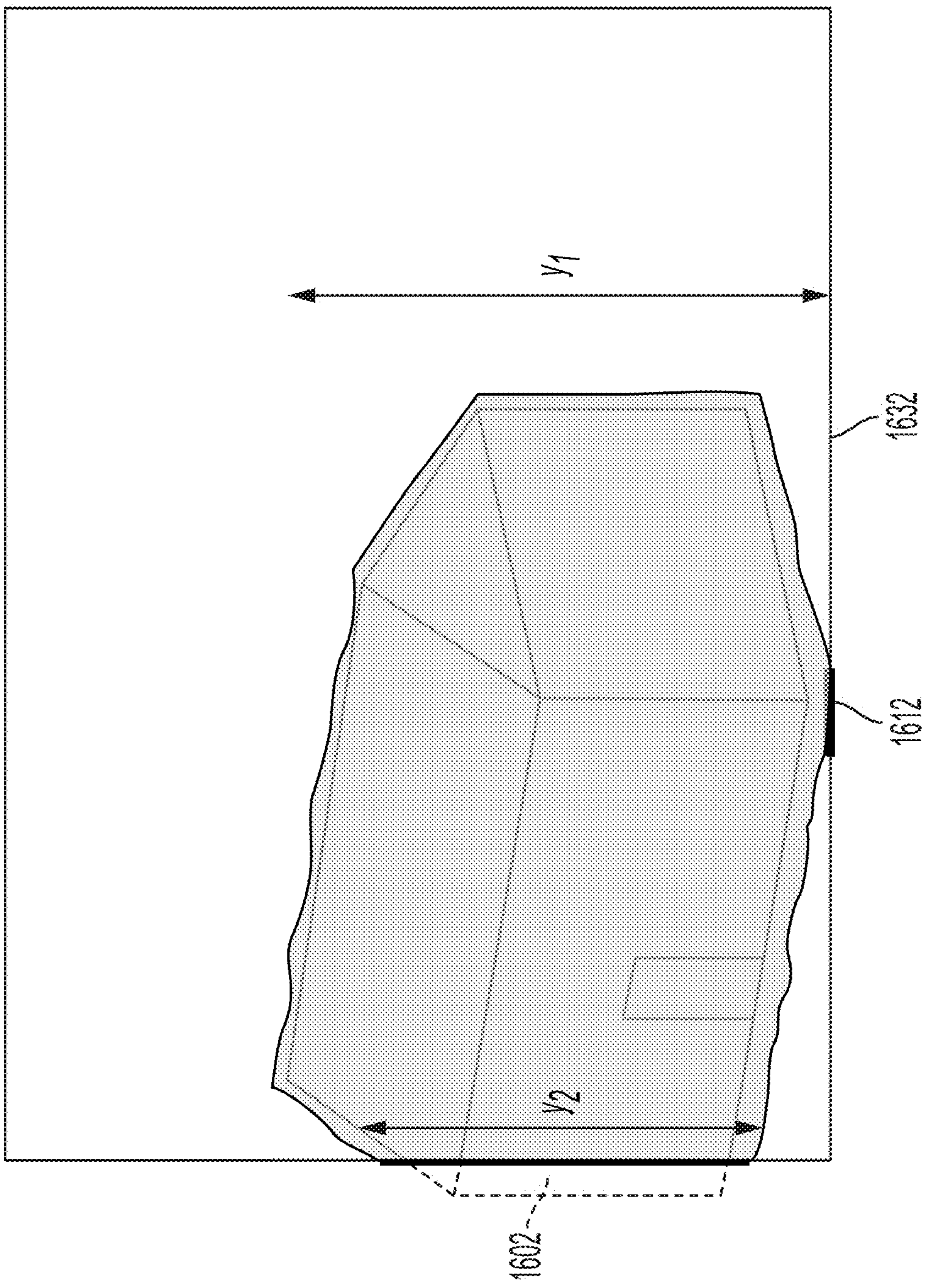
FIG. 16 illustrates an example of a subject with a segmentation mask extending outside the boundary of a display, according to certain aspects of the present disclosure.

For example, in FIG. 16, only a small portion 1602 of subject 602 is outside the left boundary, and only a mask portion 1612 is at the lower boundary (the subject geometry is actually within the display). In some embodiments, a pixel evaluator may use the segmentation values elsewhere in the image to determine whether to generate instructive prompts.

For example, as in FIG. 16, if the mask portion 1612 that is along display border 1632 is only twenty pixels long and the entire display width is 1064 pixels, then no instructive prompts need to be displayed as the minimal information in the portion outside of the display is unlikely to generate additional robust data. In some embodiments, this percentage tolerance is less than 1% of display pixel dimensions, in some embodiments it is less than 5%, in some embodiments it is less than 10%.

Looking to the left boundary, where portion 1602 is outside the display boundary, additional image analysis determinations can indicate whether instructive prompts are appropriate. A pixel evaluator can determine a height of the segmentation mask, such as in pixel height $y_1$ depicted in FIG. 16. The pixel evaluator can similarly calculate the dimension of portion 1602 that is along a border, depicted in FIG. 16 as $y_2$. A relationship between $y_1$ and $y_2$ indicates whether camera adjustments are appropriate to capture more of subject 602. While percentage of pixels relative to the entire display, such as described in relation to mask portion 1612 above are helpful, percentage of pixels relative to the subject can be utilized information as well.

In some embodiments, a ratio of subject dimension $y_1$ and boundary portion $y_2$ are compared. In some embodiments, a ratio of less than 5:1 (meaning subject height is more than five times the height of the portion at the display boundary) then no instructive prompts are displayed. Use cases and camera resolutions may dictate alternative ratios.

Figure 17:
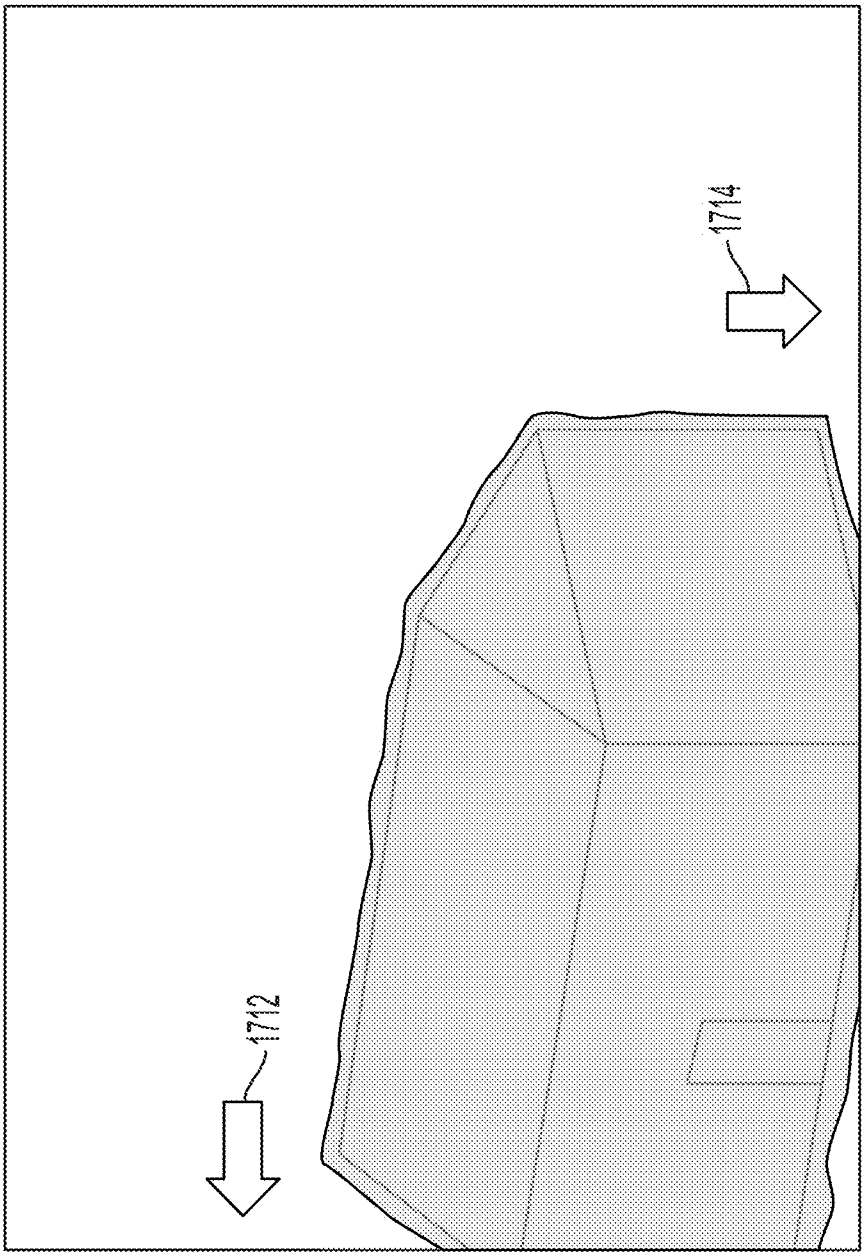
FIG. 17 illustrates an example of an instructive panning prompts on a display, according to certain aspects of the present disclosure.

FIG. 17 illustrates similar instructive prompts for directing camera positions as described for bounding box calculations in FIG. 8. Segmentation mask pixels along a left display boundary generate instructive prompt 1712 to pan the camera to the left, and segmentation mask pixels along the lower display boundary generate instructive prompt 1714 to pan the camera down. Though arrows are shown, other instructive prompts such as status bars, circular graphs, audible instructions, and text instructions are also possible.

In some embodiments, whether instructive prompts for bounding boxes or segmentation masks, they are presented on the display as long as a boundary pixel value contains a segmentation or bounding box value. In some embodiments, the prompt is transient, only displaying for a time interval so as not to clutter the display with information other than the subject and its framing. In some embodiments, the prompt is displayed after image capture, and instead of the pixel evaluator working upon the display pixels it performs similar functions as described herein for captured image pixels. In such embodiments, prompts are then presented on the display to direct a subsequent image capture. This way, the system captures at least some data from the first image, even if less than ideal. Not all camera positions are possible, for example if backing up to place a subject in frame requires the user to enter areas that are not accessible (e.g., private property, busy streets) then it is better to have a stored image with at least some data rather than continually prompt camera positions that cannot be achieved and generate no data as a result.

Figure 18A:
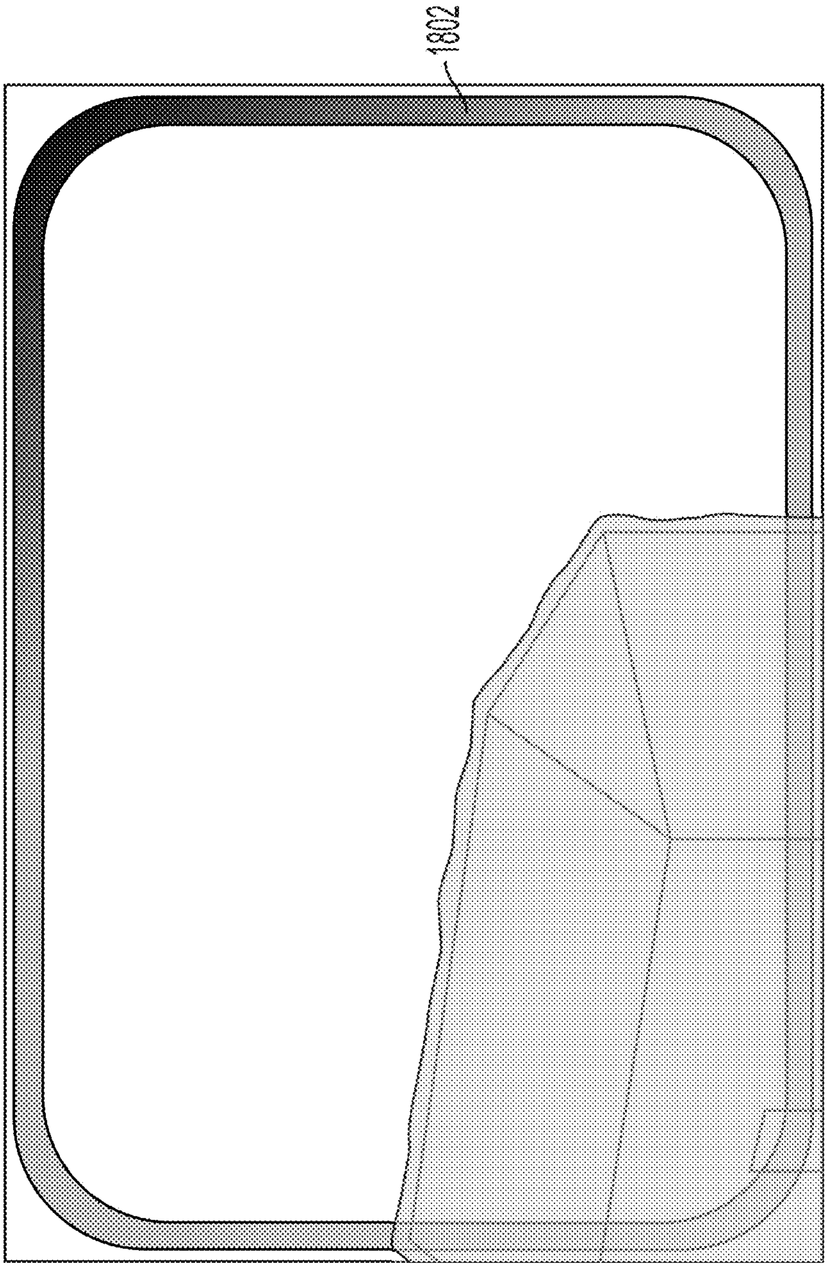
FIGS. 18A-18E illustrate examples of progress bar status indicators for subject positioning in a display, according to certain aspects of the present disclosure.
Figure 18B:
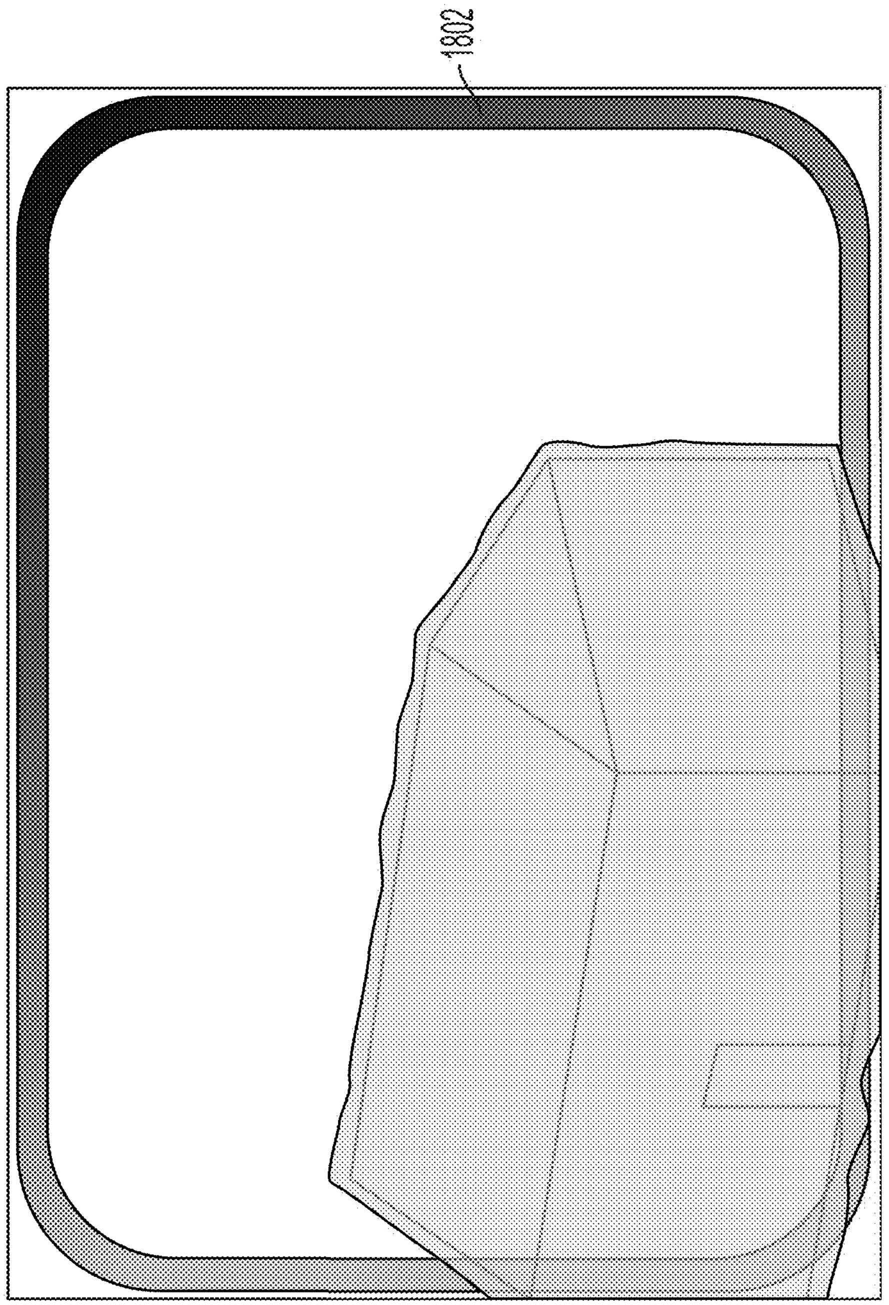
Figure 18C:
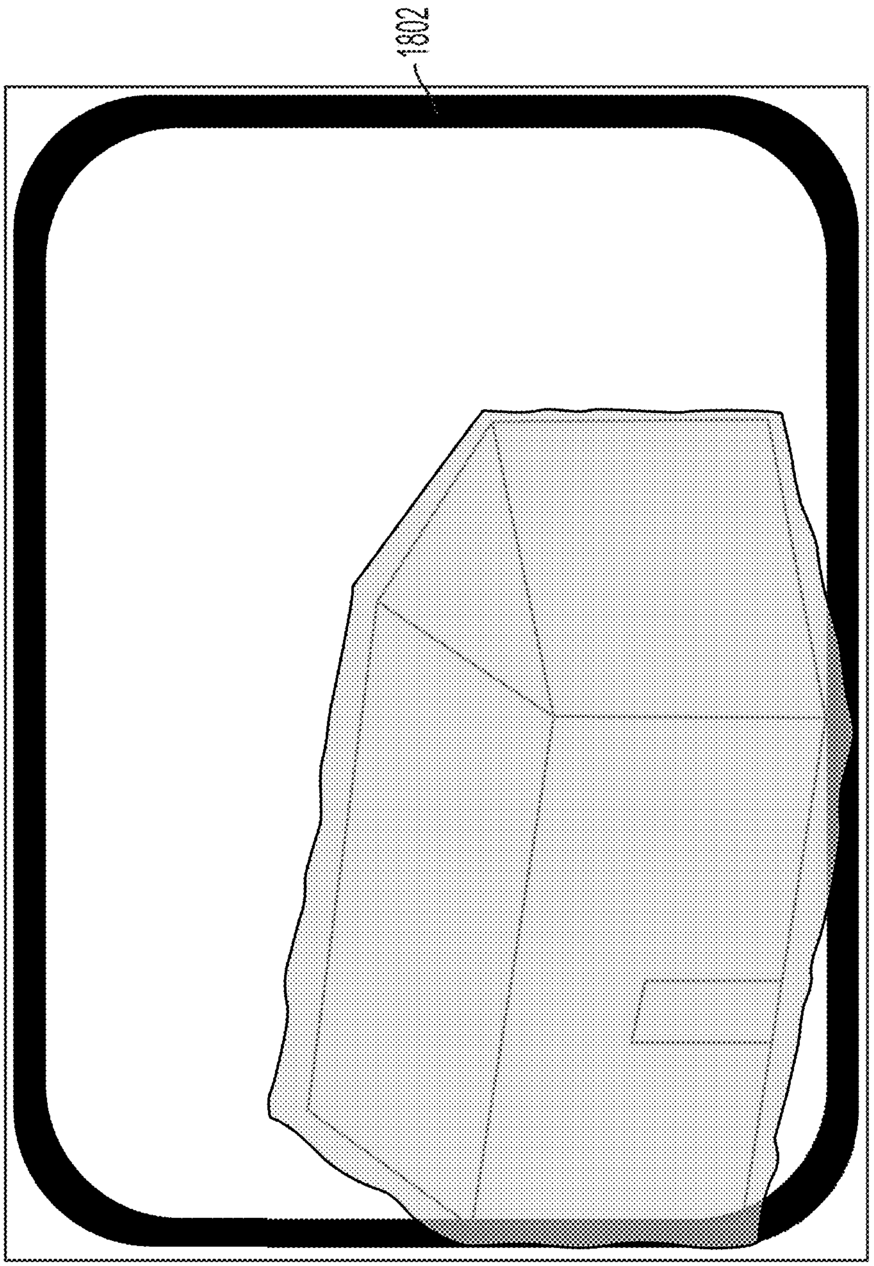

FIGS. 18A-18C illustrate an alternative instructive prompt, though this and the arrows depicted in previous figures are no way limiting on the scope of feedback prompts. FIGS. 18A-18C show progressive changes in a feedback status bar 1802. In FIG. 18A, subject 602 is in the lower left corner. Status bar 1802 is a gradient bar, with the lower and left portions not filled as the camera position needs to pan down and to the left. As the camera position changes, in FIG. 18B, the status bar fills in to indicate the positional changes are increasing the status bar metrics until the well positioned camera display in FIG. 18C has all pixels of subject 602 and the status bar is filled. Note that while FIGS. 18A-18C depict instructive prompt relative to a segmentation mask for a subject, this prompt is equally applicable to bounding box techniques as well.

Figure 18D:
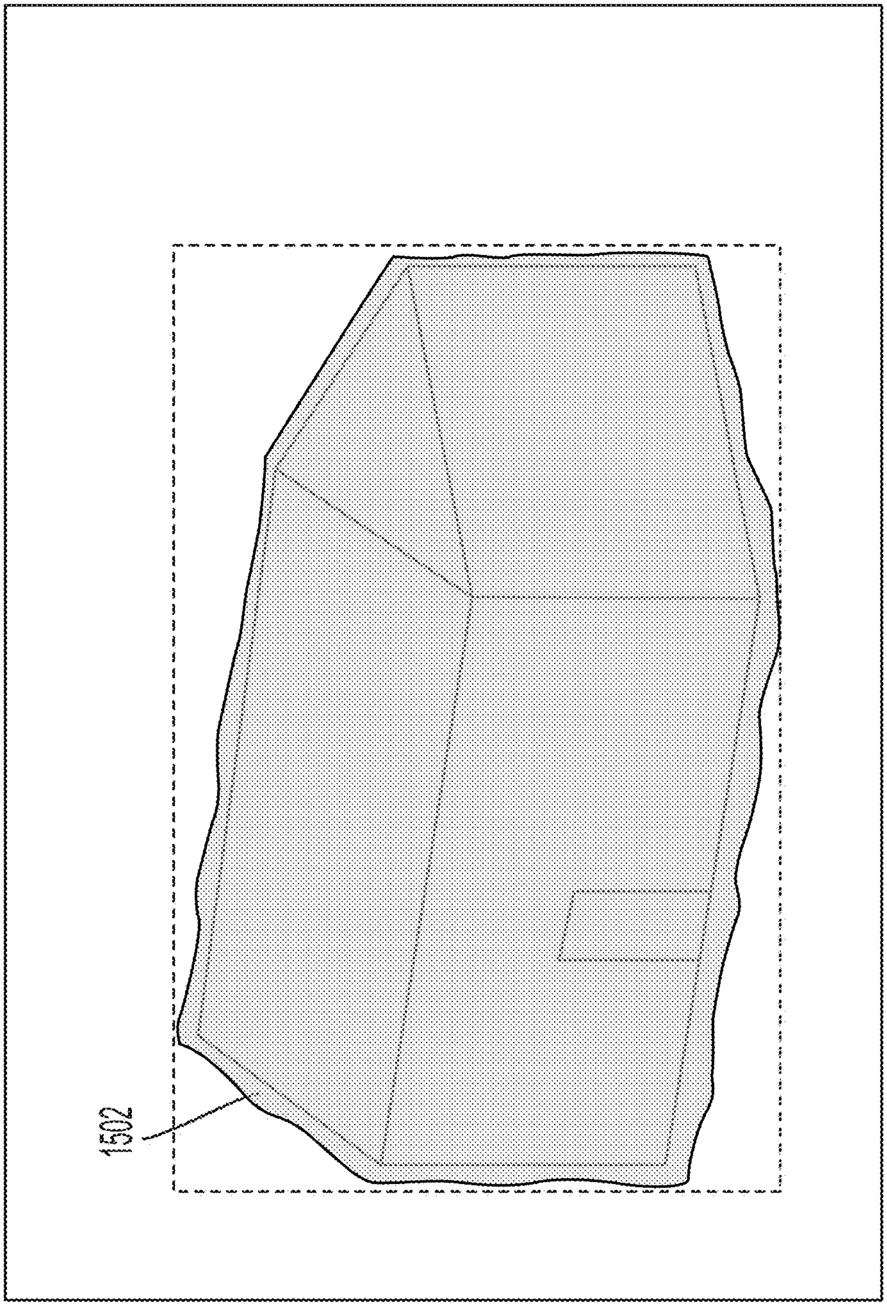

In some embodiments, the segmentation mask is used to determine a bounding box size, but only the bounding box is displayed. An uppermost, lowermost, leftmost, and rightmost pixel, relative to the display pixel arrangement is identified and a bounding box drawn such that the lines tangentially intersect the respective pixels. FIG. 18D illustrates such an envelope bounding box, depicted as a quadrilateral, though other shapes and sizes are possible. In some embodiments, therefore, envelope bounding boxes are dynamically sized in response to the segmentation mask for the object in the display. This contrasts with fixed envelope bounding boxes for a predetermined objects with known sizes and proportions. FIG. 18D depicts both a segmentation mask and bounding box for illustrative purposes; in some embodiments only one or the other of the segmentation mask or bounding box are displayed. In some embodiments, both the segmentation mask and bounding box are displayed.

Figure 18E:
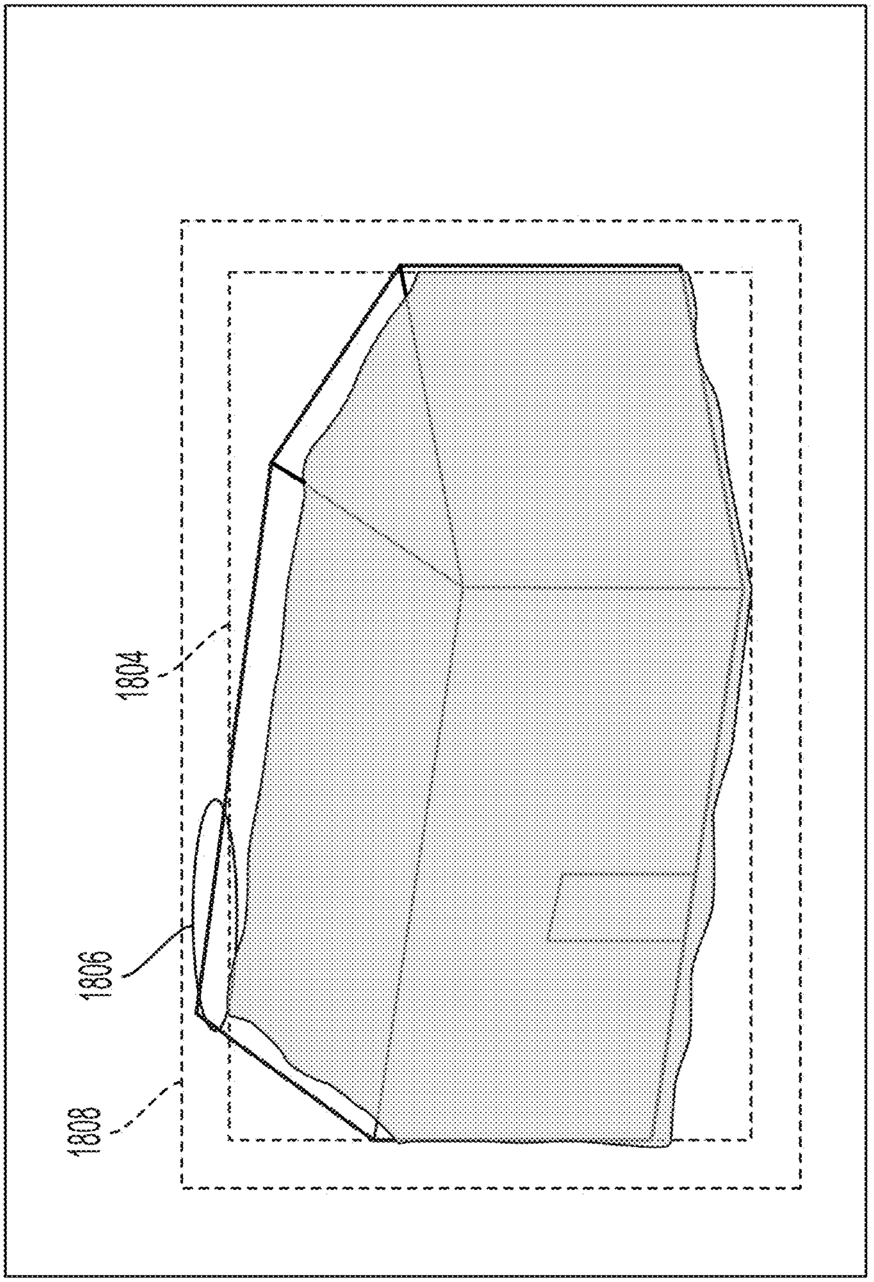

In some embodiments, a bounding box envelope fit to a segmentation mask includes a buffer portion, such that the bounding box does not tangentially touch a segmentation mask pixel. This reduces the impact that a noisy mask may have on accurately fitting a bounding box to the intended structure. FIG. 18E illustrates such a principle. Bounding box envelope 1804 is fit to the segmentation mask pixel contours to minimize the amount of area within that is not a segmented pixel. In doing so, region 1806 of the house is outside the bounding box. Framing optimizations for the entire home may fail in such a scenario: it is possible for region 1806 to be outside of the display, but the bounding box indicates that the subject is properly positioned. To prevent this, an overfit envelope 1808 is fit to the segmentation mask, such that the height and width of the bounding box envelope is larger than the height and width of the segmentation mask to minimize the impact of noise in the mask. In some embodiments, the overfit envelope is ten percent larger than the segmentation mask. In some embodiments the overfit envelope is twenty percent larger than the segmentation mask.

Figure 19:
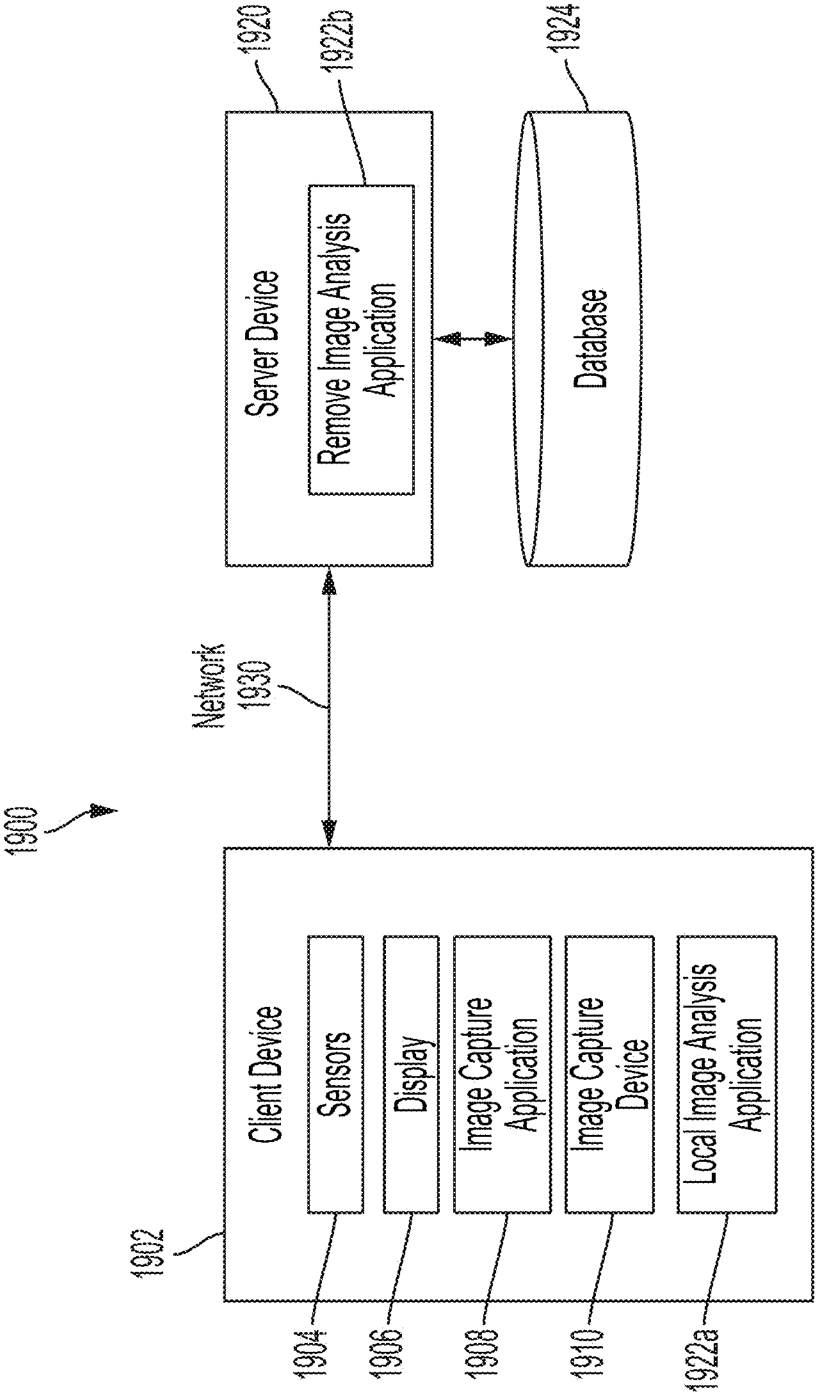
FIG. 19 illustrates an example of a guided image capture system configuration, according to certain aspects of the present disclosure.

FIG. 19 illustrates an example system 1900 for capturing images for use in creating 3D models. System 1900 comprises a client device 1902 and a server device 1920 communicatively coupled via a network 1930. Server device 1920 is also communicatively coupled to a database 1924. Example system 1900 may include other devices, including client devices, server devices, and display devices, according to embodiments. For example, a plurality of client devices may be communicatively coupled to server device 1920. As another example, one or more of the services attributed to server device 1920 herein may run on other server devices that are communicatively coupled to network 1930.

Client device 1902 may be implemented by any type of computing device that is communicatively connected to network 1930. Example implementations of client device 1902 include, but is not limited to, workstations, personal computers, laptops, hand-held computer, wearable computers, cellular or mobile phones, portable digital assistants (PDA), tablet computers, digital cameras, and any other type of computing device. Although a single client device is depicted in FIG. 19, any number of client devices may be present.

In FIG. 19, client device 1902 comprises sensors 1904, display 1906, image capture application 1908, image capture device 1910, and local image analysis application 1922*a*. Client device 1902 is communicatively coupled to display 1906 for displaying data captured through a lens of image capture device 1910. Display 1906 may be configured to render and display data to be captured by image capture device 1910. Example implementations of a display device include a monitor, a screen, a touch screen, a projector, a light display, a display of a smartphone, tablet computer or mobile device, a television, and etc.

Image capture device 1910 may be any device that can capture or record images and videos. For example, image capture device 1310 may be a built-in camera of client device 1902 or a digital camera communicatively coupled to client device 1902.

According to some embodiments, client device 1902 monitors and receives output generated by sensors 1904. Sensors 1904 may comprise one or more sensors communicatively coupled to client device 1902. Example sensors include, but are not limited to CMOS imaging sensors, accelerometers, altimeters, gyroscopes, magnetometers, temperature sensors, light sensors, and proximity sensors. In an embodiment, one or more sensors of sensor 1904 are sensors relating to the status of client device 1902. For example, an accelerometer may sense whether computing device 1902 is in motion.

One or more sensors of sensors 1904 may be sensors relating to the status of image capture device 1910. For example, a gyroscope may sense whether image capture device 1910 is tilted, or a pixel evaluator indicating the value of pixels in the display at certain locations.

Local image analysis application 1922*a* comprises modules and instructions for conducting bounding box creation, segmentation mask generation, and pixel evaluation of the subject, bounding box or display boundaries. Local image analysis application 1922*a* is communicatively coupled to display 1906 to evaluate pixels rendered for projection.

Image capture application 1908 comprises instructions for receiving input from image capture device 1910 and transmitting a captured image to server device 1920. Image capture application 1908 may also provide prompts to the user while the user captures an image or video, and receives data from local image analysis application 1922*a* or remote image analysis application 1922*b*. For example, image capture application 1308 may provide an indication on display 1306 of whether a pixel value boundary condition is satisfied based on an output of local image analysis application 1922*a*. Server device 1920 may perform additional operations upon data received, such as storing in database 1924 or providing post-capture image analysis information back to image capture application 1908.

In some embodiments, local or remote image analysis application 1922*a* or 1922*b* are run on Core ML, as provided by iOS or Android equivalents; in some embodiments local or remote image analysis application 1922*a* or 1922*b* are run on TensorFlow.

Figure 20:
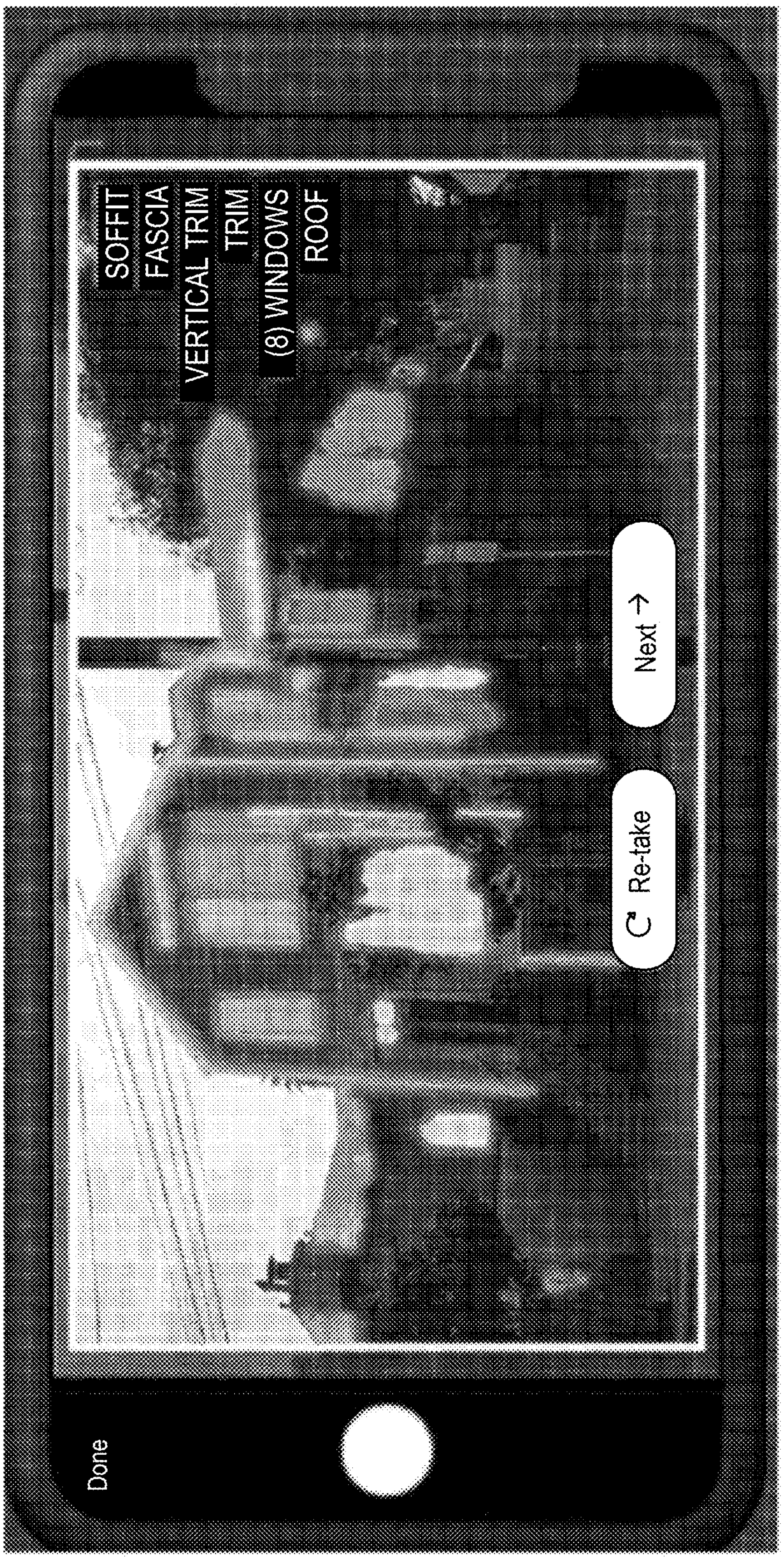
FIG. 20 illustrates an example of classification data applied to a captured image, according to certain aspects of the present disclosure.

Referring to FIG. 20, an image subject to a directed capture process is shown having undergone additional segmentation classification steps. With the image capture device able to capture more of the subject in a single frame, that single frame enable additional labeling data. In the example shown, second order details such as soffit, fascia and trim of a subject home are identified. Poorly framed images do not provide sufficient input to such classifiers, and limit the scope of information that may be displayed to a user.

Figure 21A:
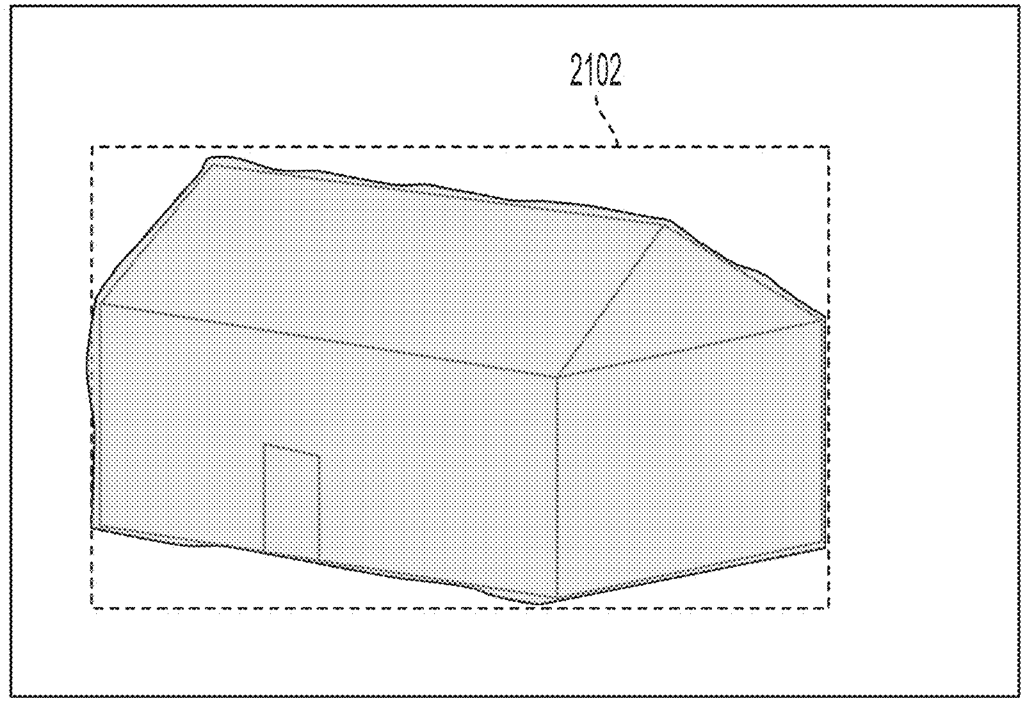
FIGS. 21A-21B illustrate an example of a bounding box envelope changes incident to segmentation mask changes, according to certain aspects of the present disclosure.

FIG. 21A illustrates the bounding box envelope around a segmentation mask as previously displayed in FIG. 18D. The bounding box 2102 is sized such that the segmentation mask fits within its contours. Segmentation is a process of evaluating pixels for association with a particular class. In segmenting images in a camera display, several factors may impact the ability of a classifier to properly segment a pixel; lighting and ambient conditions, contrast within the image, quality of the classifier or the imager and its sensors, computational resources, frame rate, occlusions, and motions of the camera are among the common factors affecting a classifier's ability to segment pixels.

For stationary objects, other factors being equal, pixel variation can largely be attributed to camera motion. For example, a user holding a camera will invariably impart some degree of motion into the camera (no human is rigid). Even in cameras stabilized with tools such as tripods or the like, slight scene motions such as moving leaves near the house or flags waving or the other aforementioned factors will introduce image "noise" in predicting pixel values of stationary objects.

Figure 21B:
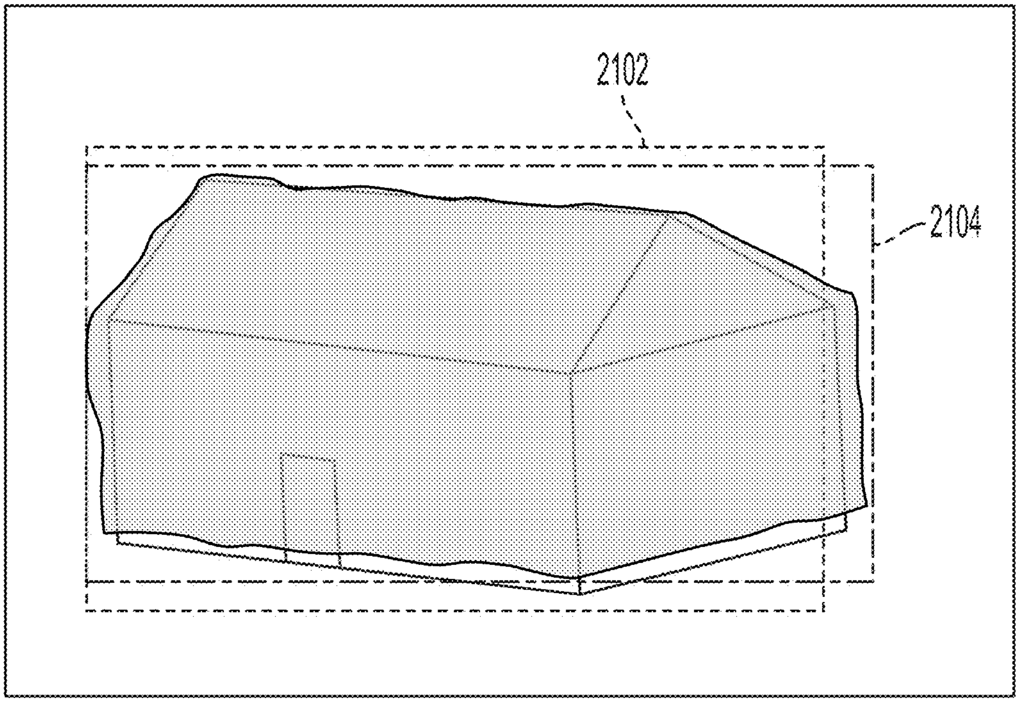
Figure 22:
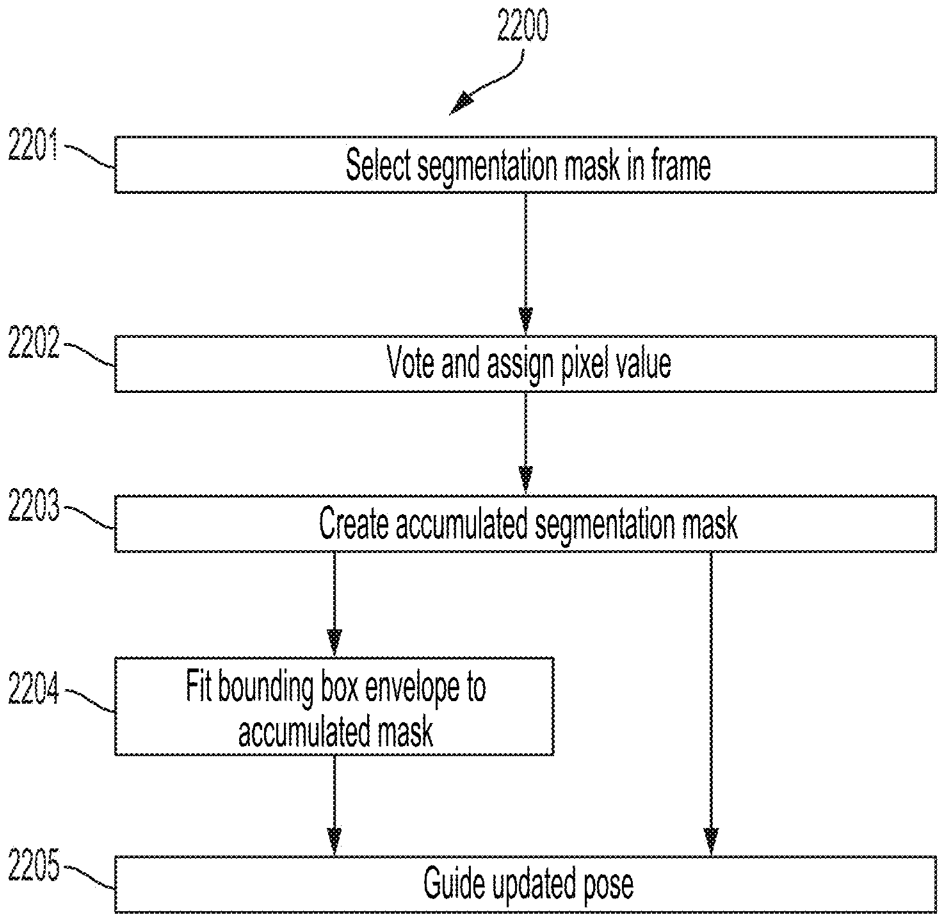
FIG. 22 illustrates an exemplary method for smoothing a segmentation mask for stable bounding box envelope fitting and guiding instructive prompts, according to certain aspects of the present disclosure.

FIG. 21B illustrates such a change in segmentation mask output relative to that in FIG. 21A. In FIG. 21B, whether from camera motion inducing a slight change in the object house's position, scene noise, or model latency, or otherwise, the pixels at the edges of the house silhouette are not perfectly aligned with the pixels of the mask. The model predicts a pixel value inconsistent with the true value in that frame. This results in a new bounding box envelope 2104 for the same object house. If the envelopes 2102 and 2104 are displayed in successive frames, for example, it manifests as "jitter" and may lead to confusion as to whether the bounding box is actually or accurately associated with the house as intended.

In addition to user confusion, erratic pixels or spurious outliers in segmentation mask predictions impose additional computational resources to perform computer vision processes upon; denoising a segmentation mask over a temporal window of frames improves model operation, especially on mobile platforms that typically employ lightweight networks with limited bandwidth.

Further, instruction prompts for improved camera position are diminished with spatially drifting or shape-shifting segmentation masks or bounding boxes fit to those masks. For example, a pixel mis-classification near a display border may prompt an envelope bounding box to extend to the edge of the display, in turn prompting an erroneous instruction to move the camera to accommodate the incorrect boundary. Similarly, as described in relation to FIG. 12 and classified pixels present in embodiments where the bounding box is not the guidance element, erroneously segmented pixels at or near a display border may directly trigger incorrect instructive prompts even without a bounding box. Temporally stable segmentation masks (e.g., smoothed and denoised segmentation masks) and temporally stable bounding box fit for the target object associated with such masks, despite segmentation model noise or user motion are therefore desired.

Method 2200 illustrates an exemplary method for generating a smoothed segmentation mask or bounding box to an object in a camera display over a series of frames, thereby differentiating between segmented pixels that more accurately represent the classified object and those that only reflect spurious or transient segmentation. Though the examples provided are intended for a fixed position object, the techniques are applicable for moving objects (or moving imagers) and specific alternatives for such situations are described when appropriate.

At block 2201, an initial segmentation mask is identified or selected. This may be selection of the only mask in the frame, or selection among several candidate masks.

Figure 23A:
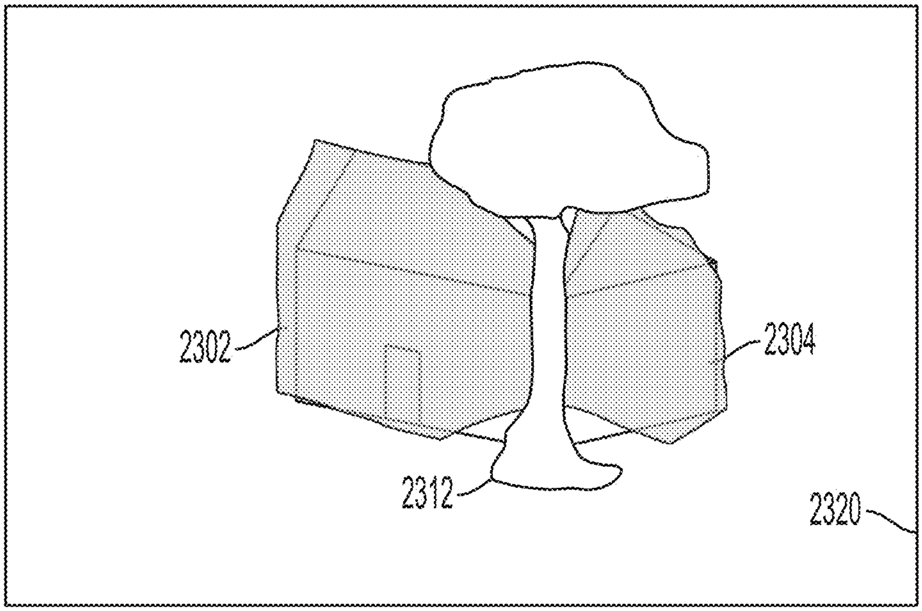
FIGS. 23A-23B illustrate an example of a small neighbor segmentation mask noise, according to certain aspects of the present disclosure.

In some embodiments, selection of a mask is based on position and size in a display. For example, even when there is only a single classified object in a display, a segmentation model can still produce several segmentation masks for that single object, such as from an occluding object dividing the mask into non-contiguous clusters. FIG. 23A illustrates this scenario, with two masks 2302 and 2304 both present for the single house in the frame, divided by occluding object tree 2312. These masks 2302 and 2304 may be referred to as "small neighbor" masks. In some embodiments, at block 2401, the largest segmentation mask among a plurality of small neighbors in the frame is selected. In some embodiments, the segmentation mask with a centroid closest to the center of the display is selected. Referring to FIG. 23A, neighbor mask 2302 is likely to be selected as the initial segmentation mask as its pixel area is larger compared to neighbor mask 2304, and its centroid is closer to the center of display 2320.

Figure 23B:
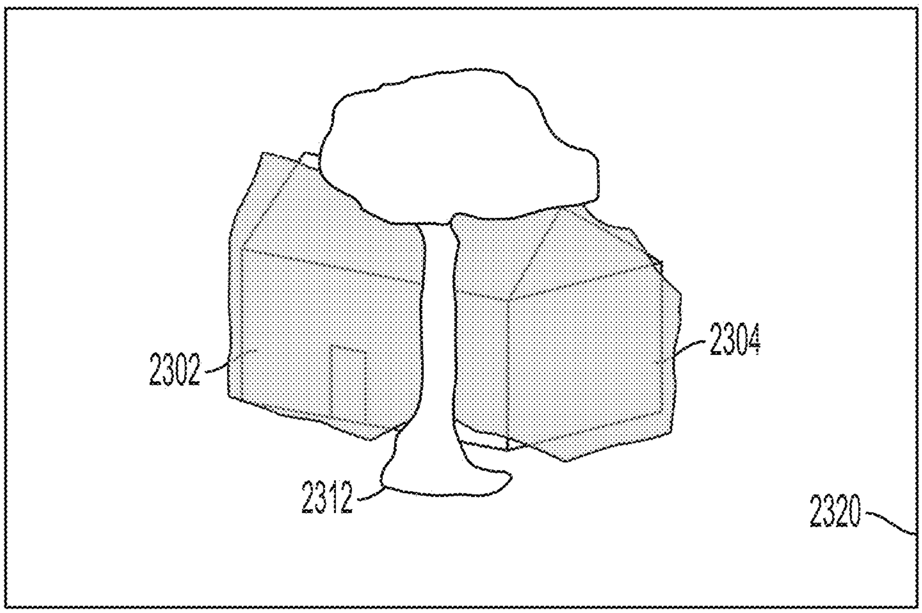

In some embodiments, selection of a mask is based on data from a previous frame. A segmentation mask, even a smallest neighbor mask, is selected based on presence or persistence frame-to-frame. In FIG. 23B, the image and camera display 2320 are in a subsequent position relative to that of FIG. 23A, producing a new perspective on the same scene due to the new pose. In FIG. 23B, occluding object 2312 still divides the house's segmentation into two neighbor masks, but now mask 2304 is larger and has a centroid closer to the center of display 2320. In some embodiments, the past historical prevalence of mask 2302, such as depicted in the hypothetical frame of FIG. 23A, will lead to its selection at block 2201 despite the instant frame prominence of mask 2304.

In some embodiments, relative position to other masks in a frame is used to identify relevant masks for selection in later frames. For example, mask 2302 falls on the left of mask 2304 within the display of FIGS. 23A and 23B. Relative position over frames indicates which frame to select; for example if mask 2302 is the dominant mask in FIG. 23A and falls on the left of mask 2304, then selection of a mask in a subsequent frame will automatically select the mask to the left of mask 2304

In some embodiments, shape consistency over frames is used to select masks in a frame. Classified objects can be predicted to have a certain silhouette; a segmentation mask for a car is unlikely to resemble a segmentation mask for a house. The system can pre-store expected mask shapes and select the mask, such as by a least squares error minimization, in a frame that most closely resembles that expected mask. In some embodiments, a mask shape that persists over multiple frames (does not change or wobble) is selected over masks that deform over a series of frames.

In some embodiments, mask selection is based on accumulated or prior frame persistence. For example, a mask in the frame at $t_0$ that is similarly in the display frames at $t_1$ and $t_2$ may be favored over masks present in the frame only at $t_2$.

It should be noted that the term "mask" may apply to an entire segmentation for a classified object (i.e. a cluster or group of pixels for that classification) or a single segmented pixel.

Figure 26:
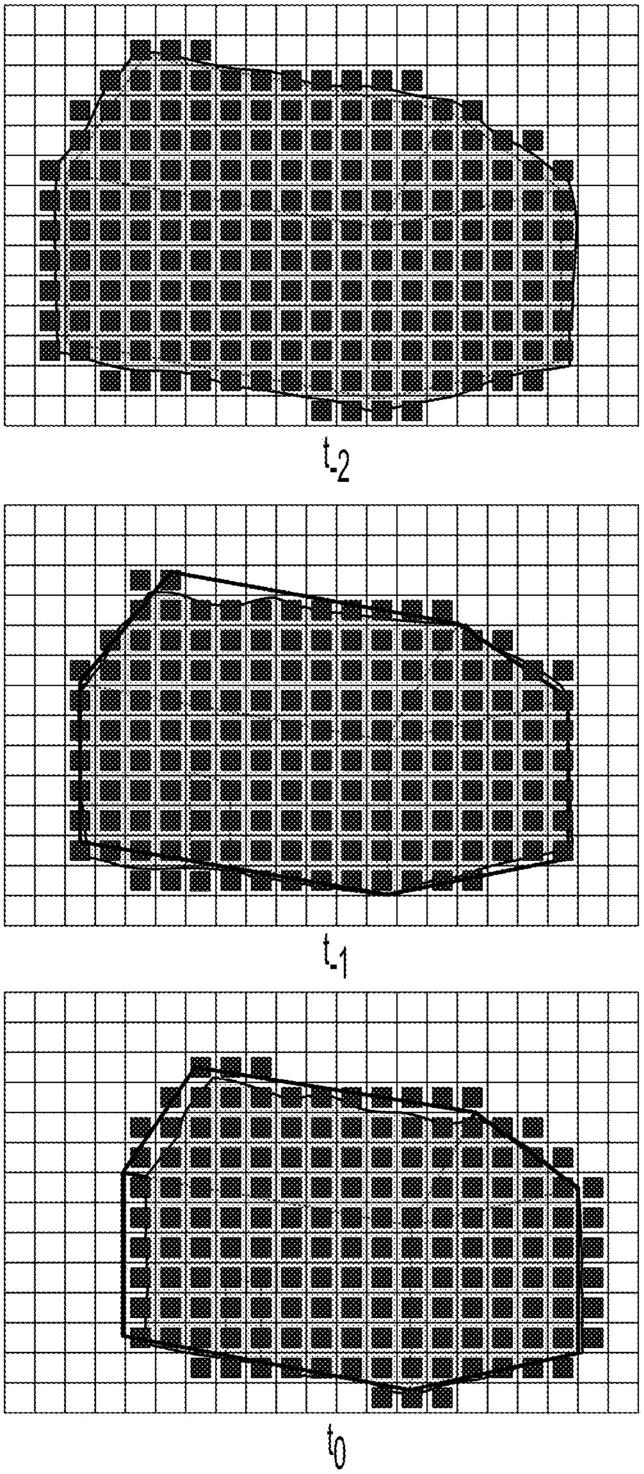
FIG. 26 illustrates an example of display pixel voting, according to certain aspects of the present disclosure.

At block 2202, display pixels are voted. Pixel voting discerns whether a display's pixel comprises a segmentation mask value or not. FIG. 26 illustrates pixel voting, using exaggerated pixel size for ease of illustration, to show designation of pixels comprising a segmentation mask for an underlying object house over a series of frames.

Stationary objects are stable, or can be assumed to be stable, over a period of frames; as a camera changes position, it is unlikely that the stationary object is in a different position of a display for reasons other than camera motion. The most recent frame, then, is more likely to represent a stationary object's presence and continued presence. In some embodiments, the pixel vote of more recent frames is weighted higher than a previous frame's pixel voted value. By contrast, for moving objects in a display, frame temporal relevance is reduced; an object is not as likely to persist in a same location in a subsequent frame and may be as likely to move to a new position, such as one in a previous frame. A bounding box to predict the presence of a dynamic object over a series of frames should be larger, or at least have a stronger association to past positions and past frames in voting or predicting current pixel relevance.

In some embodiments, however, camera motion may not simply be implied or incidental by natural human unsteadiness. Drone-acquired or aerial imagery necessarily assumes a camera is in motion during a capture session. Though a target object is still stationary, the relative motion of the camera imparts the effect on a stationary object as a moving object would have on a stationary imager. In such embodiments, the pixel vote values are not weighted to give a mask value of any particular frame any greater vote relevance.

Figure 24A:
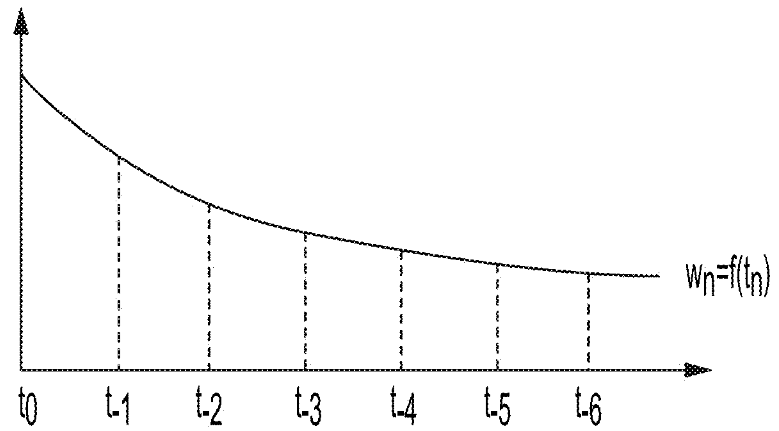
FIGS. 24A-24B illustrate examples of functions for weighted pixel voting values, according to certain aspects of the present disclosure.

To adequately reflect the spatial-temporal relationship for an object over time, pixel voting weights are applied, in some embodiments, on frame relationship. FIG. 24A illustrates a weighting relation based on frame time, wherein the pixel values of more recent frames (e.g. $t_0$ or $t_{-1}$) are weighted higher relative to earlier frame (e.g. $t_{-6}$ or $t_{-5}$). As depicted, the more recent frames are closer to the axis, and older frames extend along the x axis.

Figure 24B:
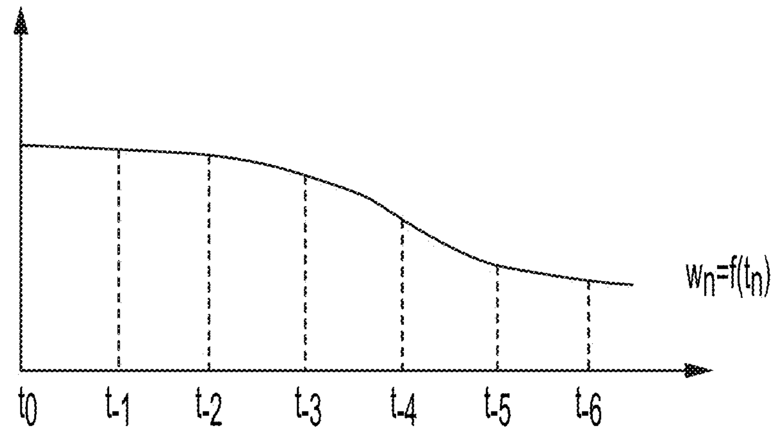

Stationary objects captured by handheld cameras, such as deployed on smart phones, may utilize the non-linear decay-type functional relationship of FIG. 24A. Dynamic object voting, such as for moving objects or moving imagers may rely on no weighted voting or variable weighted voting such that all frames are valued equally, or give recent frames equal voting wait as a current frame. FIG. 24B illustrates such a possible weighting relationship for pixels in masks with anticipated motion. In some embodiments, weighting function selection is based on imager motion. For example, if a camera's accelerometers or positional sensors otherwise are relatively steady over a number of frames then the function of FIG. 24A is applied, whereas if the camera begins to move pixel vote weighting may shift to the function of FIG. 24B for those frames capturing masks concurrent with such motion.

In some embodiments, changes in position of segmented pixels in previous frames are used predict a new position for segmented pixels in subsequent frames. For example, a Kalman filter may track previously the segmented pixels across a series of frames and anticipate where segmented pixels will appear in a current or subsequent frame. A predicted pixel may be given a certain weight on its own, even if the pixel is not segmented at that position in an instant frame.

In some embodiments, only those pixels within a certain range of the previous frame's segmented pixels or bounding box envelope are evaluated and voted on. As stated previously, motions of the imager or noise input to the model's may produce outlier pixels; to limit the number of outliers, only pixels within a pixel drift limit are evaluated. In some embodiments, the pixel drift limit is a threshold tolerance of 5 pixels around the previous frame's segmentation mask. In some embodiments, the pixel drift limit is a threshold tolerance of 10 pixels around the previous frame's segmentation mask. In some embodiments, the pixel drift limit is a threshold tolerance of 15 pixels around the previous frame's segmentation mask. In some embodiments, the pixel drift limit is a threshold tolerance of 100 pixels around the previous frame's segmentation mask.

At 2203, an accumulated pixel segmentation mask is created. In some embodiments, the accumulated pixel segmentation mask is a mask comprising pixels that satisfy a value condition; such conditions may be pixel drift tolerance, aggregated voting, weighted aggregated voting, or gradient change filtering.

In some embodiments, a system operating the steps of method 2200 collects the segmentation masks over the temporal period (e.g. $t_{-2}$, $t_{-1}$, $t_0$) in a circular queue of timestamped masks, and each successive mask is aggregated with preceding ones in the queue, such that each voted pixel is aggregated into a common mask. In some embodiments, a prior frame dilation area constrains the candidate pixels in the accumulated mask. A prior frame dilation area is a region surrounding the pixels of a prior accumulated mask that is larger in area but co-centered with the prior accumulated mask. Pixels in a successive accumulated mask that fall outside of the prior frame dilation area are removed from the successive accumulated mask. In some embodiments, the size of the prior frame dilation area is based on temporal relation or frame rate between frames, such as increased temporal difference between frames of accumulated masks lends to larger prior frame dilations areas. In some embodiments, each successive frame extends the prior frame dilation area by a single pixel outward from the contour of the prior accumulated mask. In some embodiments, the prior frame dilation area is a bounding box envelope or convex hull fit to the prior frame mask.

At block 2204, a bounding box envelope is fit to the accumulated mask. Because this envelope bounding box is based on accumulated pixel values and not merely the segmentation mask of the instant frame, it is more likely to be temporally stable around the target of interest, even given imager position changes in subsequent frames.

FIGS. 25-30 illustrate an embodiment for building and applying an accumulated mask; while ultimately illustrating weighted voting, the figures merely provide a non-limiting example for creating and applying an accumulated mask.

Figure 25:
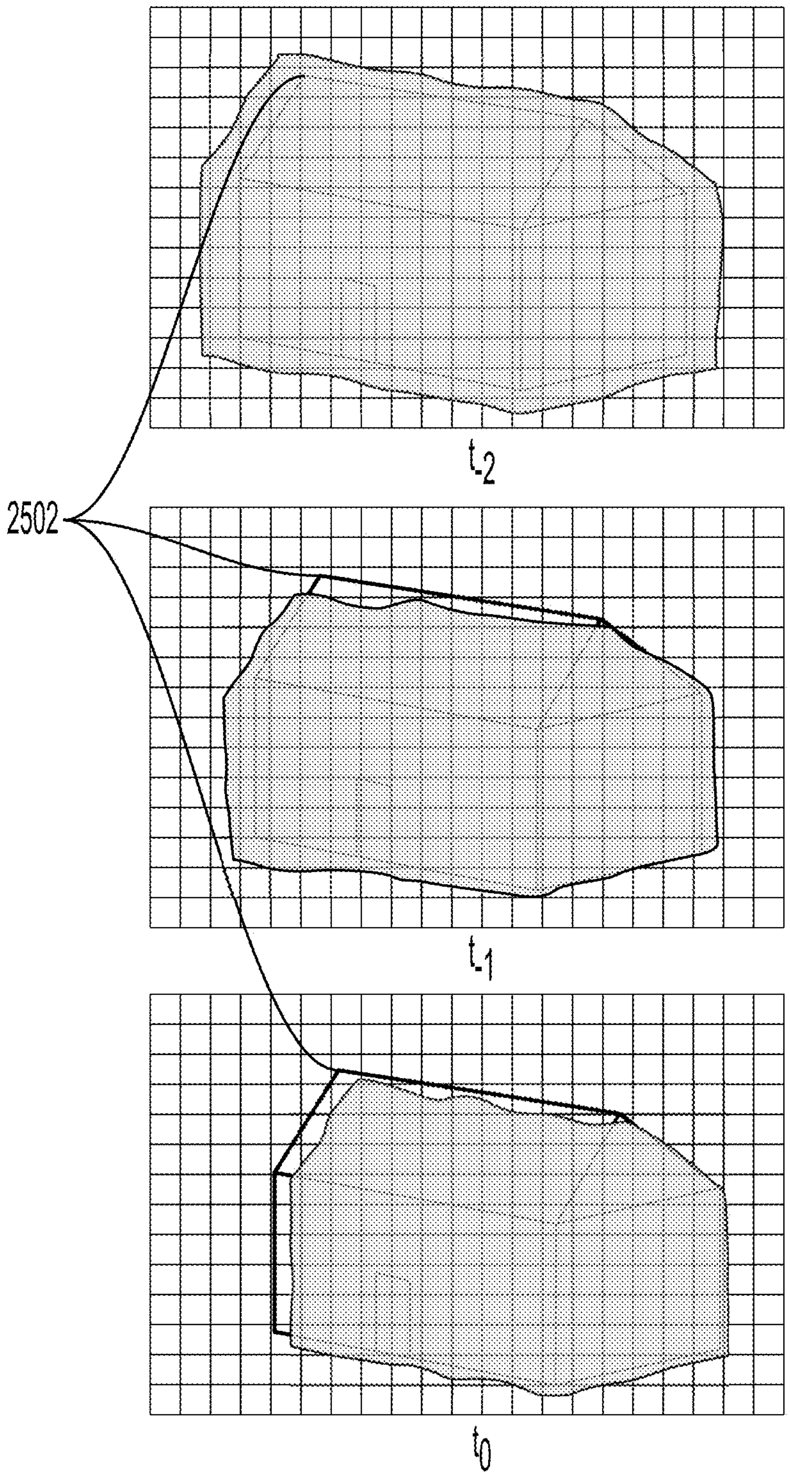
FIG. 25 illustrates an example of segmentation mask noise, according to certain aspects of the present disclosure.

FIG. 25 illustrates a series of frames from $t_{-2}$ to $t_0$, each frame comprising a target object home in a display and an applied segmentation mask (represented by the grayscale overlay) for that classified object in the image. As illustrated, the target object moves slightly within the frame, such as by imager motion, as evidenced by the position change of apex point 2502 in each frame. Additionally, the segmentation mask variably identifies a target object pixel due to non-limiting classification error factors, especially at the object boundaries, such that over time the mask deforms relative to its shape in other frames and appears noisy even in a single frame.

In FIG. 26, the segmented pixels within the display (with exaggerated pixel size for ease of illustration) are identified or voted as denoted with the black box present in each exaggerated pixel for those pixels occupied by a segmented pixel for the target object class.

Figure 27:
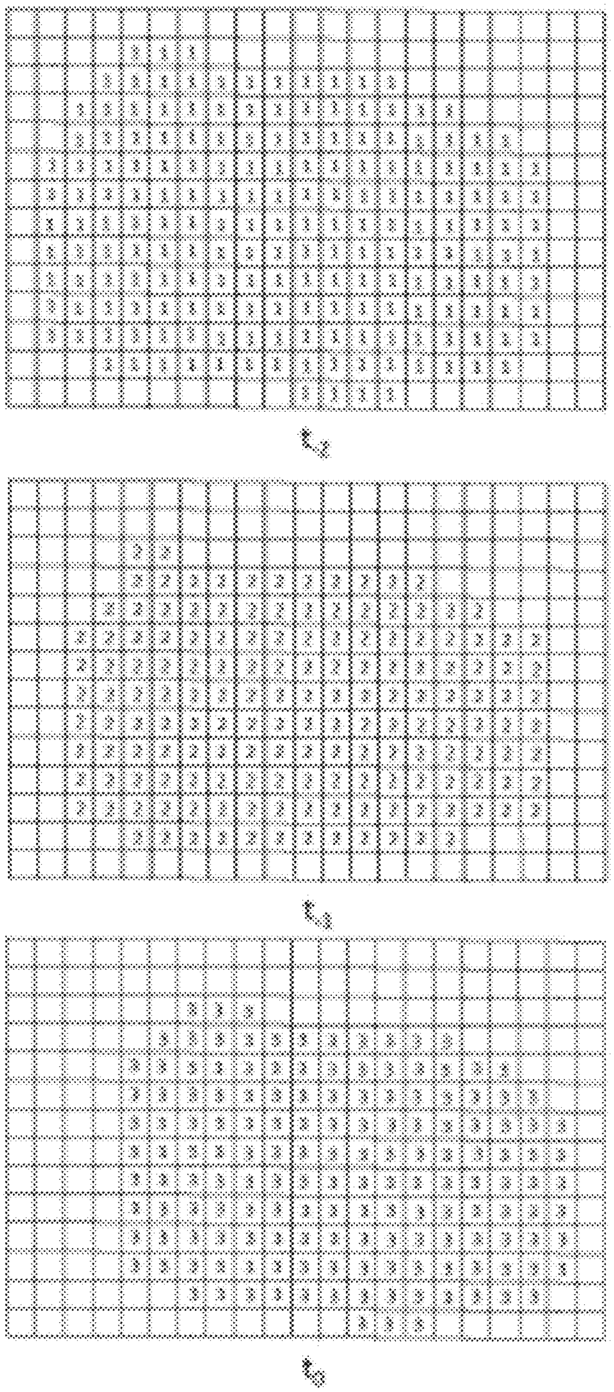
FIG. 27 illustrates an example of pixel weighting, according to certain aspects of the present disclosure.

FIG. 27 illustrates weighting the voted pixels of FIG. 26 according to temporal frame relationship; for ease of illustration a simple weighting is applied for a linear decay of previous frames values. In other words, each voted pixel is weighted one less for each prior frame (or alternatively, each new frame adds a value of one to a voted pixel). Alternative weighting schemes are discussed in FIGS. 24A and 24B.

FIG. 28A illustrates an accumulated segmentation mask. As depicted, the accumulated mask of FIG. 28A is a summation of the weighted values of the voted pixels of the frames in FIG. 29. It will be appreciated that different weighting schemes or voting techniques may produce a different accumulated mask. In some embodiments, the accumulated mask is further refined to reinforce the weighted values. For example, pixels with a weight value below a certain validation or threshold value are removed from the mask. In some embodiments, the threshold pixel value for an accumulated mask is a median value; in some embodiments the threshold pixel value is a simple average value, and in some embodiments the threshold pixel value is a weighted average. A series of potential threshold values are shown in FIG. 28B. It will be appreciated that higher threshold values may increase bounding box jitter as new frames continually must adjust to the most recent pixel value that is more likely to reflect the higher threshold value, and that lower threshold values are more likely to produce stable bounding box envelopes even if such bounding box is more likely to contain pixels that do not belong to the classification in the most current frame. A preferred embodiment of the techniques disclosed herein is the weighted average value.

In some embodiments, a gradient value between pixels is determined and lower-value pixels on the border of large gradient differences are removed from the mask. A large gradient difference may be calculated as a value between the largest and smallest pixel weighted value. Referring again to FIG. 28A, with a highest weighted pixel value of 5 in the accumulated mask and a lowest value of 1, a gradient value related to these values may be applied. For example, using the simple average value of 3 in the accumulated mask of FIG. 28A, when neighboring pixels change value more than 3, the lower value pixel between the two is removed from the mask. Combinations of the above mentioned refinement methods may be applied as well, such as a first filter using gradient elimination and then threshold value filtering.

In some embodiments, stray pixels or small clusters of pixels may be segmented; an accumulated mask may filter out such isolated pixels or clusters, even if those persist over several frames, to reduce noise in the accumulated mask. Filtering may be based on pixel area or proximity; for example a cluster of five isolated pixels in the accumulated mask may be discarded or pixels more than a threshold distance from the majority of pixels in the accumulated mask are discarded. Thresholds for pixel filtering based on size may be based on relative pixel areas of the accumulated mask; in some embodiments pixels or clusters less than five percent of the primary mask pixel count are discarded, in some embodiments pixels or clusters less than ten percent of the primary mask pixel count are discarded. In some embodiments isolated pixels located more than ten percent in pixel length of the primary mask pixel length in that direction (e.g. x-axis or y-axis) are discarded from the accumulated mask. A primary mask may be understood as the mask with the highest number of contiguous pixels in the segmented class.

Figure 29:
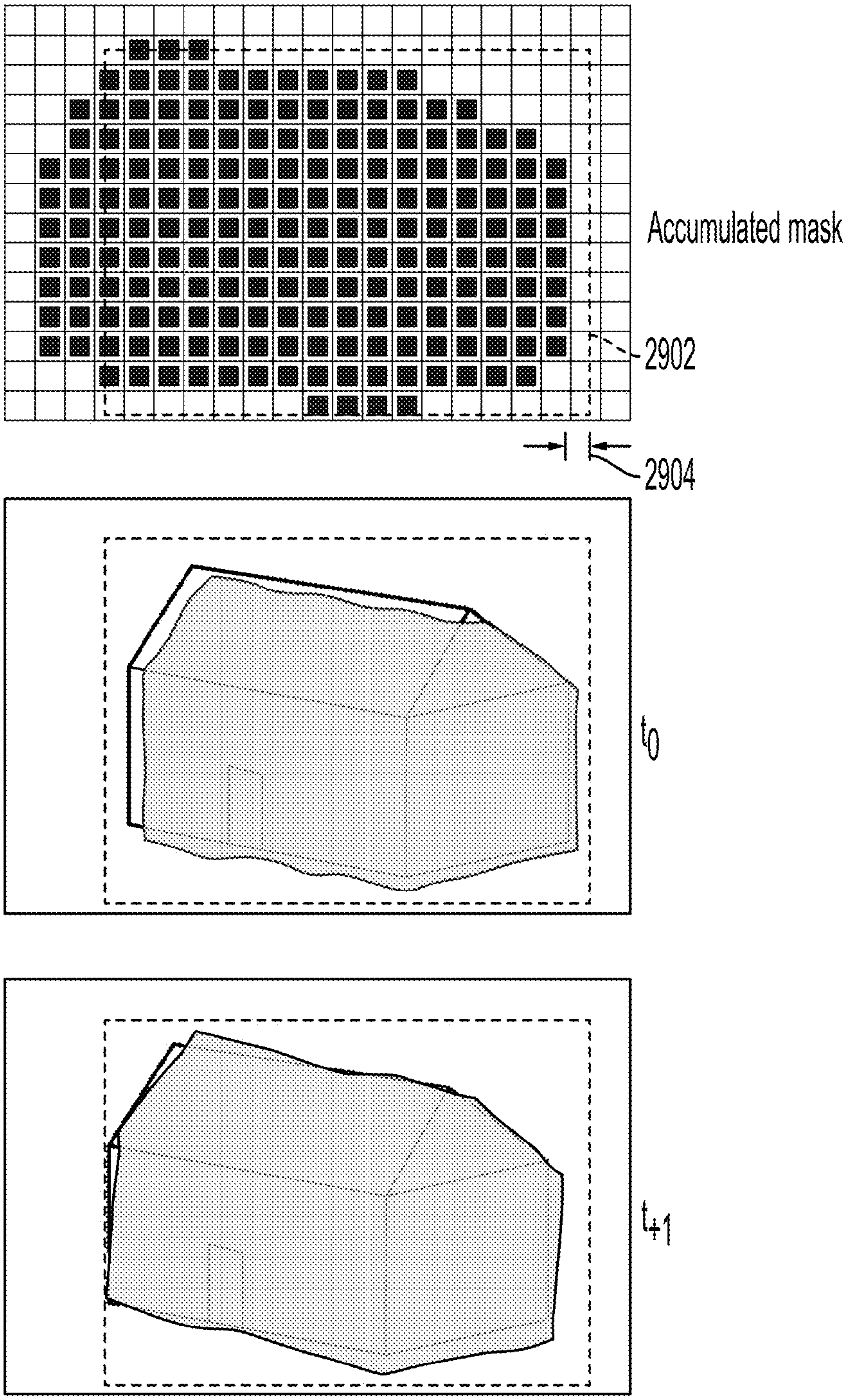
FIG. 29 illustrates an example of accumulated mask rendering and bounding box envelope fitting, according to certain aspects of the present disclosure.

FIG. 29 illustrates an accumulated mask based on the weighted average pixel threshold value of FIGS. 28A and 28B. Bounding box envelope 2902 is applied around the accumulated mask; in some embodiments, a buffer portion 2904 is further applied to set the bounding box envelope further out from the pixels comprising the accumulated mask. When bounding box envelope 2902 is applied to the target object and its segmentation mask (exaggerated pixel boundary lines removed for clarity, but scale otherwise equal to that as initially presented in FIG. 25), the bounding box envelope comprises more true pixels of the target object than the associated segmentation mask would otherwise impart. Additionally, using the same bounding box envelope 2902 in a subsequent frame at $t_{+1}$ where the house has again slightly moved within the display and the segmentation mask again has also slightly shifted, the stability of bounding box envelope 2902 is still able to encompass the target house and its pixels without moving position or adjusting in size. It will be appreciated that the change in pixel inputs at $t_{+1}$ will update the values for a new accumulated mask, and it is possible that bounding box envelope generation will adjust for successive frames $t_{+2}$ and onwards.

In some embodiments, active guidance to prompt camera pose changes is performed in parallel to block 2204. Block 2205 may be performed directly from the accumulated mask, or after a bounding box envelope is fit to the accumulated mask. If the accumulated mask comprises segmentation pixels at the display border, instructive prompts may appear on the display in accordance with the techniques described throughout this disclosure. In some embodiments, guidance prompts to adjust a camera position are displayed only if a boundary condition (bounding box envelope or segmentation mask pixel) extends to or beyond the display boundary longer than a timing window. In some embodiments the timing window is one second, in some embodiments the timing window is two seconds; in some embodiments the timing window is an exponential value based on the number of frames used to generate the accumulated mask. This prevents the guidance feedback from issuing constant alerts.

In some embodiments, the guidance provided is that the object is well framed; the lack of instructive prompts may therefore be active guidance itself.

Figure 30:
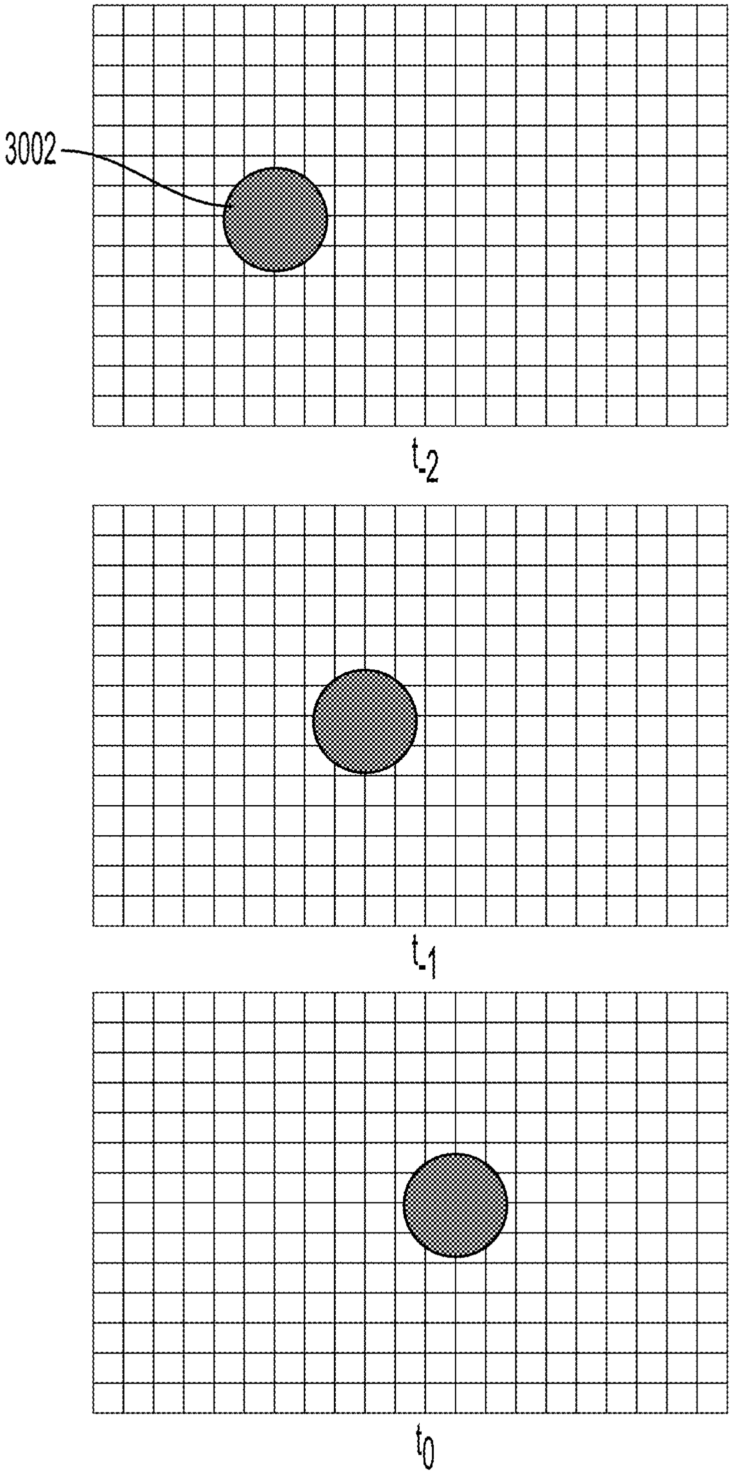
Figure 31:
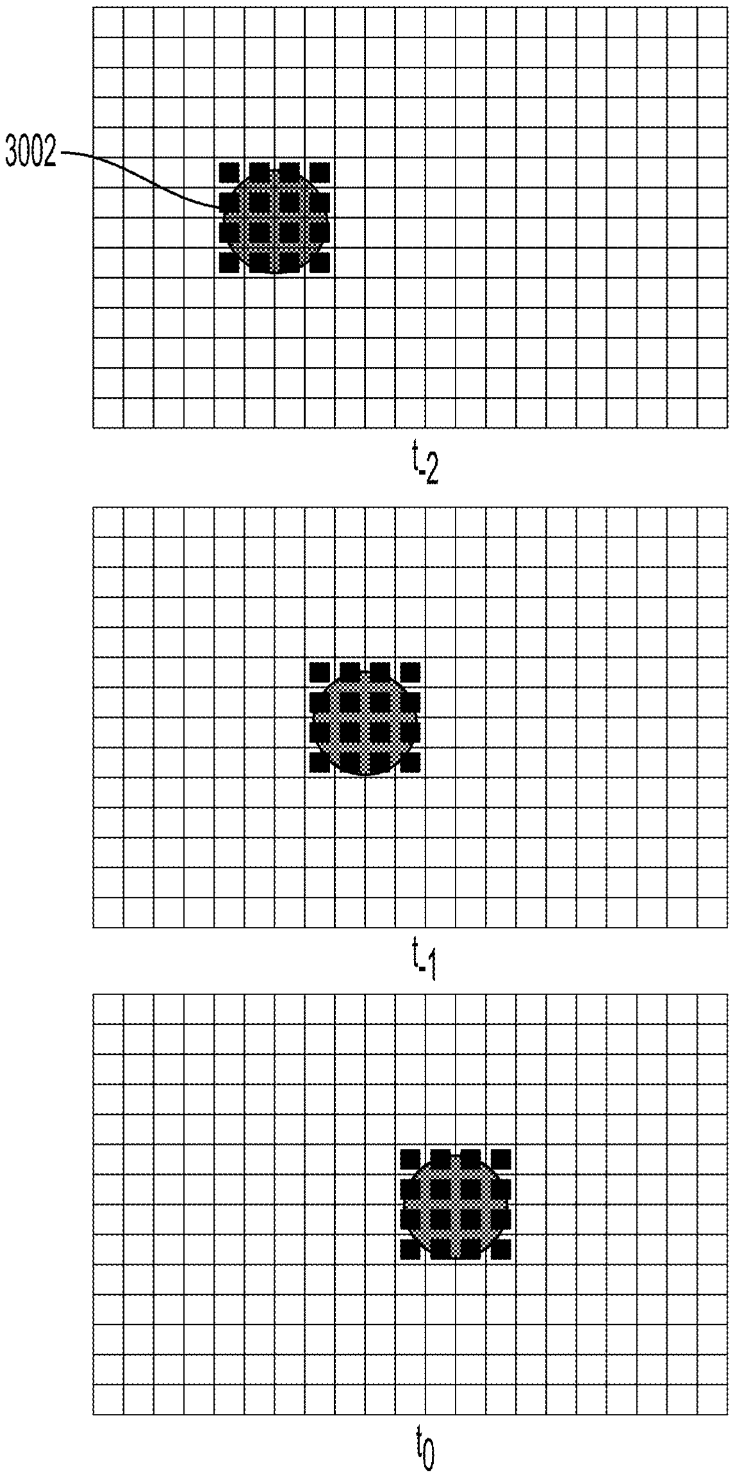
Figure 32:
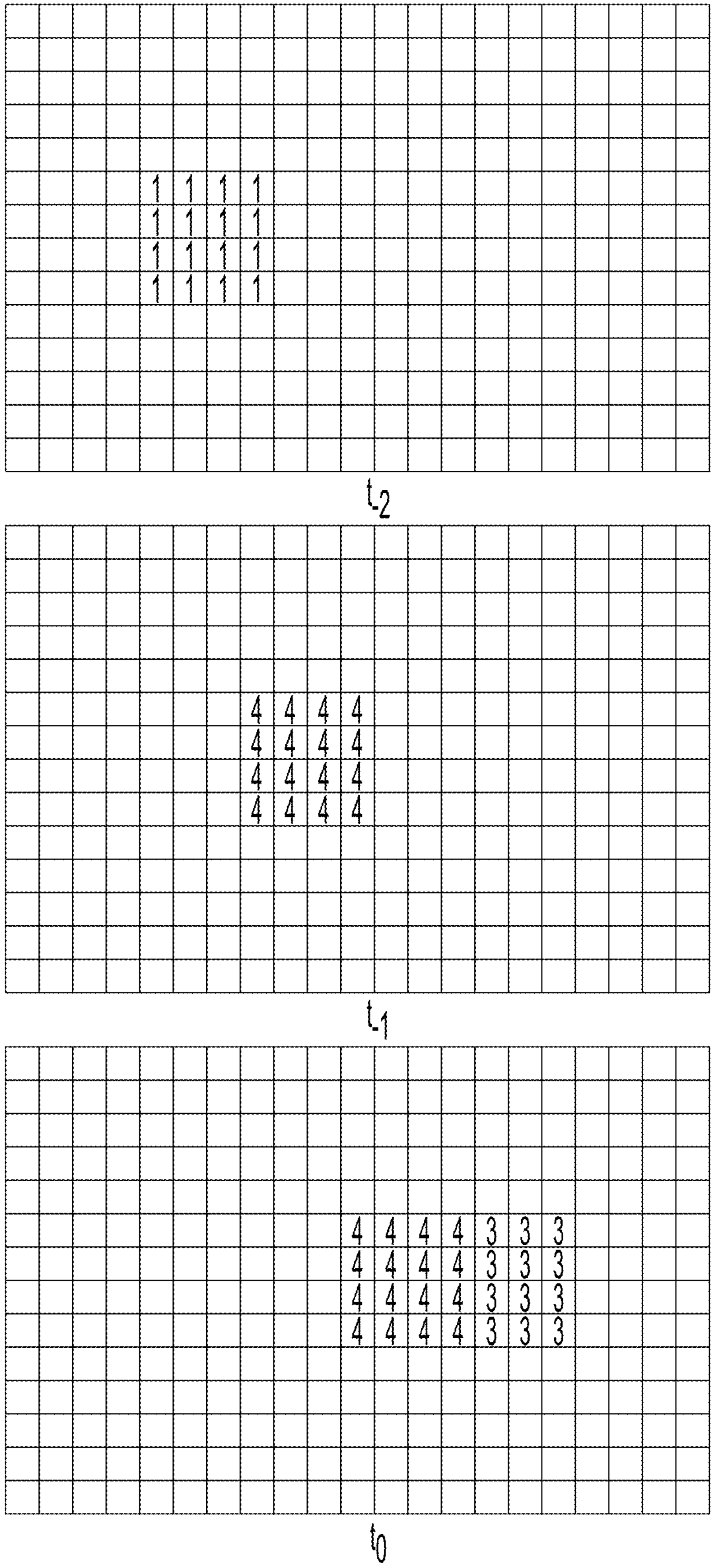

FIG. 30 illustrates the techniques of method 2200 applied to a moving object or moving imager, using a simple shape. Detection that an object is in motion may come from iOS Vision Framework or similar feature tracker. In FIG. 30, object 3002 appears in the display over a plurality of timestamped frames $t_{-2}$, $t_{-1}$ and $t_0$. In FIG. 31 the pixels comprising the object are voted, and a dynamic weighting shown in FIG. 32 using a decay function similar to that in FIG. 24B wherein a prior frame carries similar voting weight as a current frame (i.e. frame $t_{-1}$ is weighted equally as $t_0$ with $t_{-2}$ weighted less than either). Also illustrated in FIG. 32 is predicted weighted vote positions (predicted pixels are weighted value 3, whereas segmented pixels are weighted value 4). Predicted pixel values in an instant frame for future frame value may be determined from pattern recognition or predictive filters otherwise. In some embodiments, the predicted pixel vote values for a subsequent frame are determined in a current frame (as is depicted in FIG. 32 at $t_0$); in some embodiments, the predicted pixel vote for a subsequent frame are applied to an accumulated mask.

Figure 34:
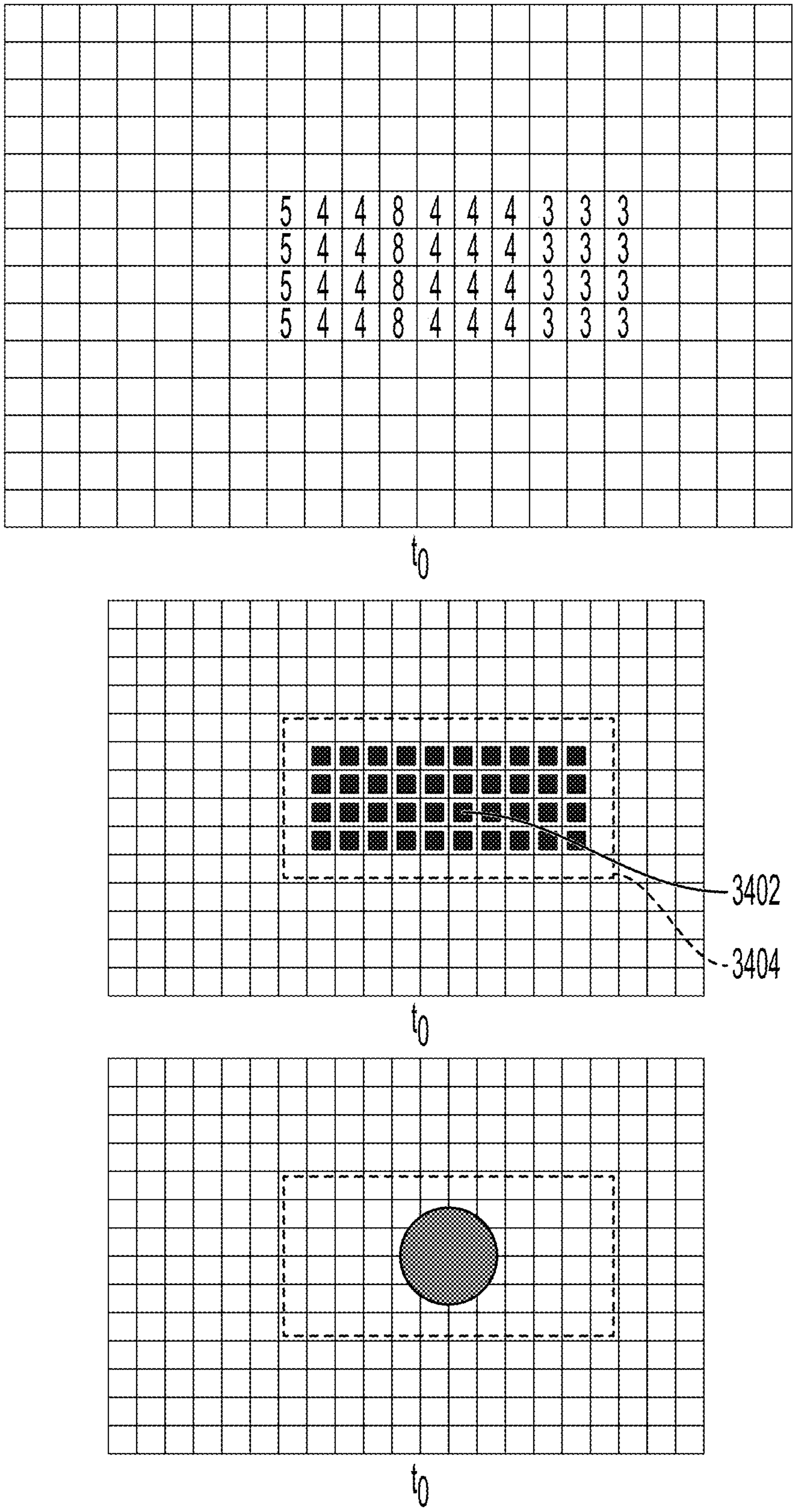

FIG. 33 illustrates aggregated pixel vote values based on the weighted values of FIG. 32, and associated table for various threshold values. FIG. 34 illustrates a filtered aggregated mask, based on a filter using a weighted value threshold of 3 (simply by way of example, and from the table of FIG. 33), with resultant accumulated mask 3402 shown by the array of exaggerated pixels and bounding box envelope 3404 as the dashed line with buffer fit around the accumulated mask. Lastly, object 3002 at frame $t_0$ is depicted with bounding box envelope 3404 fit to it.

Mobile imager platforms, such as a drone equipped with camera(s), may further navigate in response to such envelope positioning or guidance corrections. For example, the length of envelope 3404 relative to that of object 3002, or proximity of an edge of envelope 3404 to a display edge may prompt a change in focal length. Additionally, whereas the display inputs provide two-dimensional analysis, mobile imagers are permitted more degrees of freedom. Navigation or flight path changes to place an axis of the envelope or direction of the object's movement parallel with the drone imager's optical axis, rather than orthogonal to, may provide improved image capture. In other words, the instructive prompt may not only be feedback on quality of framing of an object in the display or corrections for a subsequent frame, but updated three dimensional navigation intermediate to a subsequent frame. Navigation changes may include increasing the distance from the object in a single degree of freedom (e.g. flying at a higher altitude) or adjusting position according to multiple degrees of freedom (e.g. adjusting an angular position to the object).

Figure 35:
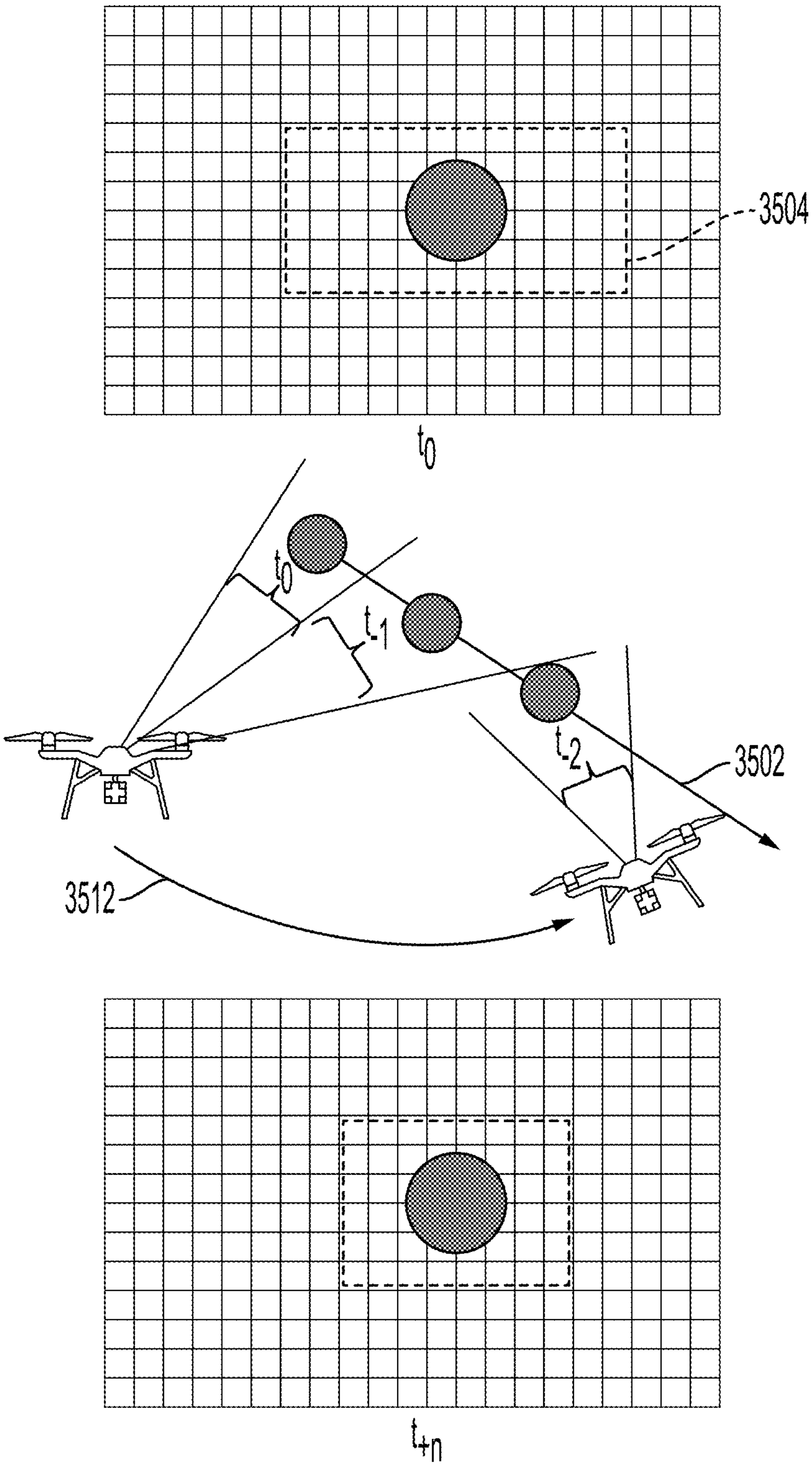

FIG. 35 illustrates an example navigation update to a drone platform. Using the bounding box envelope from FIG. 34, using frame of the imager at $t_1$ and $t_0$, a trajectory of object 3002 may be extracted in the linear direction of the long axis of envelope 3404. The trajectory may be predicted as path 3502 and instructions to position the imager in 3D space by transformation 3512 places the drone in position to capture the object such that trajectory 3502 is more directly in line with the drone optical axis at the transformed position. Such change leads to fewer translation changes of the object 3002 in the display of the drone, thereby tightening the bounding box envelope at shown at $t_{+n}$, a subsequent frame. As the envelope tightens, camera focal length, or the drone's proximity to the target may similarly change to acquire a better quality image (rather than a further away image to ensure incident motion would not place the object out of a following frame).

Figure 36:
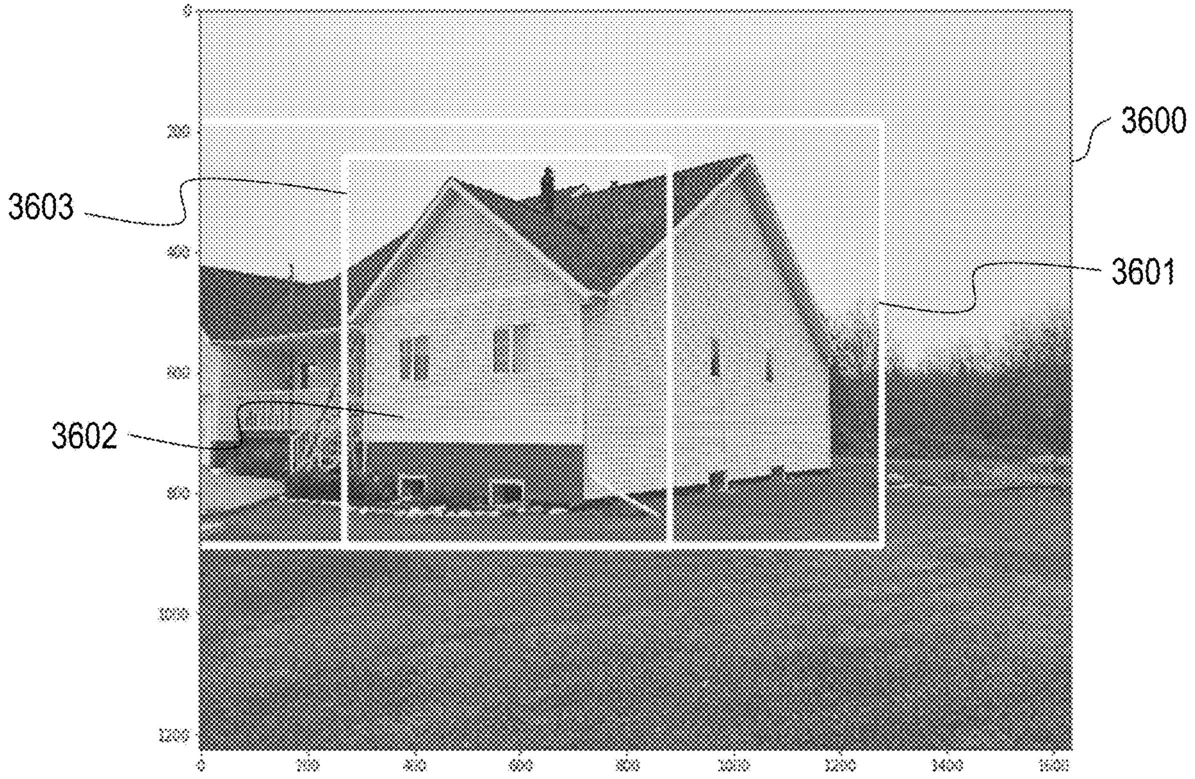
FIG. 36 illustrates multichannel bounding boxes, according to certain aspects of the present disclosure.

FIG. 36 illustrates frame 3600 with portions of house 3602 outside the display borders. As discussed above, a segmentation mask applied to identify pixels associated with house 3602, or bounding box 3601 to envelop such segmentation mask or house 3602 otherwise, would abut the left boundary of frame 3600. This single channel segmentation bounding, single channel meaning applying to a single classification target like house 3602 in FIG. 36, and the display boundary limitations introduced could be addressed using the techniques as described above. In some situations, however, such active guidance to perfectly frame a subject in a display is not possible. Occluding objects, or small distances between the imaging device and the subject (for example, caused by houses that closely border lot lines) may prevent the user from adjusting the imaging device pose to place the entire subject or its bounding box within the field of view.

Subcomponents or subfeatures of a subject may nonetheless fit within a display's limit, such that an image frame would encompass the entirety of such sub-elements; capture of these sub-elements can provide useful information about the subject. Geometric features, three-dimensional data indicative of feature depth, or lines associated with vanishing points can all provide useful information of the overall subject they are associated with, and may be captured in an image frame without the entire subject in said frame. In some implementations, a bounding box, such as 3603 in FIG. 36 can be fit to such a sub-structure of the overall target (e.g., a gable as depicted). Active guidance as described throughout this disclosure may then be applied to this bounding box as necessary for proper framing of the sub-structure within.

Figure 37:
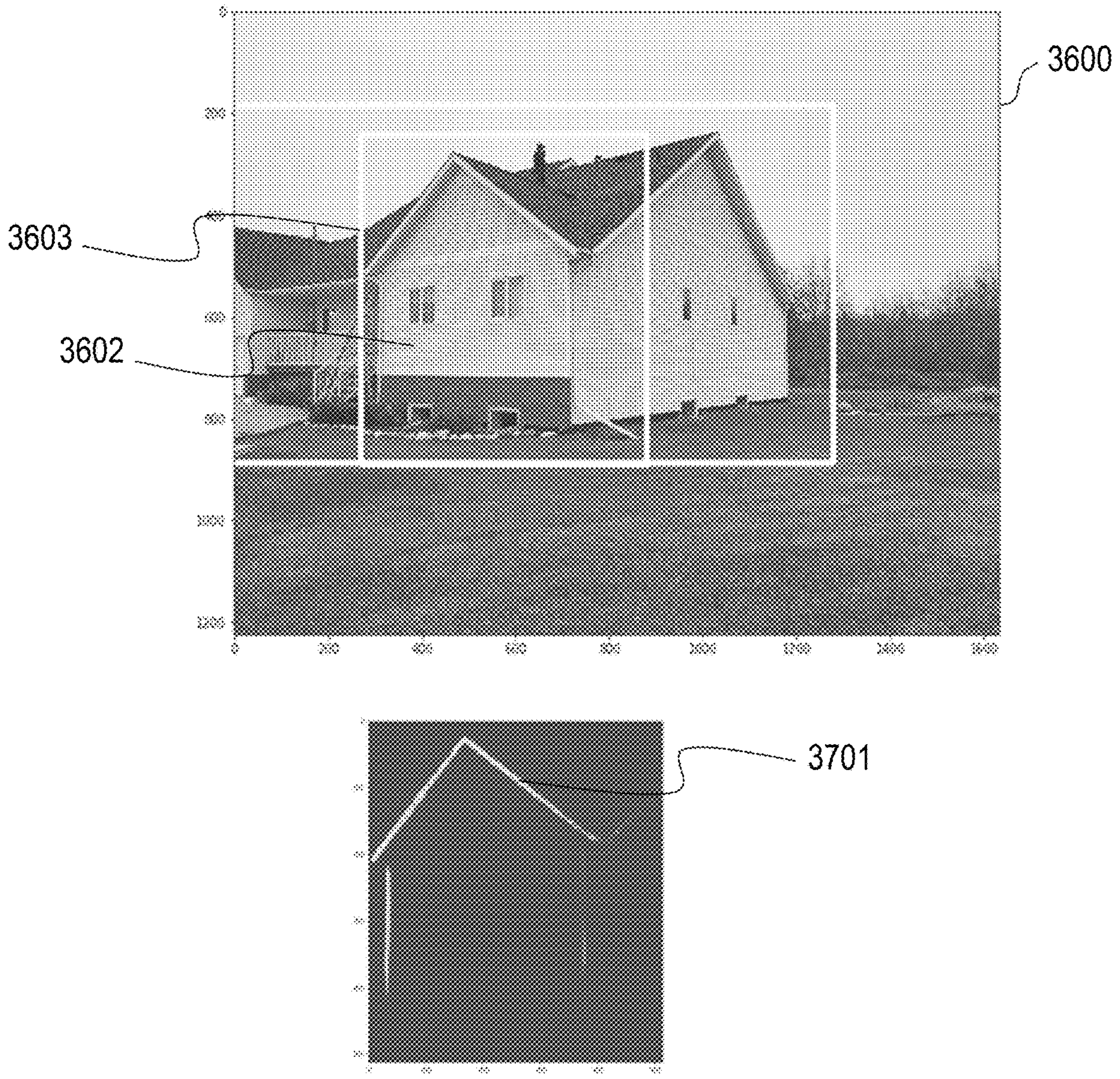
FIG. 37 illustrates a channel output for a substructure, according to certain aspects of the present disclosure.

This sub-structure bounding box represents a multichannel mask cascade operation. Shown in FIG. 37 is segmentation mask 3701 corresponding to features attributable to a gable of house 3602. A bounding box to that encompasses mask 3701 may in turn produce bounding box 3603. Segmentation mask 3701 is one of a plurality of segmentation channels that may be produced from the input RGB image as seen in image frame 3600. A first channel may be segmentation for structure 3801 on the whole, another channel for the gable as in 3701. Some embodiments identify additional channels defining additional features, sub-components or subfeatures as described further below.

Figure 38:
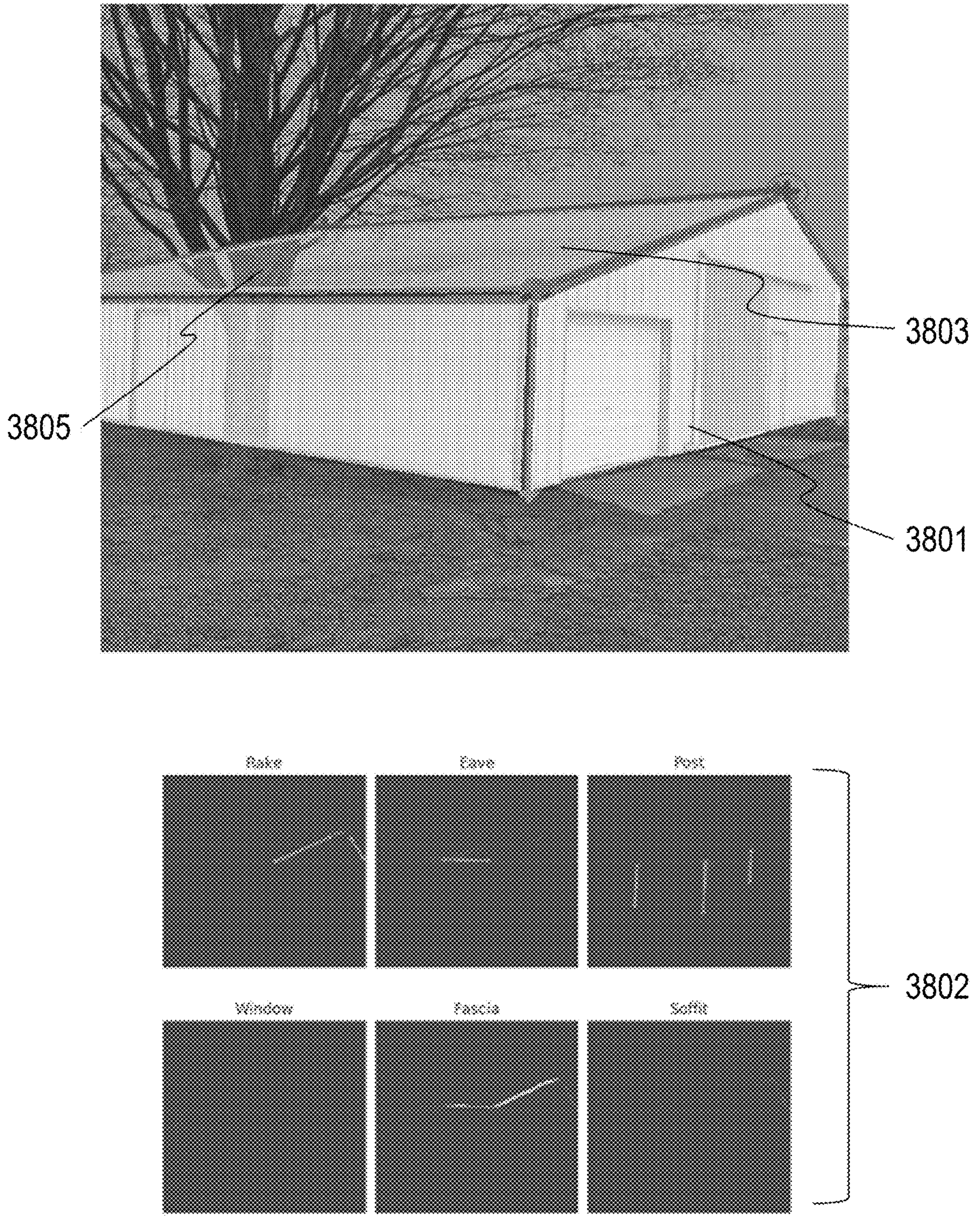
FIG. 38 illustrates a plurality of channels associated with activation maps, according to certain aspects of the present disclosure.

FIG. 38 depicts structure 3801 and a plurality of channels 3802 for sub-elements of structure 3801. In some implementations, a channel represents a classification output indicative of a pixel value for a specific attribute in an image; a segmentation mask for a particular feature may be a type of channel. Among channels 3802 are segmentation masks for rakes (e.g., lines culminating in apexes on roofs), eaves (e.g., lines running along roof edges distal to the roof's ridge), posts (e.g., vertical lines of facades such as at structure corners), fascia (e.g. structural elements following eaves), and soffit (e.g., the surface of a fascia that faces the ground). Many more sub-elements and therefore channels are possible, such as ridge lines, apex points, and surfaces are part of a non-exhaustive list.

In some embodiments, the output as shown in any one channel of channels 3802 may be used for the active guidance or bounding box fitting as described throughout this disclosure. The mask output by a channel may serve as mask 1502, with reference to FIG. 15, and a bounding box fit to it or the mask directly used for framing that content within display boundary. In some embodiments, channel outputs are aggregated. For example, knowing that a sub-structure, such as a gable, is a geometric or structural representation of subfeatures, such as rakes and posts, a new channel may be built that is a summation of the output of the rake channel and the post channel, resulting in a representation similar to mask 3701 of FIG. 37. Similarly, if there is not already a roof channel from an associated activation map, knowing that roofs are a geometric or structural representation of rakes, eaves, and ridges, those channels may be aggregated to form a roof channel. In some implementations, a cascade of channel creation or selection may be established. While a single channel for a structure on the whole may be a preferred channel, a second channel category may be for sub-structures such as a gable or roof, and a third channel category may be for the foundational elements of sub-structures such as subfeatures like rakes, eaves, posts, fascia, soffits, windows, and so on.

Channel selection to a frameable bounding box or mask (one that fits within a display) may cascade through these categories. In some implementations, a user can select a channel. In some implementations, one or more channels can be selected for the user based on what masks are eligible based on the channel outputs. In some implementations, a channel can be an activation map for data in an image frame (pre- or post-capture) indicating a model's prediction that a pixel in the image frame is attributable to a particular classification of a broader segmentation mask. The activation maps can be, then, an inverse representation, or single slice, of a segmentation mask trained for multiple classifications. By selectively isolating or combining single activation maps, new semantic information, masks, and bounding boxes can be created for sub-structures or subfeatures in the scene within the image frame and guidance prompts provided to optimize framing for those elements (e.g., the sub-structures or the subfeatures).

In some implementations, a neural network model comprises a plurality of layers for classifying pixels as subfeatures within an image. A final convolution layer separates out, into desired channels or subchannels, outputs representing only a single classification of the model's constituent elements. This enables feature representations across the image to influence prediction of subfeatures, while still maintaining a layer optimized for a specific feature. In other words, a joint prediction of multiple classes is enabled by this system (e.g., by server 120 and its components). While the presence of points and lines within an image can be detected, shared feature representations across the network's layers can lend to more specific predictions; for example, two apex points connected by lines can predict or infer a rake more directly with the spatial context of the constituent features. In some implementations, each subchannel in the final layer output is compared during training to a ground truth image of those same classified features and any error in each subchannel is propagated back through the network. This results in a trained model that outputs N channels of segmentation masks corresponding to target subfeatures of the aggregate mask. Merely for illustrative purposes, the six masks depicted among group 3802 reflect a six feature output of such a trained model. Each activation map in these channels is a component of an overall segmentation mask (or as aggregated a segmentation map of constituent segmentation masks).

Figure 39A:
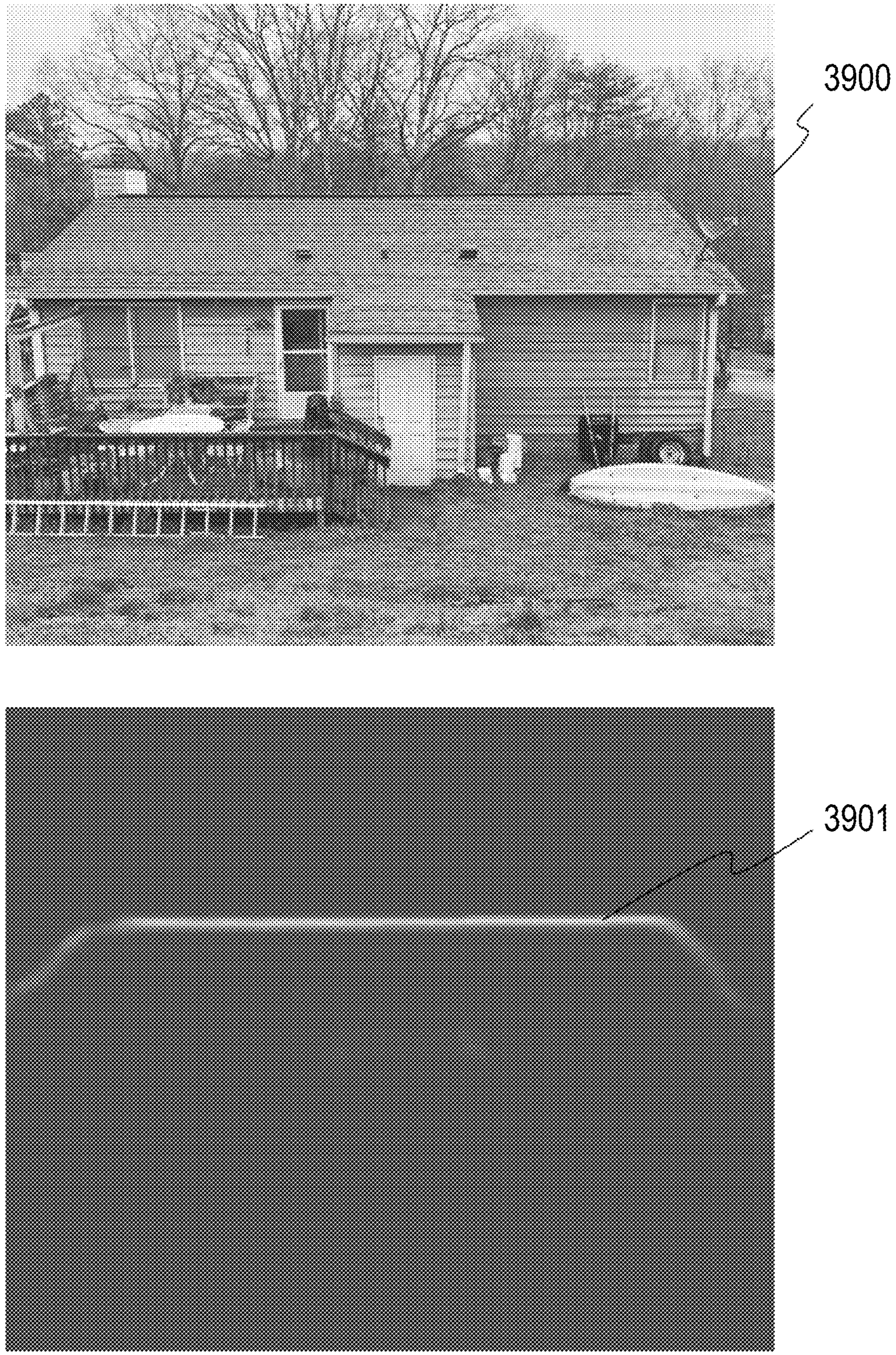
FIGS. 39A-40B illustrate scene understanding for images, according to certain aspects of the present disclosure.
Figure 39B:
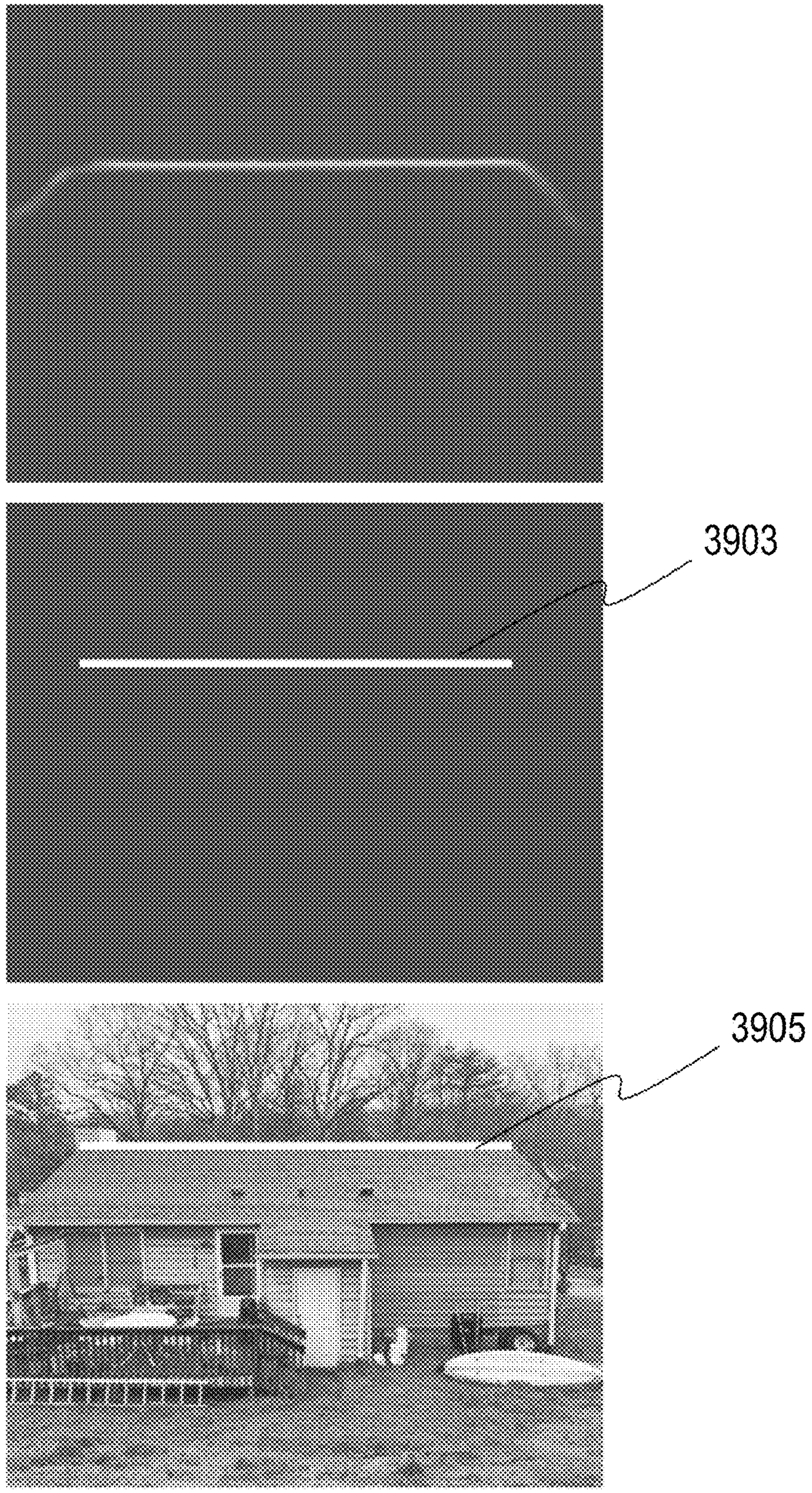

In some implementations, intra-image parameter evaluation system 250 can further refine an activation map output using filtering techniques. Keypoint detection techniques, such as the Harris corner algorithm, line detection techniques, such as Hough transforms, or surface detection techniques, such as concave hull techniques can clean noisy output. Referring to FIG. 39A, activation map 3901 can be one of a plurality of activation maps for image 3900, in this case a ridge line for a roof. As activation map 3901 corresponds to a linear feature, a linear detection technique may be applied to the pixels of 3901, resulting in smoothed linear feature 3903 of FIG. 39B. This linear feature may then be overlaid on image 3900 to depict a clean semantic labeling 3905. As discussed above, these may be grouped with other such activation map outputs or refined representations, and applied to a scene. Grouping logic is configurable for desired sub-structures or subfeatures. For example, a rake activation map combined with a post activation map can produce a gable channel, despite no specific activation map for that type of sub-structure. Referring back to FIG. 38, such configurable channels can create clean overlays indicative of a classification but not prone to noisy pixel prediction or occlusions. Roof overlay 3803 may be created from a refined planar surface activation mask, or by filling in areas bounded by apex points, rakes, eave, and ridge line activation masks. Occluding tree 3805 does not create neighbor masks for the same planar element with such a cumulative channel derived from several activation mask outputs.

Data collection for damage reports especially benefit from such isolated masks. For example, damage types typically occur in associated areas: hail on roofs, or wind on siding. If damage assessment imaging tools were to look for specific damage, segmenting an image frame into targeted areas for closer inspection and guiding an imager to appropriately capture such feature expedites evaluation. A drone piloting about a house to collect images for assessing damage can isolate subfeatures within an image frame associated with a particular category of damage, and guide imager positioning for that specific (sub)feature based on that (sub)feature's activation map channel.

Figure 40A:
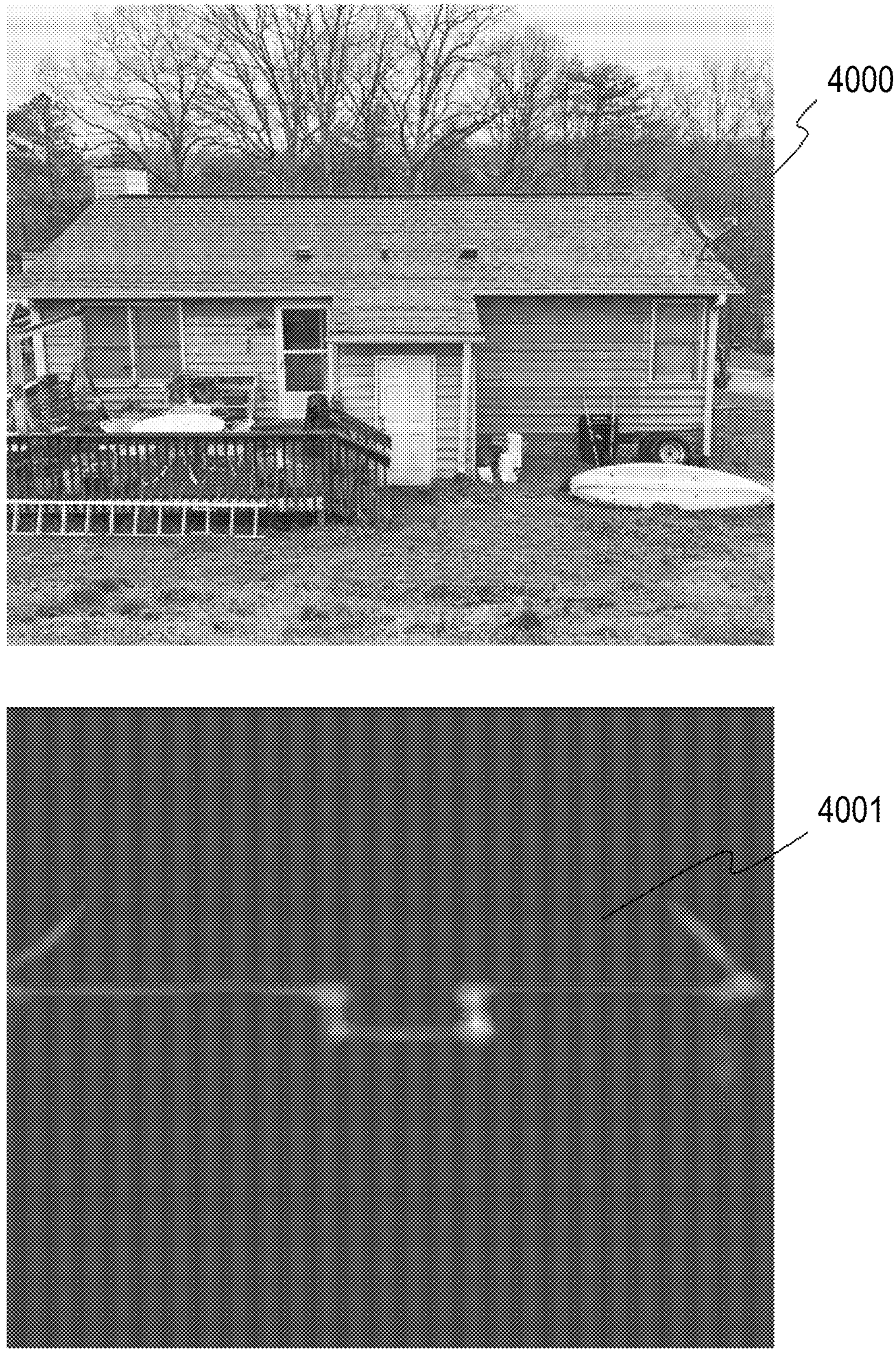
Figure 40B:
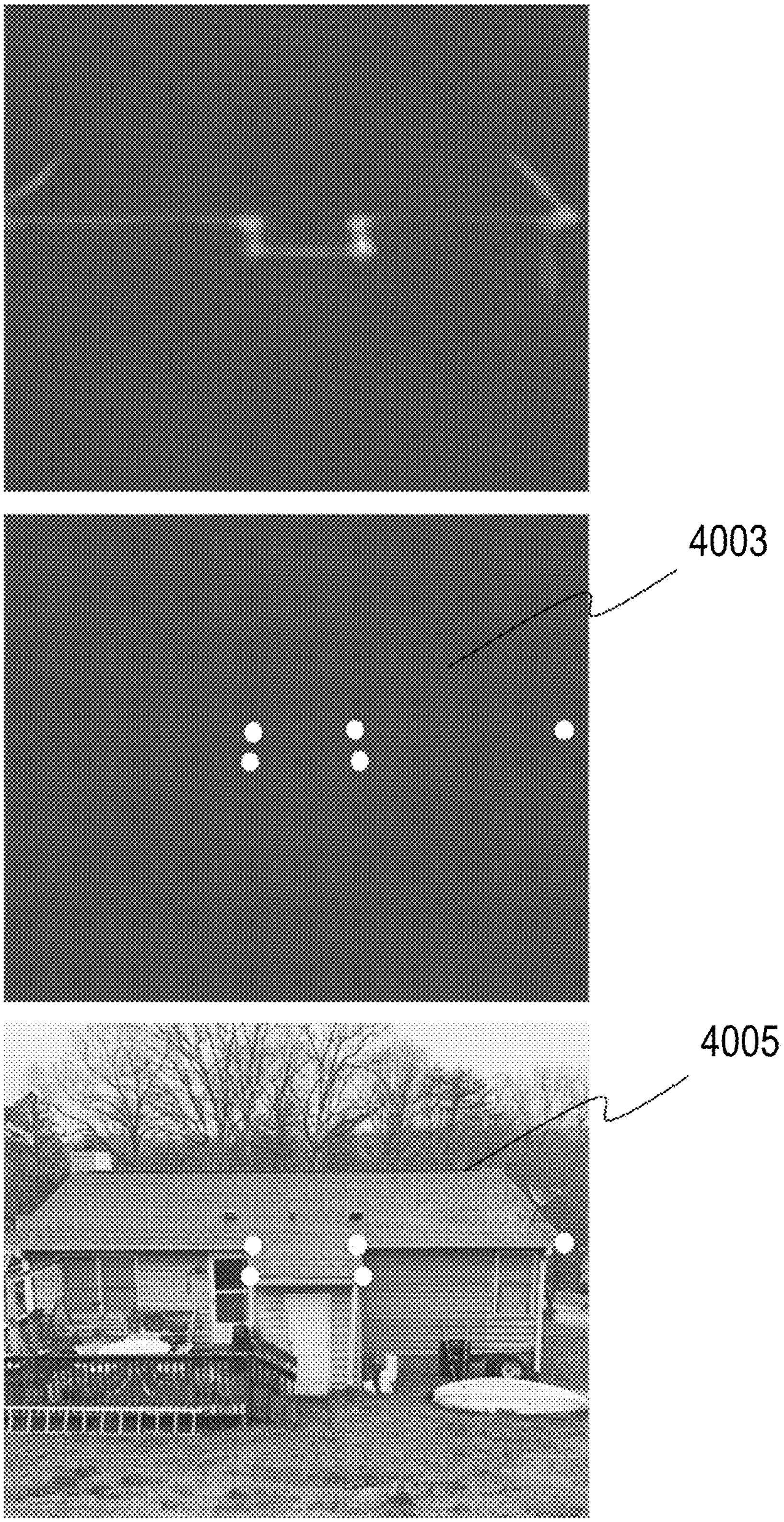

As another illustrative example, FIG. 40A depicts the same input image 3900 but with activation map 4001 for the fascia of the house. While linear detection techniques operated upon activation map 4001 would produce clean lines to the noisy data depicted in 4001, other techniques such as keypoint detection by Harris corner detection can reveal fascia endpoint channel 4003 that show semantic point labeling 4005. These channels can be applied in building block like fashion to provide clean labeling to an image that overlays a structure, even over occlusions as described above with FIG. 38 and mitigating the presence of occluding tree 3805.

Figure 41A:
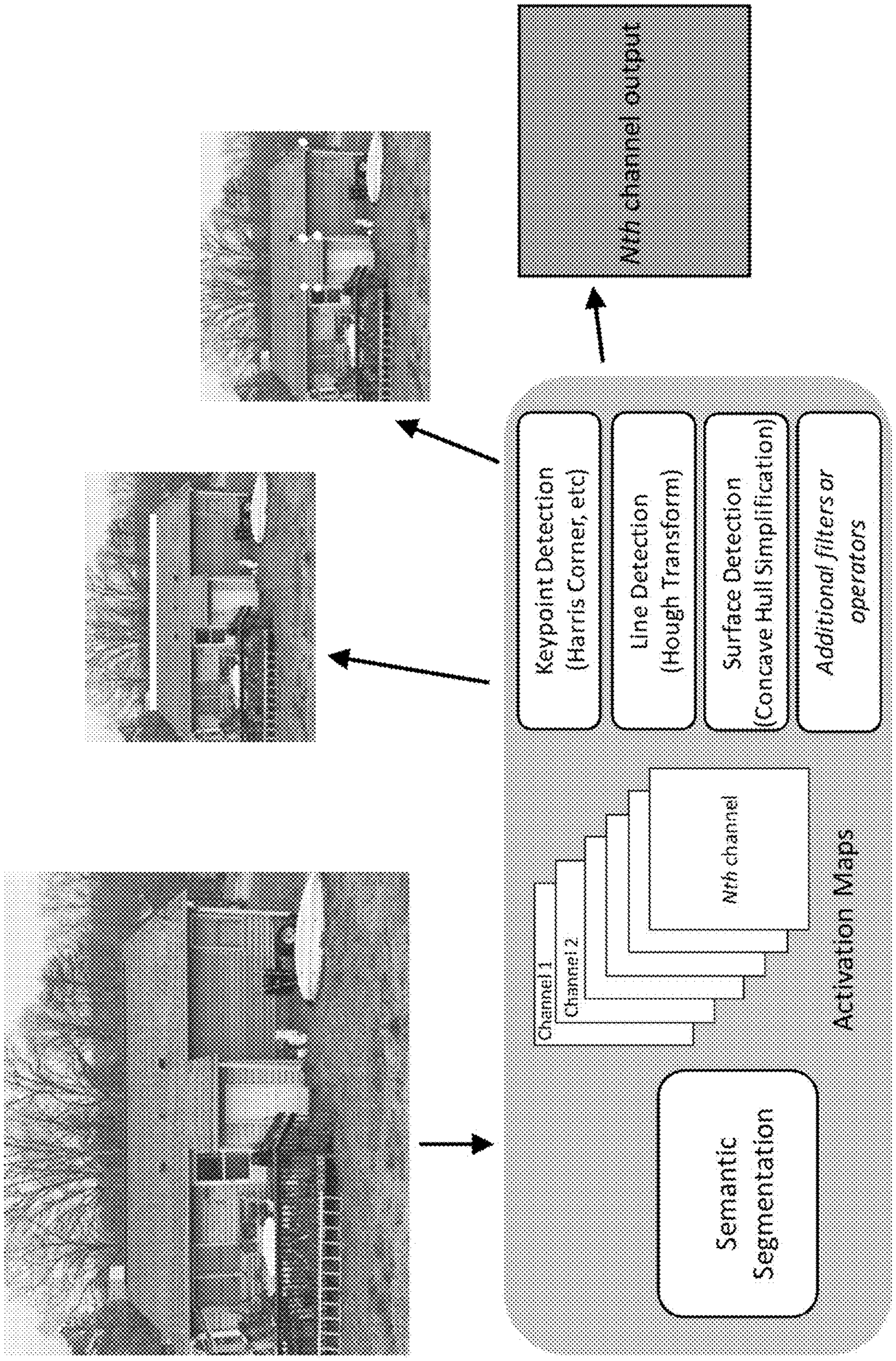
FIGS. 41A-41B illustrate operations for generating channel output for substructure identification, according to certain aspects of the present disclosure.
Figure 41B:
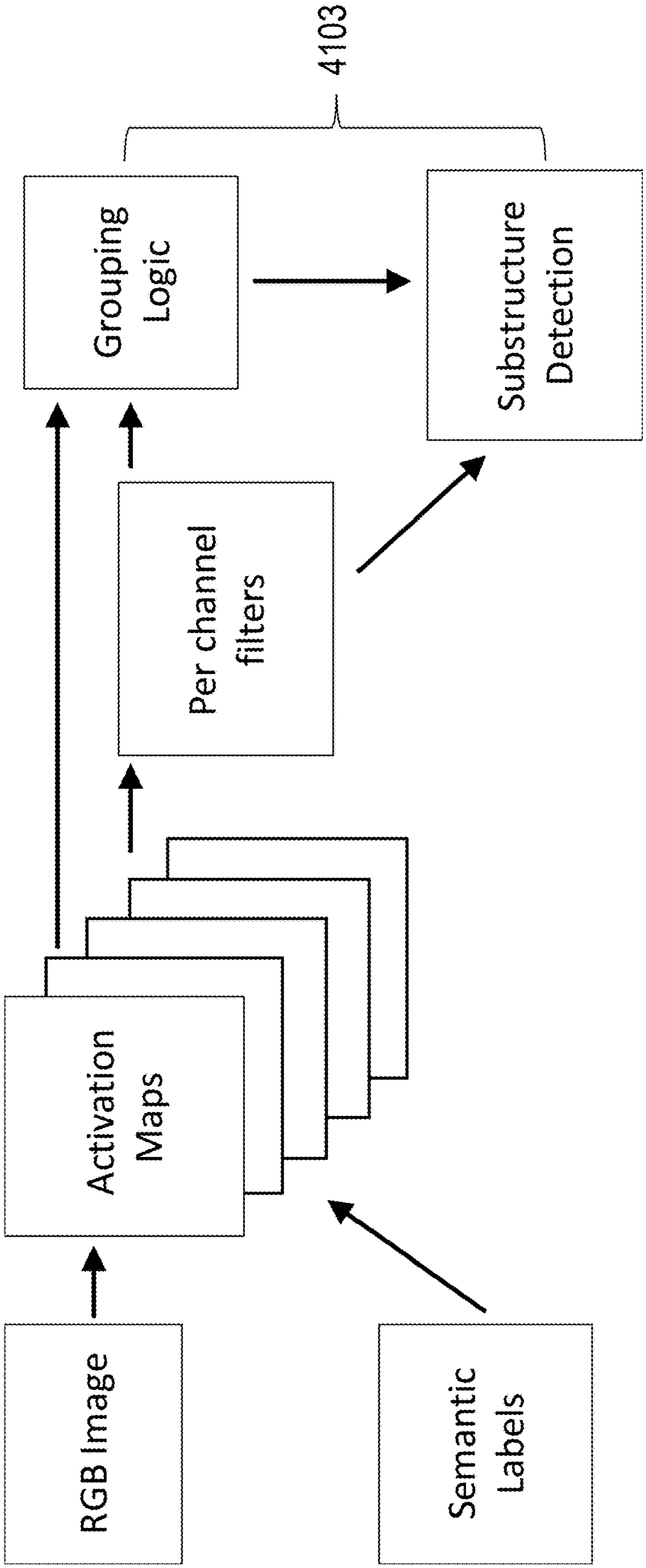

FIG. 41A illustrates this semantic scene understanding output as channels, wherein an input image is segmented for a plurality of N classification channels, and each classification extracted by a respective activation map. The activation map output may be further refined according to computer vision techniques applied as channel operators like keypoint detection, line detection or similar functions, though this step is not required. In some embodiments, a channel operator can aggregate multiple channels. These grouped or aggregates channel outputs create higher order substructure or subfeature channels based on the lower order activation map or channels for the input subject. In some implementations, bounding boxes can be fit to the resultant segmentation mask of lower order constituent channels or higher order aggregate channels as in steps 4103 of FIG. 41B. In some implementations, intermediate bounding boxes may be placed within the image and semantic segmentation performed within the intermediate box performed to identify discrete features such as soffit, fascia, trim and windows.

In some implementations, grouping of features or subfeatures may be configurable or automated. Users may select broad categories for groups (such as gable or roof) or configure unique groups based on use case. As the activation maps represent low order components, configuration of unique groups comprising basic elements, even structurally unrelated elements, can enable more responsive use cases. Automated grouping logic may be done with additional machine learning techniques. Given a set of predicted geometric constraints, such as lines or points generally or classified lines or points (e.g., as output by an activation map), a trained structure RCNN (Region-based Convolutional Neural Network) model can output grouped structures (e.g., primitives) or substructures.

Figure 42:
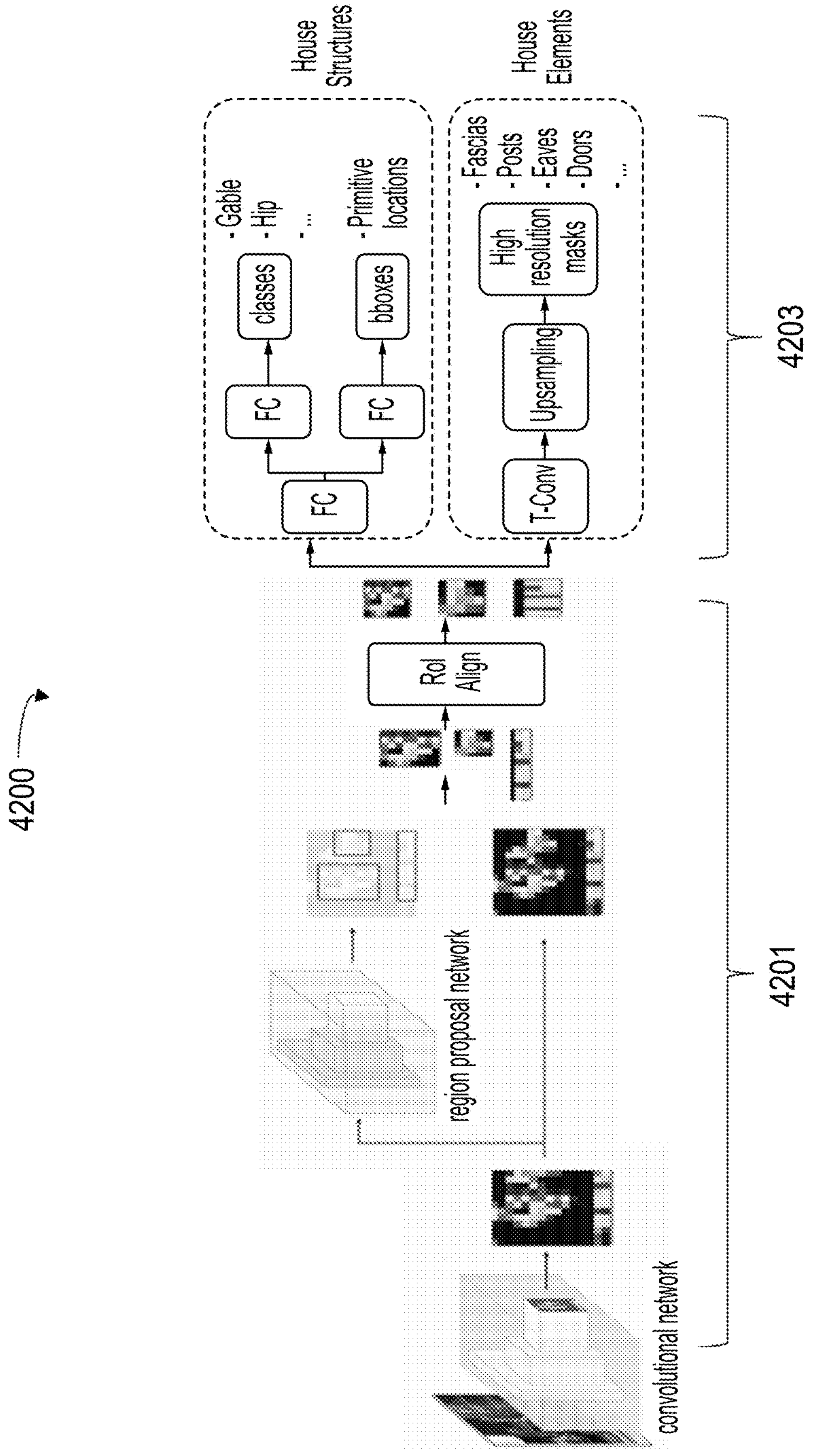
FIGS. 42-43B illustrate grouping operations for identifying substructures, according to certain aspects of the present disclosure.

FIG. 42 illustrates an example of a structure RCNN architecture 4200. Similar in architecture to mask RCNN in the art using early networks heads 4201 for region proposal and alignment to a region of interest, the structure RCNN of FIG. 42 can add additional elements 4203 for more specific capabilities, such as grouping. Whereas traditional mask RCNN may detect individual elements separately, such as sub-components or features and sub-features of a house, the structure RCNN first detects an overall target, such as House Structures (primitives like gables and hips) and then predicts masks for sub-components, such as House Elements (fascias, posts, eaves, rakes, etc.).

Whereas the House Elements head of network 4200 may use a combination of transpose convolution layer and upsampling layer, the House Structures head uses a series of fully connected layers to identify structural groupings within an image. This output may be augmented with the House Elements data, or the activation map data from the previously discussed network, to produce classified data within a distinct group. In other words, the structure RCNN architecture 4200 can discern multiple subcomponents or sub-structures within a single parent structure to avoid additional steps to group these subcomponents after detection into an overall target.

This avoids fitting a bounding box for all primitives or sub-structures, and distinguishes to which sub-structure any one subfeature may be grouped. Again using the gable detection illustrative use case, structure RCNN can identify a cluster of features first and then assign them as grouped posts to appropriate rakes to identify distinct sub-structures comprising those features, as opposed to predicting all rakes and posts in an image indicate "gable pixels."

Segmentation masks based purely on aggregate activation maps may produce masks and bounding boxes encompassing multiple sub-structures within the image frame; while a gable may be expressed by posts and rakes, it is particular posts and rakes within an image that define any one gable. Without the parsing of sub-structures into respective groups as with the illustrated structure RCNN, active guidance to facilitate framing a particular sub-structure may be as difficult as guidance to capture the entire subject house, as the prompts may attempt to fit all particular pixels for a class of sub-structure rather than simply a single instance.

Figure 43A:
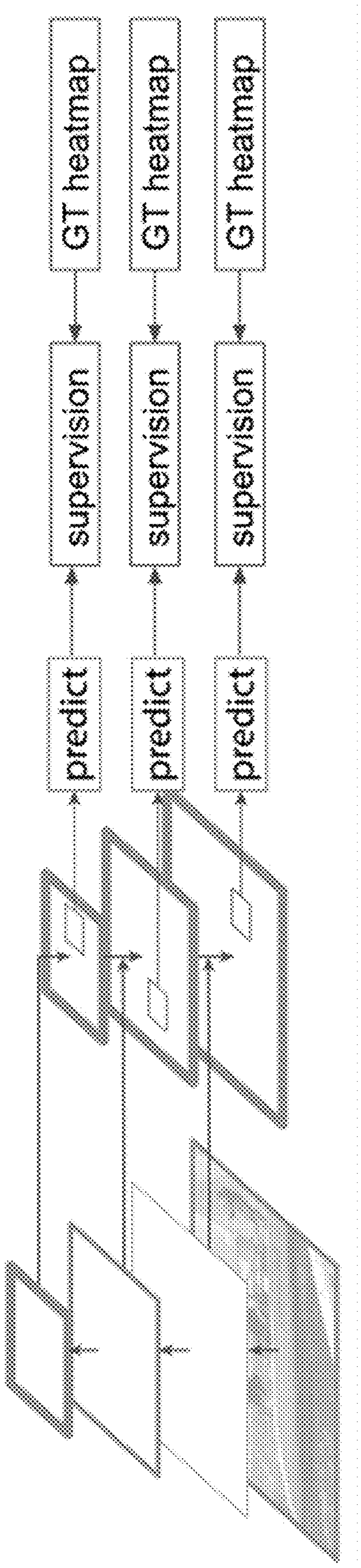
Figure 43B:
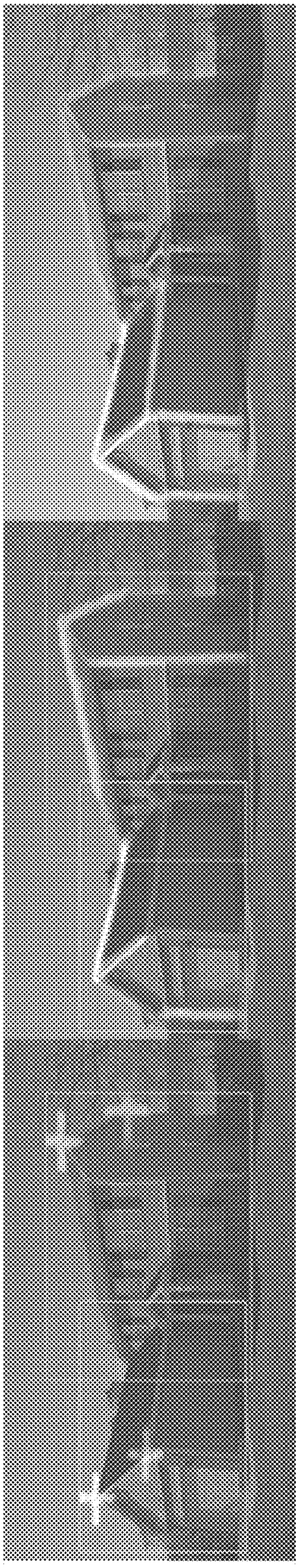

FIG. 43A illustrates a region-specific operation after a grouping is identified within an image, and then segmentation of pixels within the grouping is performed. As a result, regions of sub-structural targets are identified, as in the far left image of FIG. 43B, and in some implementations, a bounding box may be fit to these grouped sub-structural targets already. Submodules may then classify sub-components or subfeatures such as keypoint and lines via segmentation masks of various channels. Lastly, the network also predicts masks for features per-unique-substructure, as in the far right image of FIG. 43B. Features within a unique region or sub-structure may be indexed to that region to distinguish it from similarly classified elements belonging to separate sub-structures.

Figure 44A:
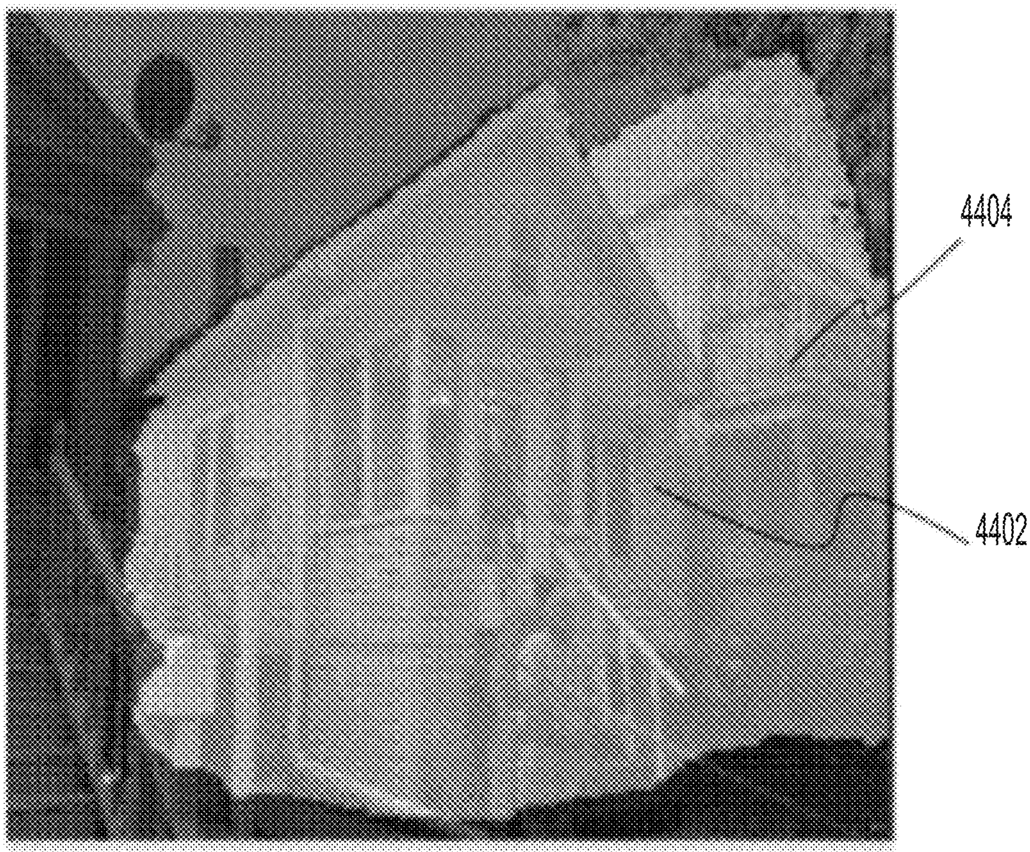
FIGS. 44A-44B illustrate extended segmentation mask identification problems, according to certain aspects of the present disclosure.
Figure 44B:
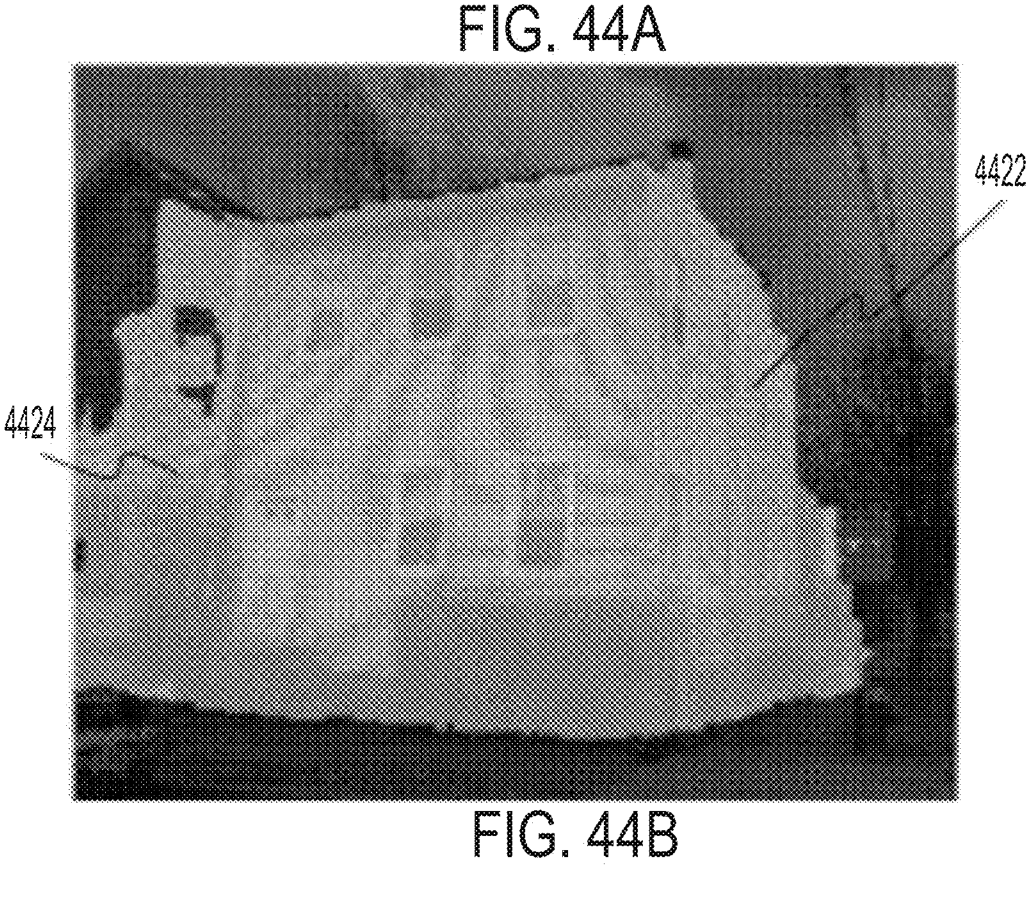

FIGS. 44A-44B illustrate a target location problem, specifically as incident to segmentation masks. In each of FIGS. 44A-44B, the segmentation mask can identify structure 4402 and 4422 respectively, but within a same mask includes structure 4404 with 4402, and 4424 with 4422. Such extended masks can result from multiple objects of a common classification being in close proximity to one another in the display. For images with multiple building objects, this can occur from tight lot lines, wherein buildings occupy much of the parcel they sit on or are placed close to the parcel line so that the building is near a neighboring parcel and structure. In other scenarios, townhouses and duplex style buildings wherein structures abut one another or share common facades can introduce the extended mask problem. For solutions described herein, this extended mask would lend incorrect capture feedback, as segmented pixels may occupy a display border pixel, even though such segmented pixel does not label (is not associated with) the intended building to be captured.

Figure 45A:
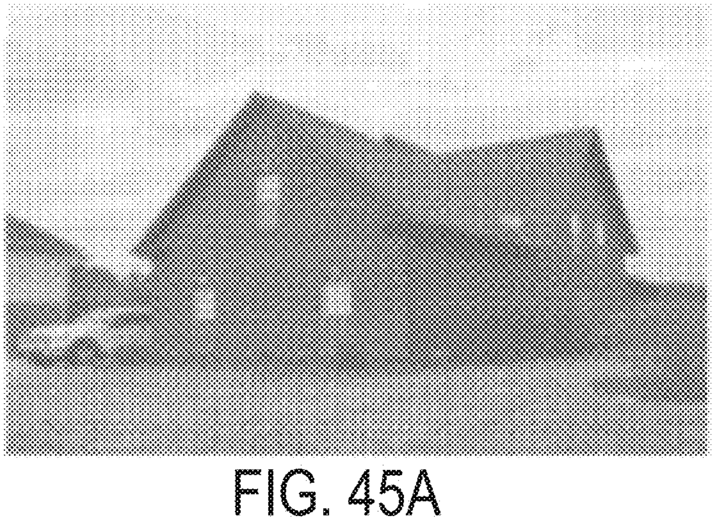
FIGS. 45A-45C illustrate crop randomization for training image generation.
Figure 45B:
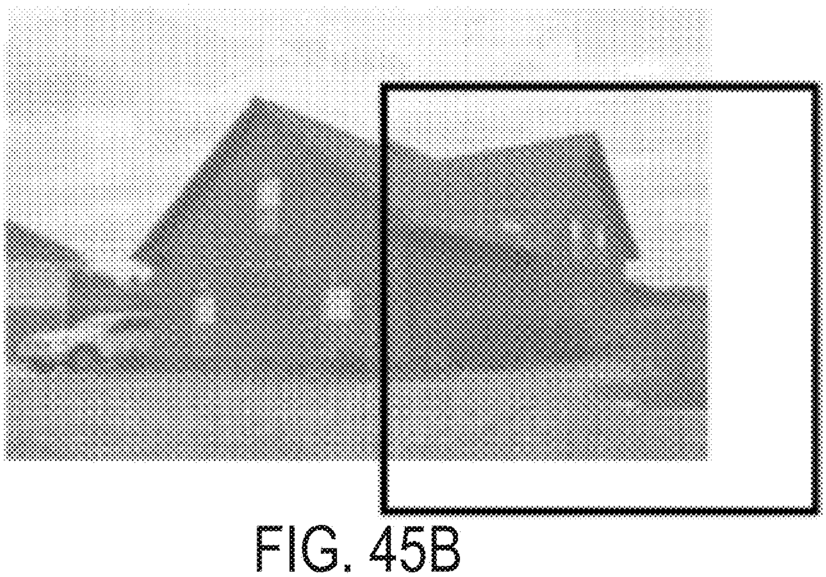
Figure 45C:
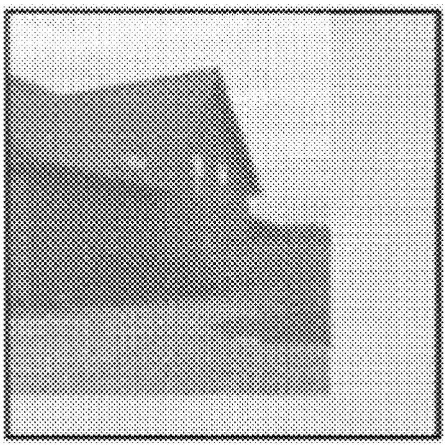

To improve the segmentation mask model output, intra-image parameter evaluation system 250 can include a segmentation model that is trained with a series of training images of selectively augmented cropped sub-images. Training images can be randomly perturbed to introduce variability in pixel values for a model to learn from or upon. For example, training images may be warped, or cropped, or color values changed. Random cropping will take an input image (see FIG. 45A) and implement a randomized crop; in some cases that randomized crop can extend out of the image as in FIG. 45B. The resultant training image is seen in FIG. 45C, where the out-of-image but still within-crop-border portion is assigned a default pixel value such as a gray or black color, though additional effects, such as mirroring, may be applied to this out-of-image region. While this technique may introduce useful training data by having pixels representing the same object (e.g., the gable that appears in each of FIGS. 45A-45C), but with additional data noise from the crop region and pixel location variability, the training image itself does not lend to useful on the fly applications because the random cropped image may not be an image that a system running the model will ever see in the real world. In other words, a camera may never see a view or capture an image that contains randomized values, such as what random perturbation for training images commonly imparts to the model.

In some implementations, images for training a model to only segment an object of interest among several similar objects in close proximity in a camera field of view can be cropped to contain cropped portions within the image itself. By doing so, the model can be trained on images that a system using that model may encounter in the real world (e.g., the model is not being trained on data it will never see in practice, as with the artificially cropped images with empty pixel regions illustrated in FIG. 45C). In some implementations, the model may only be trained using the selectively cropped image, and not using the original ground truth image(s) as well.

Figure 46A:
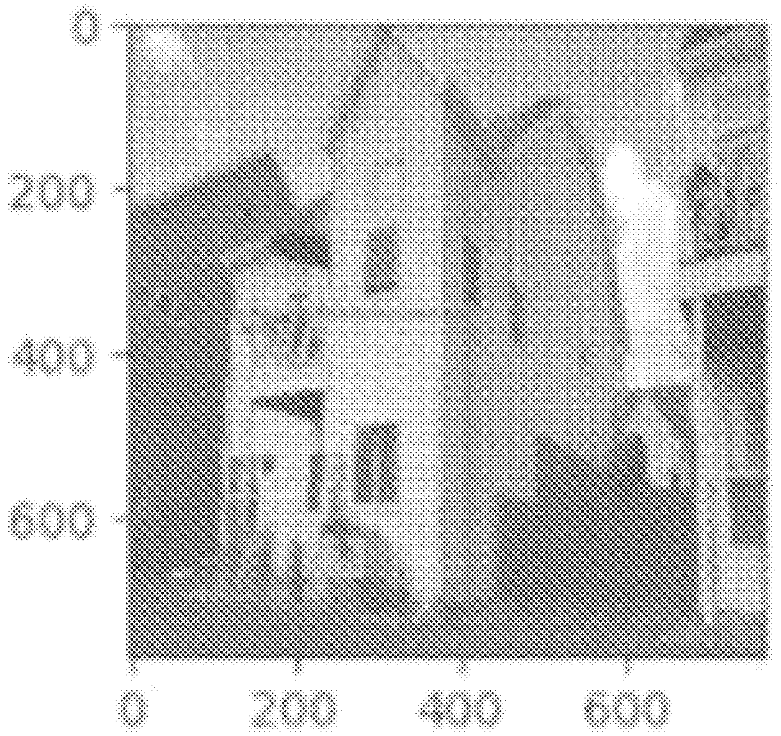
FIGS. 46A-46B illustrate center position results output determinations, according to certain aspects of the present disclosure.

To ensure the crop nevertheless comprises relevant training data for identifying a target of interest within the ground truth image, in some implementations, candidate crop portions can be created by generating a ground truth mask that can segment the target of interest in a ground truth image. FIG. 46A illustrates a ground truth image and in FIG. 46B its ground truth mask 4602.

Intra-image parameter evaluation system 250 can generate a candidate crop portion, which may be randomly sized, though, in some implementations, the candidate crop size is proportional to the original image, such as 25%, 50%, or 75%. In some implementations, the candidate crop shape is a quadrilateral, as expected for proportional sizing to the ground truth image. In some implementations, other candidate crop shapes are generated such as ellipse or circular. In some implementations, a candidate crop portion can maintain the same aspect ratio as the original image (which will influence candidate crop shape), but is a proportional reduction. One of skill in the art will appreciate that as candidate crop portions get very small (e.g., less than 10% of the original image) the value of the information within that candidate crop to training a model decreases, as it is increasingly likely to have only or no pixels of the target class and will obviate the minimum percent pixel occupancy threshold, as discussed below. As the pixel occupancy test is to confirm suitability for a bounding box center, candidate crop sizes with only or no target class pixels may not provide descriptor-like functionality for the suitability of a bounding box or segmentation mask center.

Intra-image parameter evaluation system 250 can select a filter overlay that fits within the generated candidate crop portion. The specific filter overlay shape or dimensions can be configured as a hyperparameter for training a model. In some implementations, the filter overlay shape can be a circular overlay within the candidate crop portion. In some implementations, the filter overlay shape can be an ellipse or Gaussian distribution with declining gradient towards the edges of the candidate crop portion. Regardless of specific filter shape, the characteristic of a filter overlay for a candidate crop portion can be density biased for the center of the candidate crop portion. Referring briefly to FIG. 47B, the circular overlay 4712 has a diameter that occupies the entire length (and correspondingly the height) of candidate crop portion 4702. Such a filter shape and size can be said to evaluate the pixels within the area (length×width) of candidate crop portion 4702 with a bias to evaluation closer to the center (e.g., by disregarding pixels along the candidate crop portion boundary).

Intra-image parameter evaluation system 250 can convolve the ground truth mask with the selected filter overlay, generating a result output. The result output itself can be subject to a series of thresholds to ensure the filter overlay is identifying sufficient pixels for a model to train upon. For result outputs wherein the segmented pixels occupy a minimum percent of the convolved filter overlay, the center of the filter overlay can be retained. In some implementations, the minimum percent can be 65%. Lower thresholds introduce increasingly diminished training image quality as the filter's ability to indicate the prevalence of classified pixels within the image is reduced, and may amount to simply repeating the ground truth mask. A model trained with such data may be less able to accurately predict whether a classified target is in fact the predominant object in a received image frame. Higher thresholds can likewise introduce error by only including pixels associated with the target of interest, which would result in the trained model only identifying objects in an image frame if the camera field of view was very close to the target of interest. In some implementations, a maximum percent can be 85%. By generating augmented crop images with pixels counts in the filter overlay above the minimum threshold, intra-image parameter evaluation system 250 can be biased to select augmented crop images that reflect a particular portion of the image, and thereby only a particular object within the image, while still maintaining an imperfect pixel distribution of classified pixels within the augmented crop image for the model to learn from.

Figure 46B:
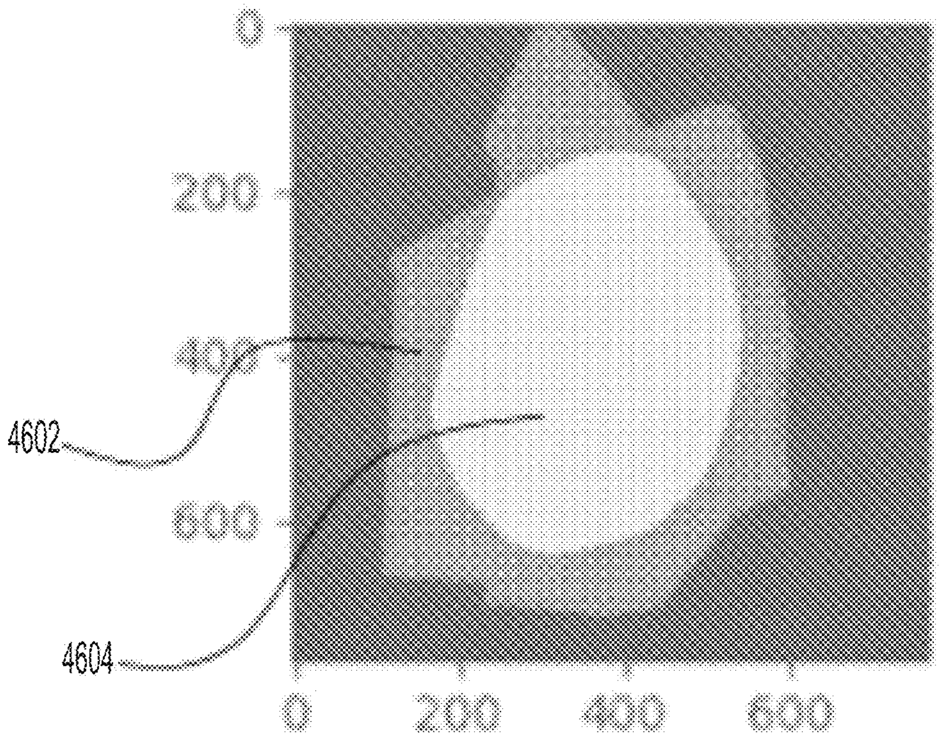

FIG. 46B further illustrates the convolved result output as region 4604. To generate the convolved result output as illustrated, a candidate crop portion one fourth the proportion of the ground truth image was selected and a circular overlay sized within those dimensions and convolved with the ground truth mask 4602. Region 4604 can depict output that, if a crop portion were centered at any of the pixels in region 4604, would be likely to include at least 65% of pixels that are associated with the target of interest house (as established by the classification of the ground truth mask).

In this context, the relationship between relevant training data, the center of a filter overlay, and the results generated by trained models is laid out. In some implementations, a convolved filter center can be a pre-training proxy for how to position a post-training bounding box, such as for target identification for segmentation. A filter overlay having a center that places a sufficiently high number of target object pixels within the filter overlay boundaries informs where a bounding box or segmentation mask center will similarly produce a high amount of desired classified pixels to a camera display in real world settings. In other words, an image frame with a desired segmented portion representing only a proportion of the image will receive the full attention of the bounding box. By only including a ground truth mask for a single object within the ground truth image, the model is trained upon images that similarly impart learning for the desired object. In execution, this results in the model regressing for segmentations that are not associated with the primary object in the image frame, and only returning values for a select object in the field of view.

In some implementations, the results output region is further reduced in dimensions such that an augmented crop (equal to the candidate crop portion size) with a center within region 4604 does not extend past the boundaries of the ground truth image. In some implementations, this reduction is one half the filter overlay dimensions.

Figure 47A:
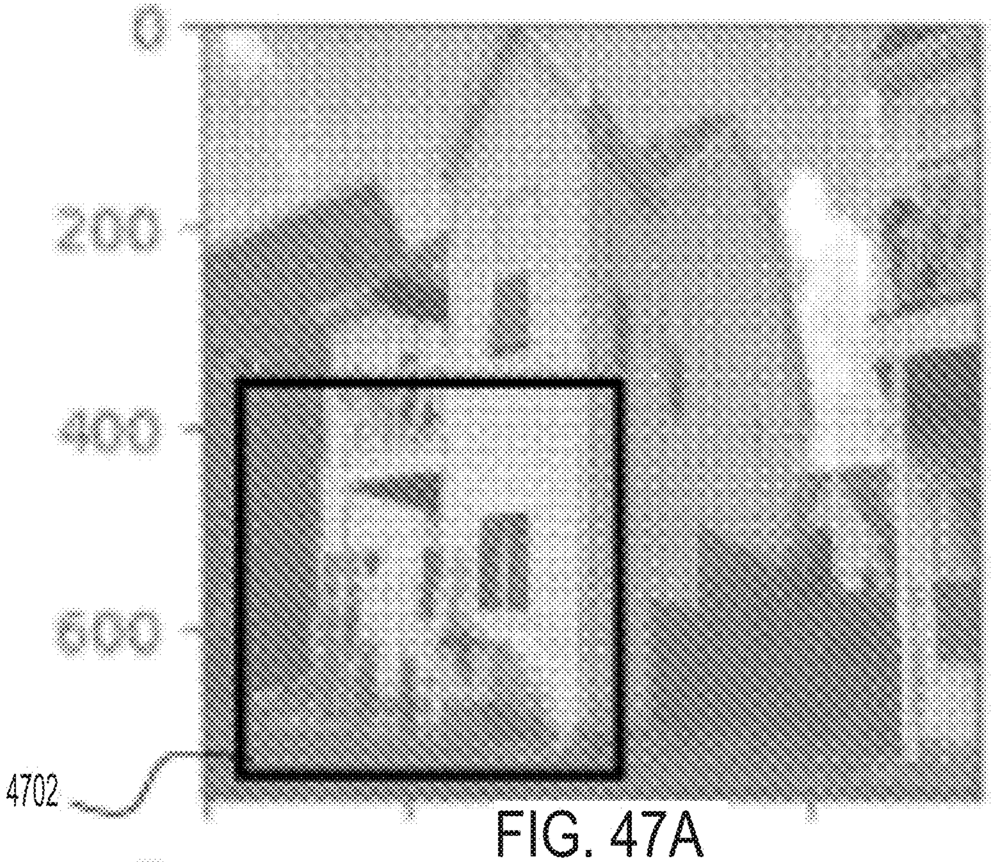
FIGS. 47A-47B illustrates a single candidate crop portion and filter overlay, according to certain aspects of the present disclosure.
Figure 47B:
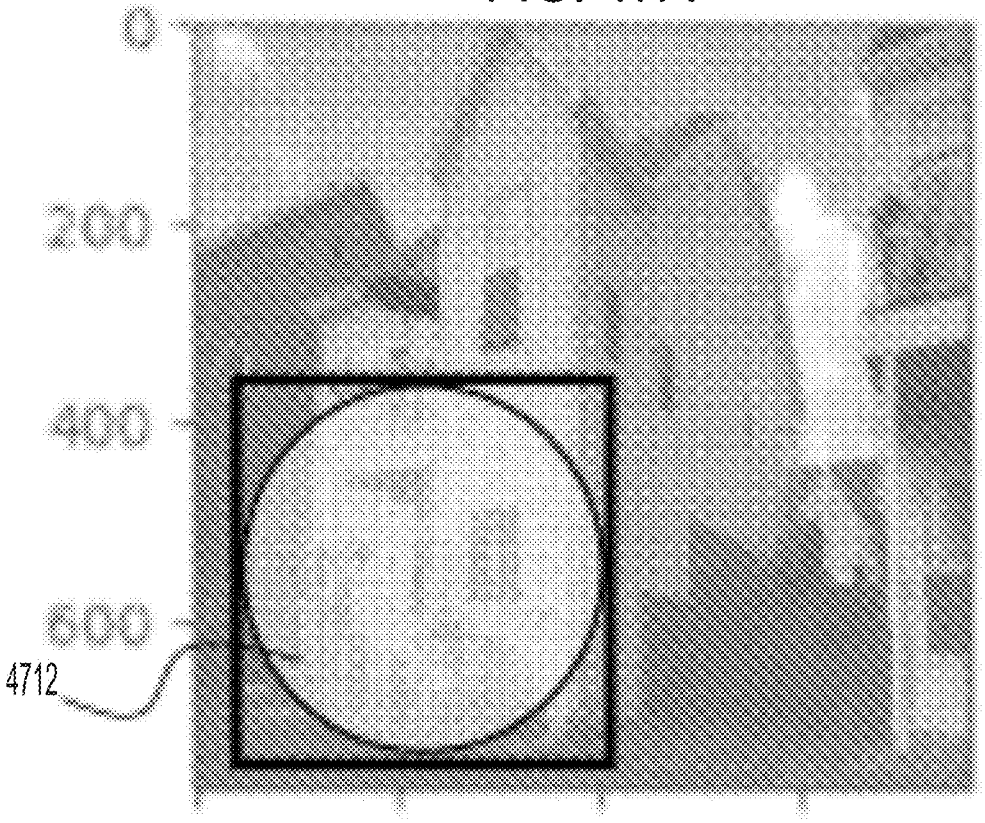

Referring to FIG. 47A, an image is shown of a home with neighboring buildings from tight lot lines. Intra-image parameter evaluation system 205 can select a candidate crop portion 4702 (e.g., randomized) for the lower left corner of the image and filter circle 4712 to fill candidate crop portion 4702. It should be noted that while a single candidate crop portion and filter overlay is depicted in FIGS. 47A-47B, this random generation is repeated to produce a plurality of circular overlays throughout the image. The ground truth mask (region 4602 from FIG. 46B) is convolved with the plurality of circular overlays. For those convolved filter overlays that comprise 65% ground truth mask pixels, an eligible augmented crop image center region result output is generated (e.g., region 4604 of FIG. 46B).

Figure 48A:
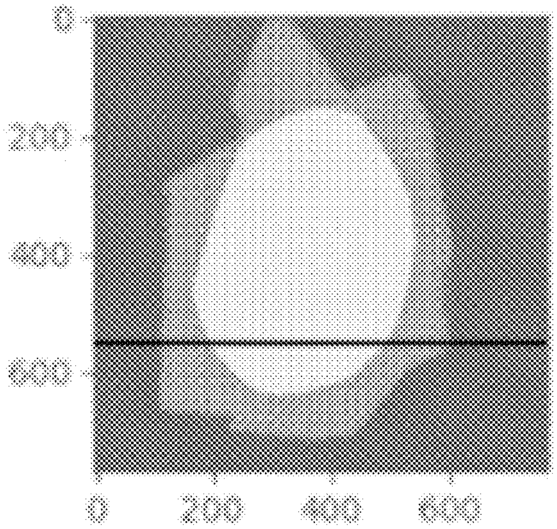
FIGS. 48A-48F illustrate augmented crop center pixel selection, according to certain aspects of the present disclosure.
Figure 48B:
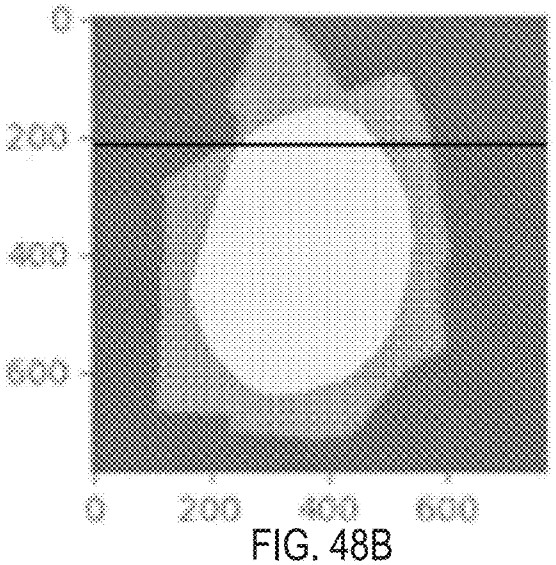
Figure 48C:
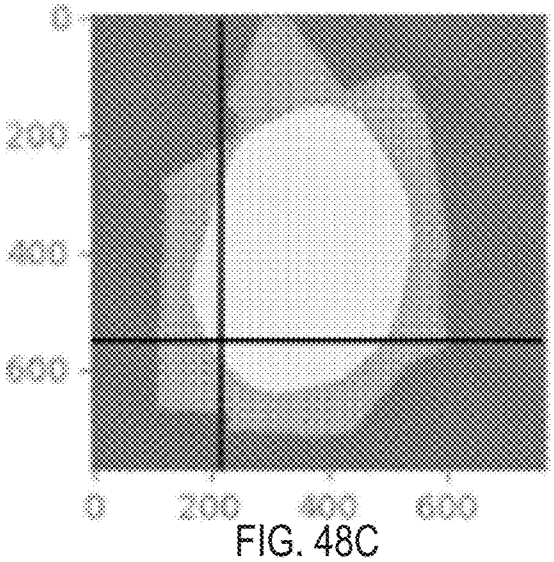
Figure 48D:
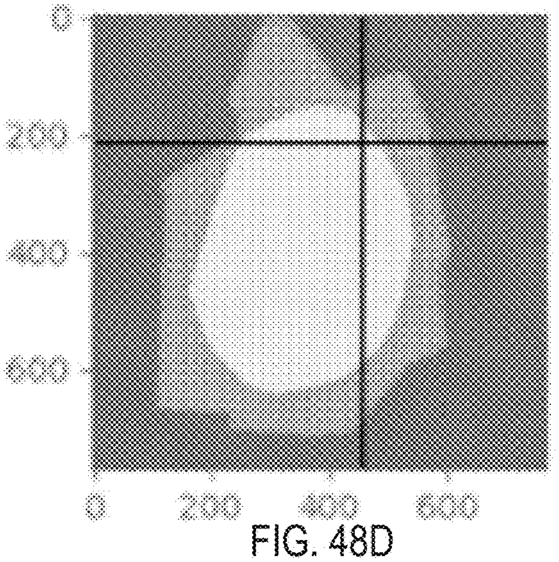
Figure 48E:
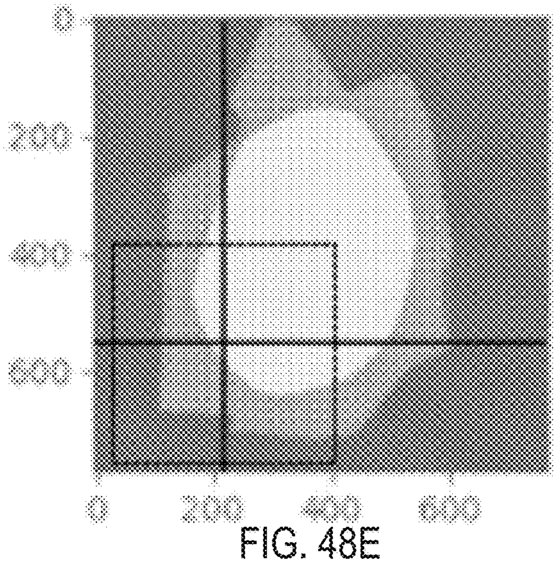
Figure 48F:
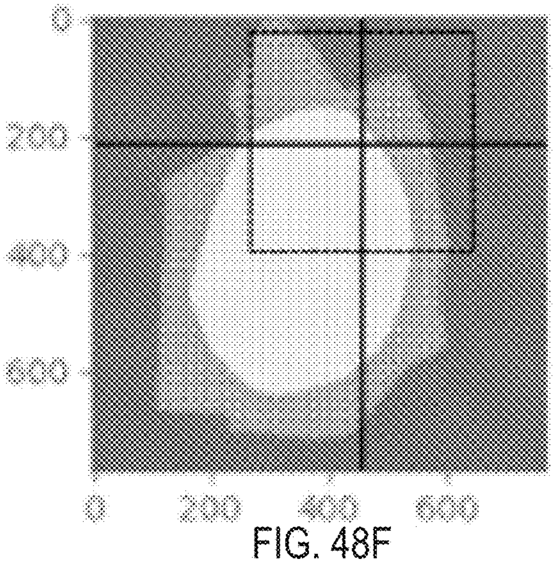
Figure 49A:
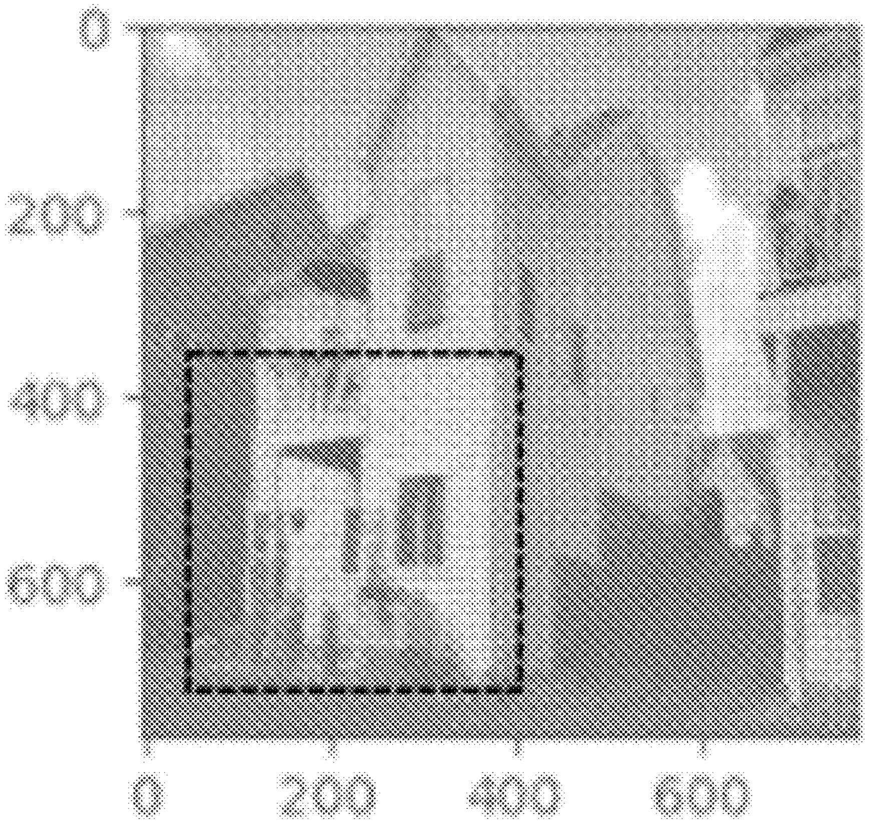
FIGS. 49A-49B illustrates augmented crop generation, according to certain aspects of the present disclosure.

In some implementations, a row of pixels from the row indices that contain a result output value is randomly selected, such as illustrated in FIG. 48A or FIG. 48B. Then a column from the column indices within the selected row that similarly contains a result output value is selected, such as illustrated in FIG. 48AC and FIG. 48D. In some implementations, this randomized row and column selection generates an x and y coordinate for an augmented crop image position or dimensions, such as the center pixel for an augmented crop image as shown in FIG. 48E or FIG. 48F. FIG. 49A illustrates augmented crop boundaries as identified by row and column selection in FIG. 48E; and this portion is cropped to generate the augmented crop image of FIG. 49B.

Figure 49B:
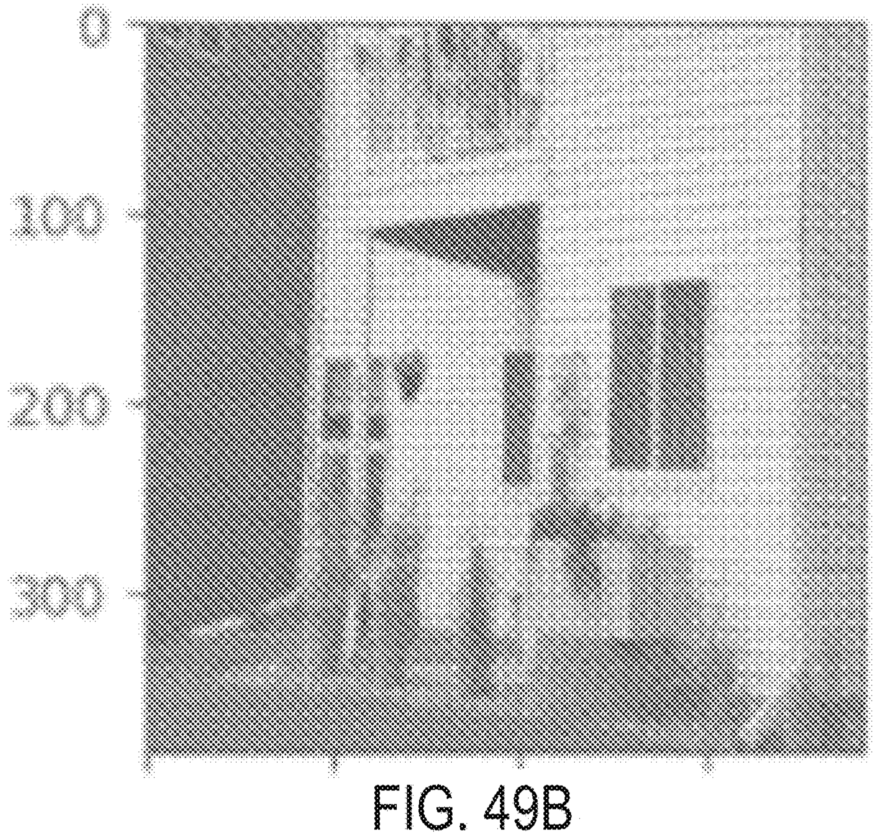
Figure 50A:
FIGS. 50A-50B illustrate improved target of interest results, according to certain aspects of the present disclosure.
Figure 50B:
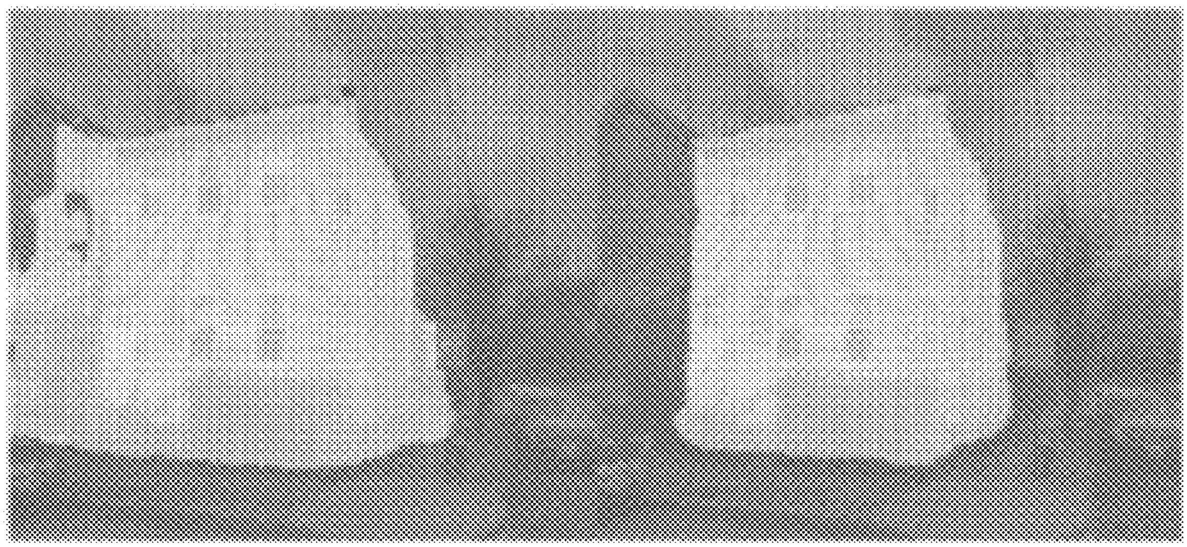

This augmented crop image FIG. 49B is the image used in a training epoch in lieu of the ground truth image.

In some implementations, this candidate crop portion and convolved filtering is across a plurality of ground truth images to produce a single augmented crop image for each ground truth input, and the model is trained on each augmented crop image within the set for an initial epoch. At the conclusion of the epoch, the candidate crop and convolved filtering steps are performed again for each ground truth image to produce a new augmented crop image training set for the next epoch and the process continues until convergence (identifying crops of images that contain a threshold number of pixels in the target classification).

In some implementations, the candidate crop portion and filtering for any one ground truth image is performed to produce a plurality of augmented crop images for that single ground truth image. In some implementations, to account for object density in an image, a proportional number of augmented crop images is generated per ground truth image. For example, if a ground truth image depicts three homes, three augmented crop images are generated against the single ground truth mask of the target home. As the ground truth mask (e.g. region 4602 of FIG. 46B) segments only a particular object of a given classification, the plurality of augmented crop images all contain different portions of the same object. In some implementations, a structure density for an image is obtained by human labelling for the ground truth image.

In some implementations, the ground truth image comprises metadata assigning a structure count value. The structure count can be obtained from third party sources and/or stored in database 1924 of FIG. 19 as part of or associated with a respective ground truth image. In some implementations, the metadata for structure count is associated with a geolocation metadata field, and the structure count value is obtained from aerial imagery. A geolocation, such as GPS coordinates, identifies a location associated with the object in the image and a radius is drawn from that location on the aerial image to generate a density circular overlay to identify the number of structures within and assign that value to structure count metadata field. In some implementations, the radius can be 100 meters. In other implementations, the radius can be 50 meters. Geography and urban setting (e.g., suburban neighborhoods versus rural areas) may dictate the size of the density circular overlay radius.

For embodiments with a plurality of augmented crop images, each epoch will train on each of the plurality of augmented crop images for each ground truth image. At the conclusion of the epoch, the candidate crop and filtering steps are performed again for each ground truth image to produce a new plurality of augmented crop images for the next epoch and the process continues until convergence (a segmentation model that identifies portions of an image frame that contain a threshold number of pixels in the target classification for the object of interest).

In application, without using the trained model output to center a bounding box or segmentation mask, if a bounding box or segmentation mask were to be applied to any pixels of the target classification, nearest neighbors would lead to oversized bounding boxes or segmentation masks that include the non-object of interest classified pixels. Using the techniques disclosed herein, the classified pixels nearing the edges of a bounding box or segmentation mask or image frame introduce regression into the model and have less influence on the output, such that a resultant mask or associated bounding box around that mask is more likely to include only pixels of a single object of interest of the image. Additionally, the techniques disclosed herein improve the functioning of a server's ability to automatically detect a target object of interest in an image, amongst multiple other objects with the same classification.

In some implementations, input images were cropped according to the above techniques, and used as training images for icnet v.0.2 and deeplab v.0.2. The trained models were then shown the same images as in FIGS. 44A-44B with results depicted in FIGS. 50A-50B. In some implementations, the DeepLab v3 model was run on a mobile device with MobileNet v2 as the backbone network to enable on the fly mobile functionality, though in some embodiments server operations could support ResNet as a backbone network as well.

Figure 51:
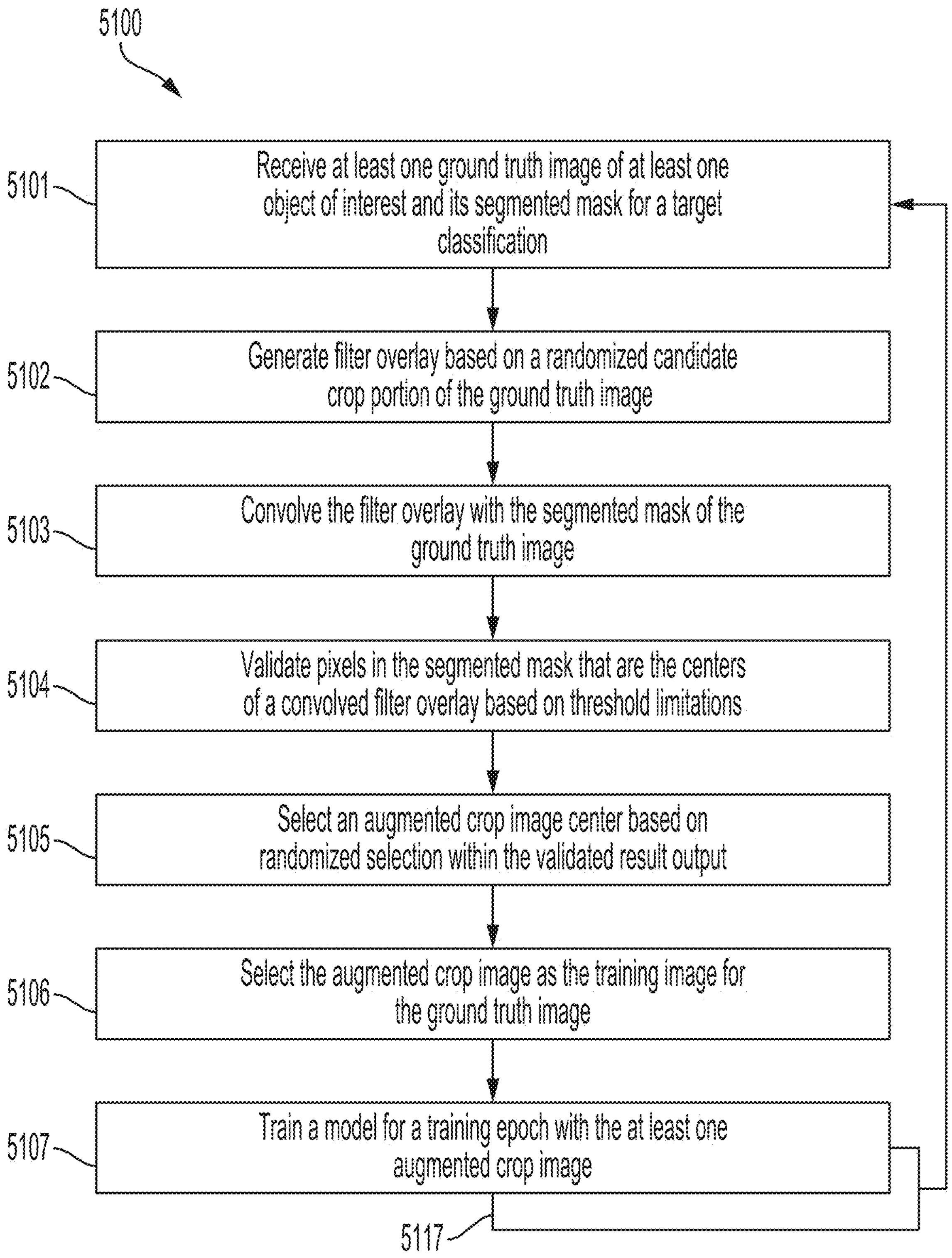
FIG. 51 is a flowchart illustrating an example of a process for generating a training set, according to certain aspects of the present disclosure.

FIG. 51 is a flowchart illustrating an example of a process 5100 for generating training data, according to the techniques described throughout this disclosure. Process 5100 can be performed by any components described herein, for example, any component described with respect to FIG. 1, 2, or 52. Process 5100 begins at step 5101, where, for example, intra-image parameter evaluation system 250 can receive a plurality of ground truth images and their segmented masks for a single object in the ground truth image. Note this is a mask for a single object, not a mask for a single classification; that is, only a single object of the target class (e.g., a house) will have a mask even through the ground truth image may comprise one or more objects of the target class.

At block 5102, intra-image parameter evaluation system 250 can identify a candidate crop portion. The cropped portion can be a proportion of the original image, and no portion of the crop comprises pixels outside the boundary of the original ground truth image. The proportion may be as low at 25% or as high as 75% of the original image; lower crop proportions will have less value as they will comprise less variability in pixel quantification as described below, and higher crop proportions will have less value as they will introduce less variability across training epochs as described below. Intra-image parameter evaluation system 250 can apply a filter overlay to the identified candidate crop portion. For example, the filter overlay can be a shape within the candidate crop portion. The candidate crop portion can be a quadrilateral as it is a proportion of the original ground truth image, though other candidate crop portion shapes are possible depending on the desired result output and input ground truth image shape.

The filter overlay shape can be one that fits within the candidate crop portion, and an outline of the filter overlay shape can have minimal contact or overlap with the candidate crop portion boundaries. For example, a circular filter overlay may only tangentially touch the candidate crop portion boundary, or be sized such that the circumference outline does not touch the candidate crop portion boundary at all. In any regard, the filter overly may not extend beyond the candidate crop portion boundaries. In some implementations, the filter overlay can have a geometric center common with the geometric center of the candidate crop portion. The coincident centers ensures that convolved output (as described below) accurately reflects the centers of augmented crop images for training the model.

At block 5103, intra-image parameter evaluation system 250 can convolve the filter overlay based on the candidate crop portion at a plurality of locations with the segmented ground truth mask to identify portions of the image that contain pixels for the target classification of the ground truth mask.

At block 5104, intra-image parameter evaluation system 250 can validate the locations for the centers of qualifying filter overlays. A qualified filter overlay is one that contains, within the filter overlay's boundaries at a given position, pixels of the target classification (e.g., "house") within quantified threshold tolerances. Threshold tolerances may be as low as 65% or as high as 85%. That is, at a given position, at least 65% of the pixels in that filter overlay belong to the target classification. Though FIG. 51 depicts block 5104 occurring after step 5103, this is not required and block 5104 may simultaneously with block 5103.

At block 5105, intra-image parameter evaluation system 250 can select an augment crop image center from the validated results output of the convolution. In some implementations, an augmented crop image centered can be selected by random selection of a pixel row that intersects a validated results output region, and then a pixel column can be selected that both intersects that selected row and the validated results output region. Other randomization selection techniques are possible, such as column then row selection or other schemes.

At block 5106, intra-image parameter evaluation system 250 can generate an augmented crop image for that selected center, and the augmented crop image can be used as a training image for the associated ground truth image. This process is repeated for every ground truth image in the received set at block 5101. At block 5107, a deep learning model can be trained with each representative augmented crop image. Once each representative augmented crop image has been seen by the model (an "epoch"), the process begins again at block 5117. For a second or nth epoch, the randomization of block 5102 is unlikely to produce the same augmented crop image as in a previous epoch, though such result is possible. In some implementations, this can be controlled by programmatically generating different candidate crop proportion sizes across epochs, using different filter overlay shapes and/or sizes across epochs, or maintain a lookup table of previous augmented crop image metadata to discount any repeats across epochs.

Process 5100 may repeat itself as long as desired for n epochs, or until convergence is met.

Figure 52:
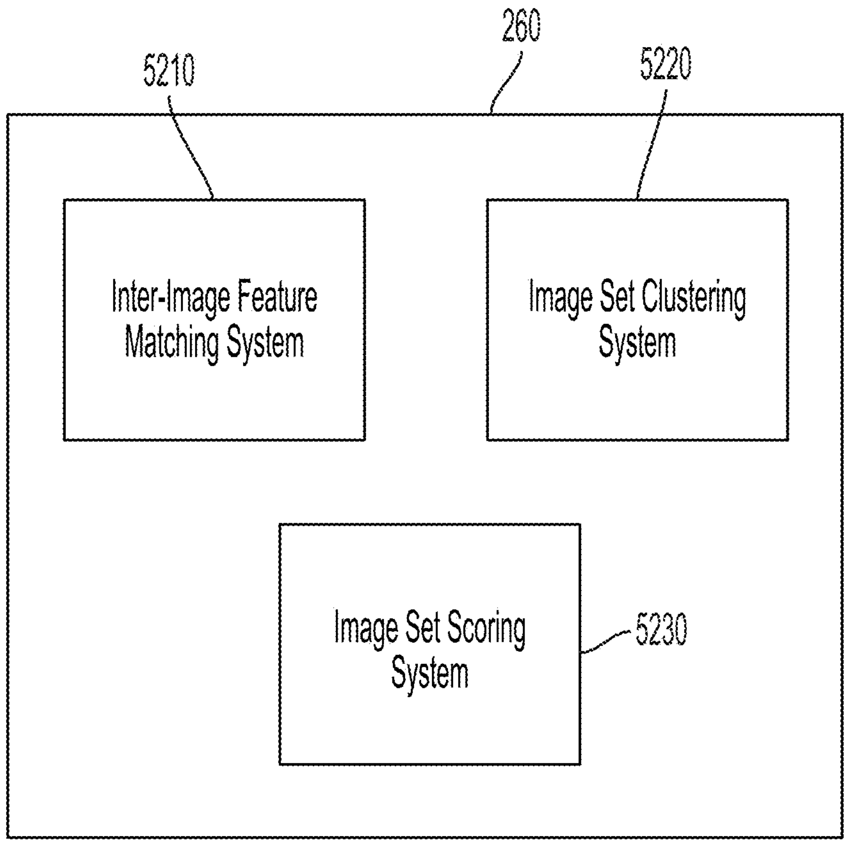
FIG. 52 is a block diagram illustrating an example of a network environment of an inter-image parameter evaluation system, according to certain aspects of the present disclosure.

FIG. 52 is a block diagram illustrating an example of components of inter-image parameter evaluation system 260, according to certain aspects of the present disclosure. In some implementations, inter-image parameter evaluation system 260 can include several components, including inter-image feature matching system 5210, image set clustering system 5220, and image set scoring system 5230. Each of inter-image feature matching system 5210, image set clustering system 5220, and image set scoring system 5230 can communicate with any other component of inter-image parameter evaluation system 260.

Figure 53:
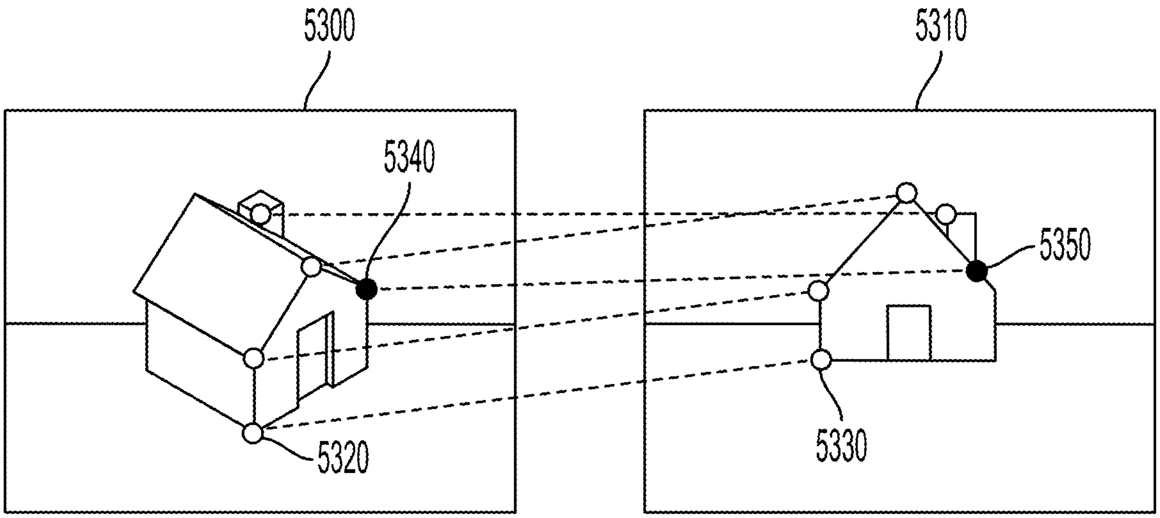
FIG. 53 illustrates examples of feature correspondences between two images captured during an image capture session, according to certain aspects of the present disclosure.

The interactions between the various components of inter-image parameter evaluation system 260 will be described with reference to FIGS. 53-58. Inter-image feature matching system 5210 can be configured to detect feature matches between a pair of images (e.g., a successive pair of images captured during an image capture session). For example, feature matching can include determining an association between a feature detected in the first image of the pair and another feature detected in the second image of the pair. The association between the two detected features can indicate that the two detected features share a common 3D position. As an illustrative example, as illustrated in FIG. 53, image 5300 can be a first image of a successive pair of images captured during an image capture session, and image 5310 can be a second image of the successive pair of images. Image 5300 can represent an angled view of the house, and image 5310 can represent a front view of the same house. Inter-image feature matching system 5210 can detect features within image 5300, such as feature 5320 (e.g., a bottom left corner of a house) and feature 5340 (e.g., a right-side corner of the roof of the house). Likewise, inter-image feature matching system 5210 can detect features within image 5310, such as feature 5330 (e.g., a bottom left corner of the house) and feature 5350 (e.g., a bottom corner of a chimney located on the right side of the roof). Given the features detected in each of images 5300 and 5310, inter-image feature matching system 5210 can perform a feature matching technique that detects a statistical correspondence between, for example, feature 5320 of image 5300 and feature 5330 of image 5310. Non-limiting examples of feature matching techniques include Brute-Force matching, FLANN (Fast Library for Approximate Nearest Neighbors) matching, local feature matching techniques (RoofSIFT-PCA), techniques that evaluate robust estimators (e.g., a Least Median of Squares estimator), and other suitable techniques. Regardless of the feature matching technique used, each feature match may be associated with a confidence score that represents a probability that the match is accurate. For example, the match between feature 5320 and feature 5330 has a higher confidence score than the match between feature 5340 and feature 5350. Both features 5320 and 5330 correspond to the bottom left corner of the house. However, feature 5340 is incorrectly matched with feature 5350 (as indicated by the black circles in FIG. 53) because feature 5340 represents a corner where a rake line meets a fascia line on the right side of the roof, but feature 5350 represents a corner where the bottom of the chimney meets the roof.

Figure 54:
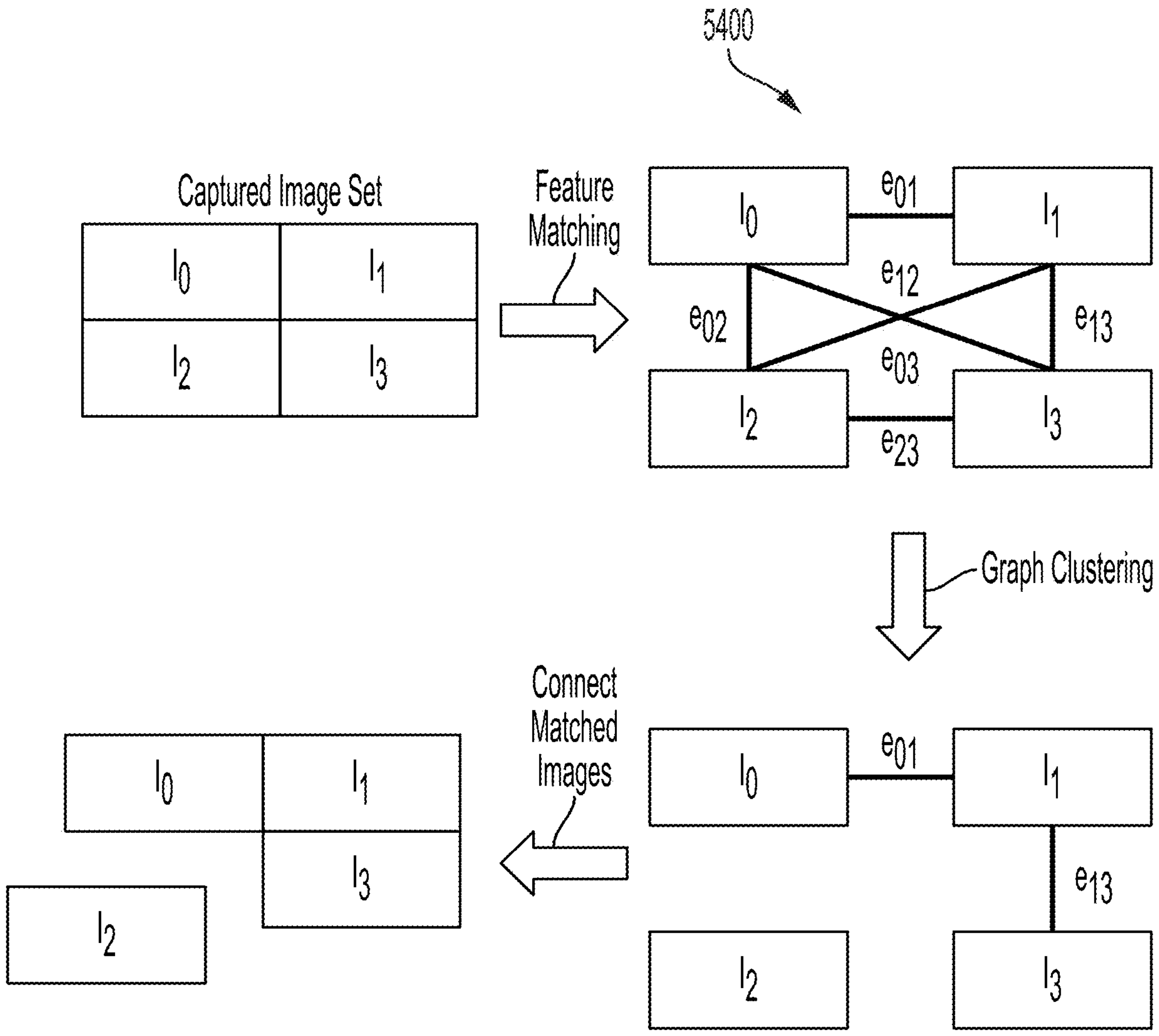
FIG. 54 illustrates an example of a process flow for generating a 3D coverage metric representing a quality of feature correspondences between pairs of images within a set of images, according to certain aspects of the present disclosure.

After inter-image feature matching system 5210 performs feature matching between each pair of images of the competed set of 2D images, inter-image feature matching system 5210 can generate a graph structure 5400, as shown in FIG. 54. The graph structure 5400 can represent the complete set of 2D images captured during an image capture session. The graph structure 5400 can include a plurality of nodes (e.g., $I_0$, $I_1$, $I_2$, and $I_3$), and each node can represent an image of the set of 2D images. If inter-image feature matching system 5210 detects a feature match between two images, then inter-image feature matching system 5210 can associate the two corresponding nodes with an edge (e.g., a node connection, as indicated by $e_{01}$, $e_{02}$, $e_{13}$, and so on). Each edge can be associated with a weight that can represent a degree of shared features between two images. As an illustrative example, for a given pair of images with at least one feature match between the two images, the weight between two nodes of the graph structure 5400 can be determined by identifying the number of feature matches between the two images and weighing each feature match by the confidence of that feature matches, and then combining (e.g., summing) the results into a single value. Inter-image feature matching system 5210 can determine the weight for each edge in graph structure 5400. In some embodiments, a confidence in feature matching is an output of a networking predicting the correspondences. A confidence may be further weighted based on feature type. Features attributed to surfaces may be weighted lower, while lines or points, or intersections of lines that form points at corners, may be weighted higher.

Image set clustering system 5220 can be configured to execute a clustering operation on graph structure 5400. In some implementations, the clustering operation can be a spectral clustering technique that clusters the nodes of graph structure 5400 based on the weights of the edges. As illustrated in FIG. 54, the spectral clustering technique can cluster the nodes of graph structure 5400 into two clusters: one cluster can include images $I_0$, $I_1$, and $I_3$, and the other cluster can include image $I_2$. The clustering operation can be performed to prune certain edges, such as the edges that represent feature matches below a threshold number of feature matches, below a threshold confidence, or below a threshold number of associated planes or lines (e.g., indicating a lack a diversity of planes on which the features are detected). Image set clustering system 5220 can connect the images included in each cluster. In some implementations, inter-image feature matching system 5210 can formulate the set of 2D images as a graph neural network. Image set clustering system 5220 can execute any clustering technique on the graph neural network (e.g., Graph2Vec), such as spectral clustering, supervised, semi-supervised, or unsupervised graph clustering, distance-based clustering, clustering based on computed node similarity, or any suitable clustering technique. In some implementations, the clustering parameters or the clustering technique itself can vary depending on one or more factors, such as expected time for generating a 3D model. For example, if weights below a certain threshold are not pruned, then it may take a longer time for 3D model reconstruction system 280 to generate a 3D model, and thus, image set clustering system 5220 can select a cluster technique that prunes edges that are below a threshold.

Image set scoring system 5230 can be configured to generate a 3D coverage metric for the set of 2D images. The 3D coverage metric is a value that represents the degree to which the detected feature correspondences between pairs of images of the set of 2D images are sufficient for allowing 3D model reconstruction system 280 to reconstruct a 3D model of a physical structure. The 3D coverage metric may be inversely proportional to the number of clusters formed after the clustering operation is executed. The existence of multiple clusters indicates the existence of uncovered areas of the physical structure. For example, the formation of two clusters after performing the clustering operation indicates that one or more edges have been pruned as a result of executing the clustering operation. When two or more clusters are formed, the inter-cluster images do not share feature matches that are suitable for 3D reconstruction of the 3D model.

Figure 55:
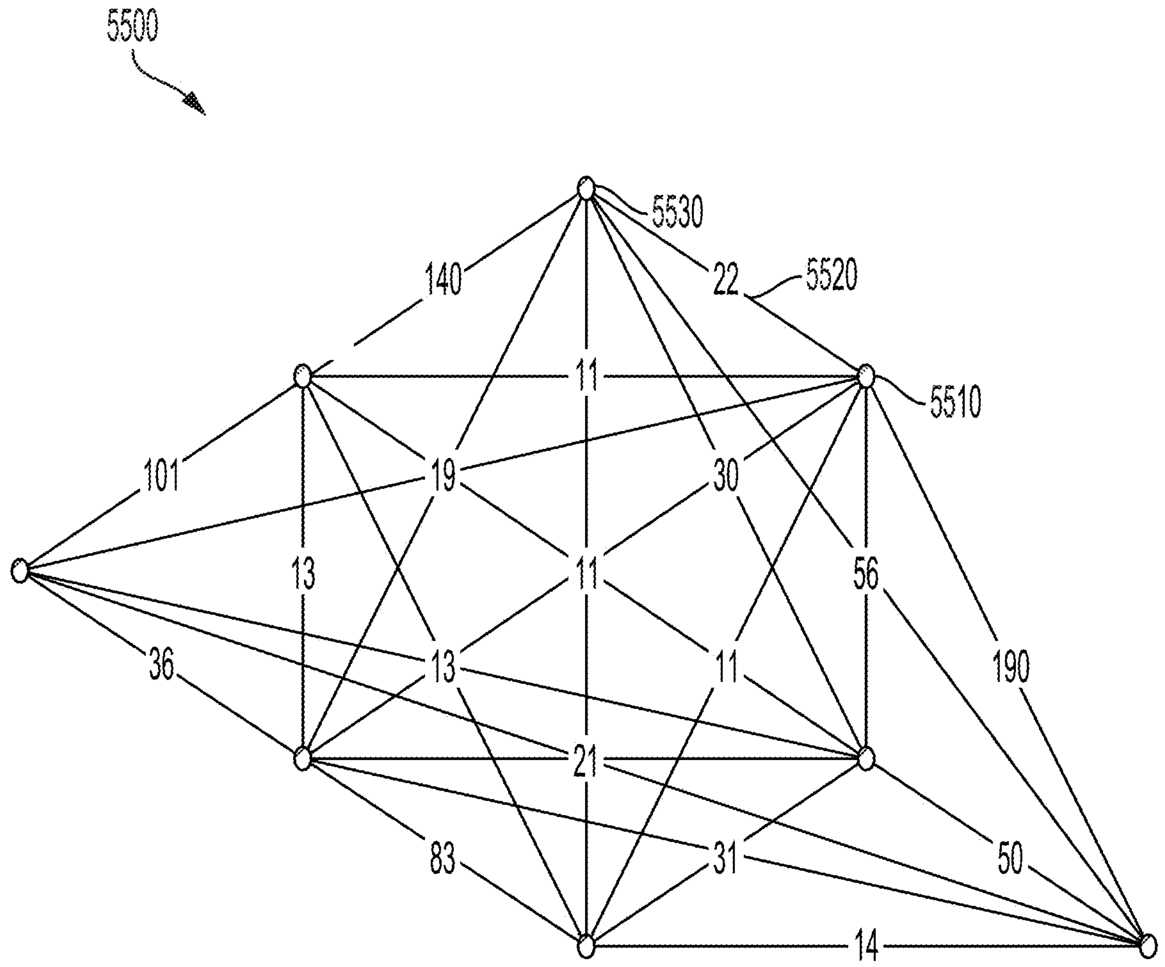
FIG. 55 illustrates an example of a graph structure representing a set of images, according to certain aspects of the present disclosure.
Figure 56:
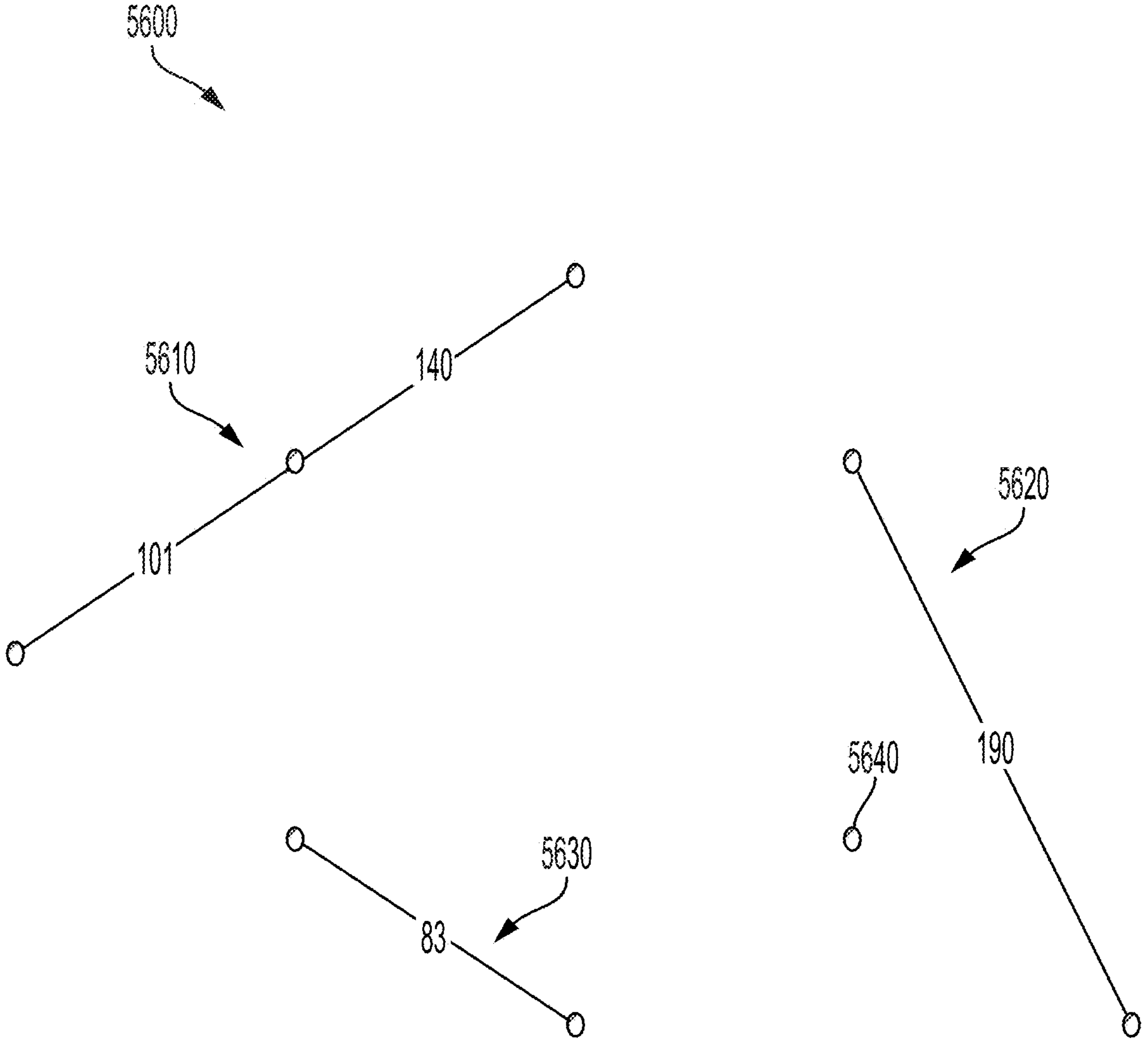
FIG. 56 illustrates an example of multiple clusters of nodes of the graph structure illustrated in FIG. 55, according to certain aspects of the present disclosure.

FIG. 55 illustrates another example of a graph structure generated by inter-image feature matching system 5210. For example, graph structure 5500 includes a plurality of nodes. Each pair of nodes of graph structure 5500, such as node 5510 and node 5530, can be connected by an edge, such as edge 5520, which represents a degree of feature matches between node 5510 and 5530. FIG. 56 illustrates a result of performing a clustering operation on graph structure 5500. For instance, image set clustering system 5220 can be configured to execute a clustering operation, and a result of the clustering operation may be the formation of clusters 5610, 5620, and 5630.

Figure 57:
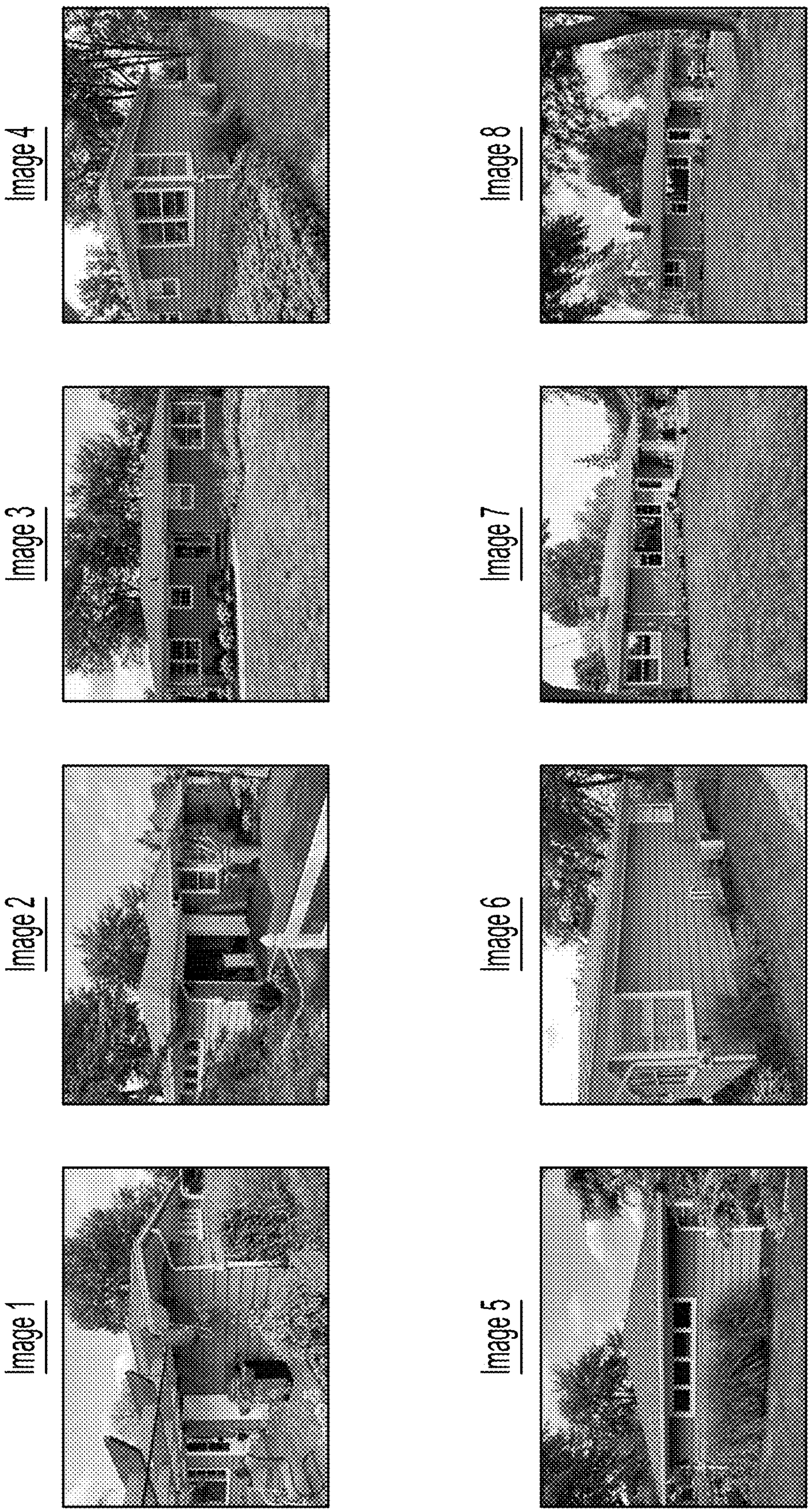
FIG. 57 illustrates an example of a set of images that capture a residential building from multiple viewpoints, according to certain aspects of the present disclosure.
Figure 58:
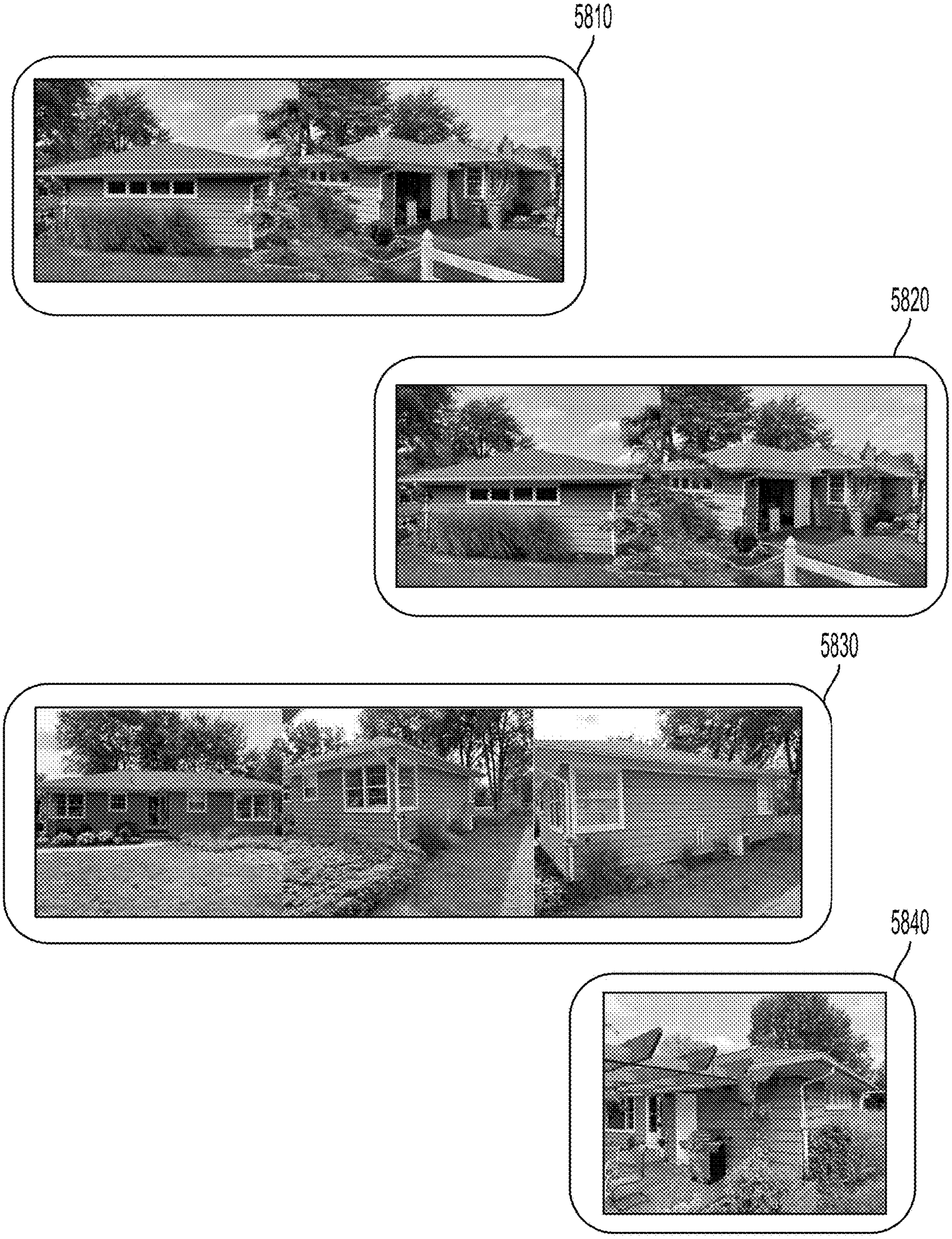
FIG. 58 illustrates an example of multiple clusters of images of the set of images illustrated in FIG. 57, according to certain aspects of the present disclosure.

FIG. 57 illustrates an example of a set of 2D images captured during an image capture session. The set of 2D images can include images 1 through 8, as shown in FIG. 57. Each image of images 1 through 8 can depict a physical structure. Images 1 through 8 can cover the physical structure from various angles. The set of 2D images can be inputted into inter-image parameter evaluation system 260 to generate a 3D coverage metric that represents a degree to which images 1 through 8 are suitable for the purpose of 3D model reconstruction. After the set of 2D images is inputted into inter-image parameter evaluation system 260, then inter-image feature matching system 5210 can detect one or more feature matches between a pair of images. Inter-image feature matching system 5210 can detect feature matches between each pair of images of images 1 through 8. Inter-image feature matching system 5210 can generate a graph structure (not shown) that represents the set of 2D images. Each image is represented by a node of the graph structure. If a pair of images includes at least one feature match, then the graph structure will include an edge between the pair of nodes that represents the pair of images. Each edge within the graph structure can be associated with a weight that represents a degree to which there are features matches between the two images. Image set clustering system 5220 can perform a clustering operation on images 1 through 8. The clustering operation causes four clusters to be formed: cluster 5810, cluster 5820, cluster 5830, and cluster 5840. Image set scoring system 5230 can generate the 3D coverage metric based on the formation of clusters 5810, 5820, 5830, and 5840, as shown in FIG. 58. The larger the number of clusters, the lower the 3D coverage metric will be.

Figure 59:
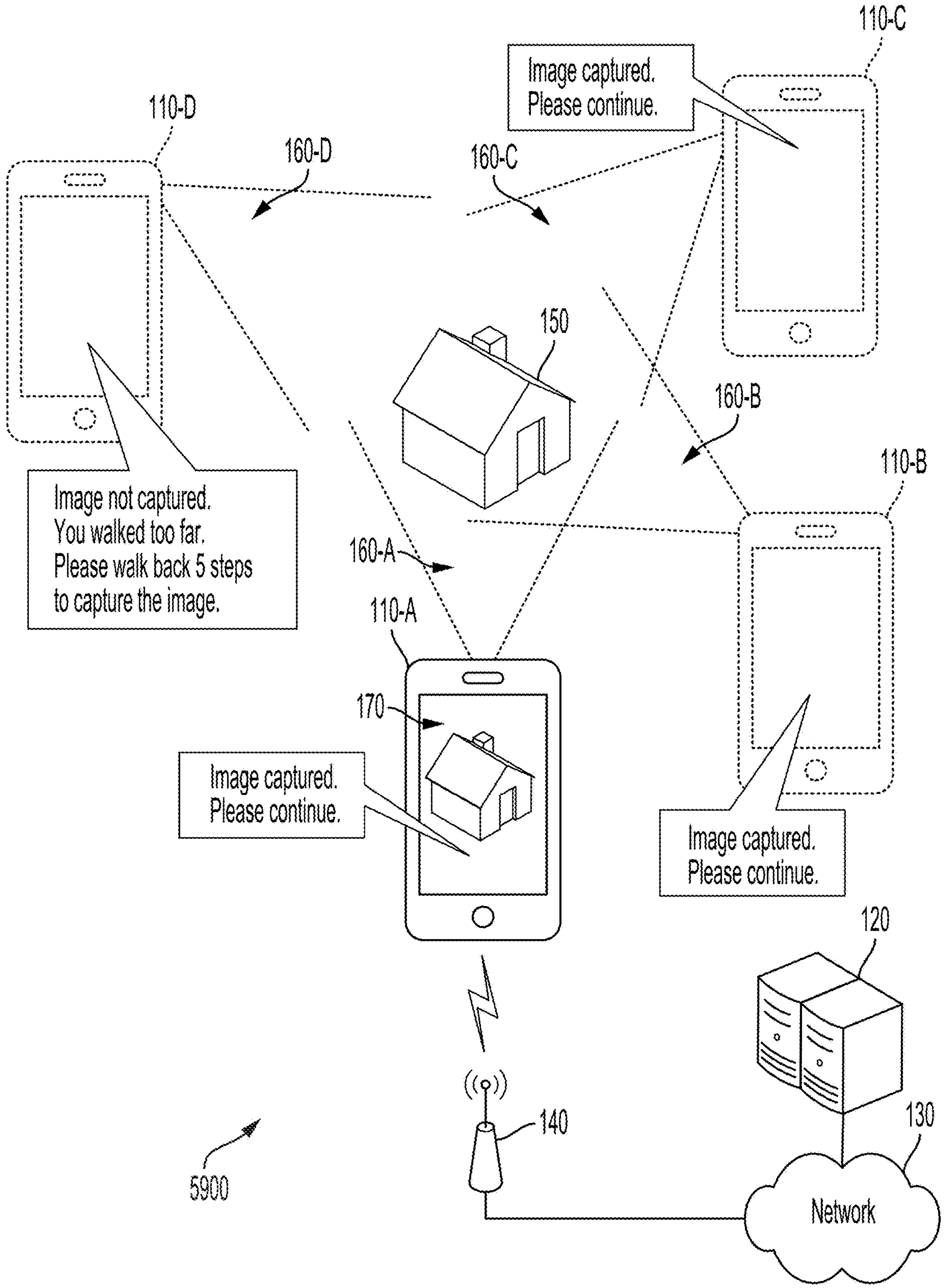
FIG. 59 illustrates an example of a user guidance system, according to certain aspects of the present disclosure.

FIG. 59 is a diagram illustrating an example of user guidance system 270 executing on user device 110 during an image capture session, in which the user is capturing one or more images to complete a set of images for reconstructing a 3D model in a 3D space. Network environment 5900 may be the same as or similar to network 100 illustrated in FIG. 1.

User guidance system 270 can be executed on user device 110 and can determine whether each image captured during the image capture session satisfies a 3D reconstruction condition with respect to a preceding image. As an illustrative example, a user can operate user device 110 by walking to position A (as indicated by 110-A) and capturing an image of house 150. The user may walk to position B (as indicated by 110-B) and capture another image of house 150. Upon capturing the image from position B, user guidance system 270 can execute feature detection and feature matching techniques to determine whether the image captured from position B satisfies a 3D reconstruction condition with respect to the image captured from position A. As illustrated in FIG. 59, user guidance system 270 determines that the image captured from position B satisfies the 3D reconstruction condition with respect to the image captured from position A, and accordingly, generates the feedback notification of "Image captured. Please continue." The user continues to walk to position C (as indicated by 110-C) and captures another image of house 150 from position C. User guidance system 270 determines that the image captured from position C satisfies the 3D reconstruction condition with respect to the image captured from position B, and accordingly, generates the feedback notification of "Image captured. Please continue." Again, the user continues to walk to position D (as indicated by 110-D) and captures another image of house 150 from position D. However, unlike with the images captured from positions B and C, user guidance system 270 determines that the image captured from position D does not satisfy the 3D reconstruction condition with respect to the image captured from position C. Accordingly, user guidance system 270 generates the feedback notification of "Image not captured. You walked too far. Please walk back 5 steps to capture the image." User guidance system 270 can identify a new location towards which the user can walk (e.g., as indicated by the feedback notification "Please walk back 5 steps") using triangulation techniques.

According to certain implementations, user guidance system 270 can automatically generate real-time feedback at the time of image capture while the image capture session is active. The real-time feedback can enable the user to maximize the feature correspondences between image pairs, such as successive images, captured during the image capture session. Maximizing the feature correspondences between images of each pair of images improves the image data provided to 3D model reconstruction system 280 and allows 3D model reconstruction system 280 to reconstruct a 3D model of house 150 using the improved image data included in the set of images.

Figure 60:
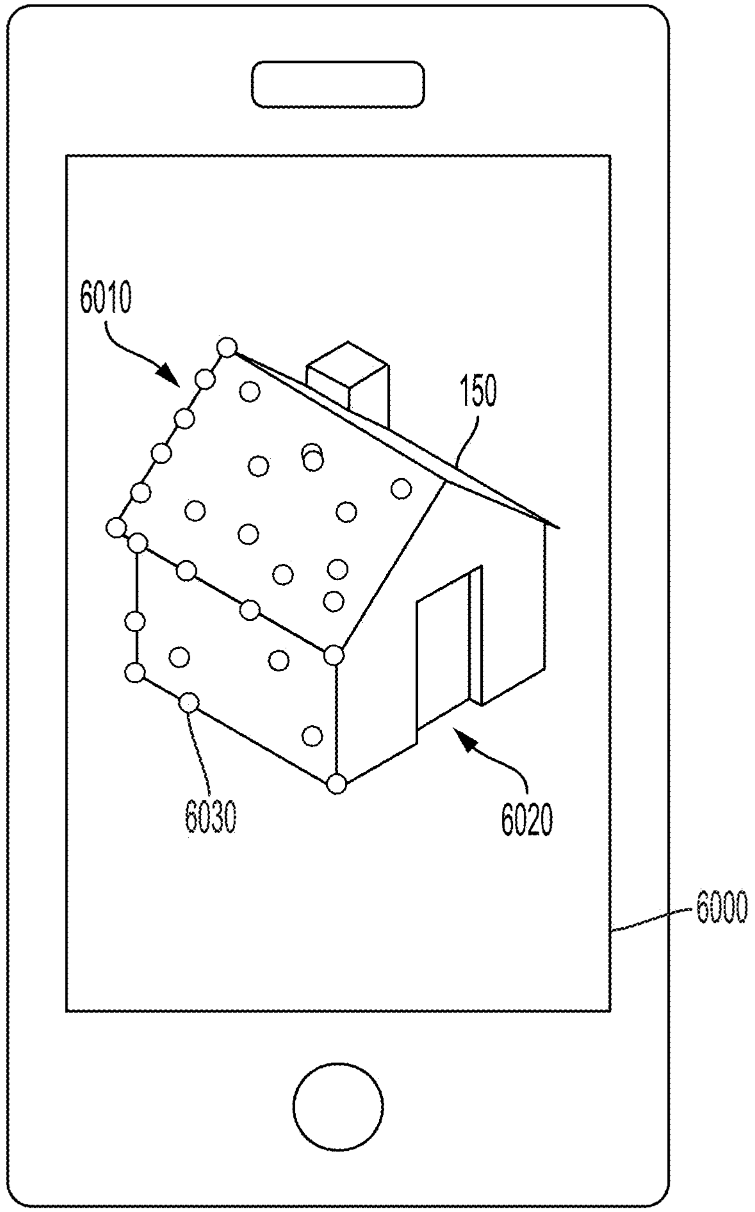
FIG. 60 illustrates another example of a user guidance system, according to certain aspects of the present disclosure.

FIG. 60 illustrates an example of an interface provided by a native application executing on user device 110. As an illustrative example, interface 6000 can display house 150 on the display of user device 110. House 150 may be a target physical structure that a user is capturing at a particular time during the image capture session. In some implementations, instead of generating a feedback notification indicating whether or not an image was successfully captured (as with the illustrative example described with respect to FIG. 59), interface 6000 can display matched features, such as matched feature 6030, to visually indicate to the user any uncovered areas of house 150. For example, interface 6000 can display house 150 as it was captured or is being captured by the user operating a camera of user device 110. Interface 6000 can detect feature matches between a captured image and a preceding image. The feature matches can be presented directly on the visualization of house 150 in interface 6000. Therefore, the displaying of the feature matches visually indicates that area 6010 of house 150 is a sufficiently covered area of house 150 due to the detected feature matches, whereas, area 6020 is an uncovered area of house 150 due to the lack of detected feature matches shown in area 6020 on interface 6000. By viewing interface 6000, the user may quickly understand that area 6020 is an uncovered area of house 150, and that the user needs to capture more images of area 6020 to maximize the feature correspondences associated with house 150. When the entirety of house 150 is covered in detected feature matches, then the image capture session has captured a sufficient amount of image data to allow 3D model reconstruction system 280 to generate a 3D model of house 150.

Figure 61:
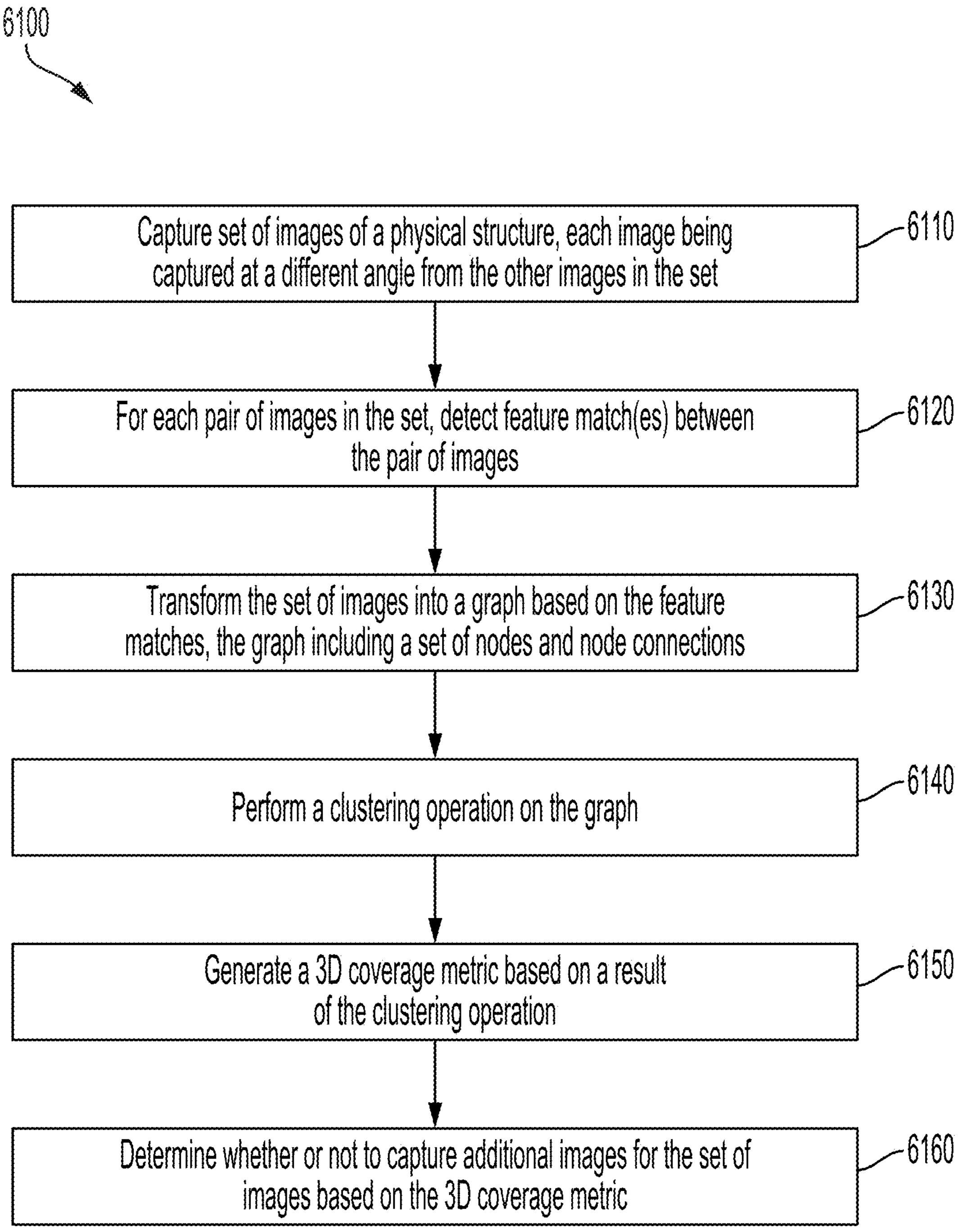
FIG. 61 is a flowchart illustrating an example of a process for generating a 3D coverage metric with respect to a set of images, according to certain aspects of the present disclosure.

FIG. 61 is a flowchart illustrating an example of a process for generating a 3D coverage metric, according to certain aspects of the present disclosure. Process 6100 can be performed by any components described herein, for example, any component described with respect to FIG. 1, 2, or 52. As an illustrative example, process 6100 is described as being performed entirely on user device 110, however, process 6100 can be performed entirely on server 120 instead. Further, process 6100 can be performed to generate a 3D coverage metric, which represents a degree to which a complete set of images of a physical structure is suitable for 3D model reconstruction. Suitability for 3D model reconstruction can be determined based on a degree to which pairs of images included in the complete set of images satisfy a 3D reconstruction condition (e.g., a threshold number of feature matches between the images of the successive pair, a threshold number of different planes or lines on which the feature matches are detected, and other suitable thresholds). Process 6100 can be performed on the complete set of images captured and stored after the image capture session has terminated.

Process 6100 begins at block 6110, where user device 110 can execute a native application to initiate an image capture session, which enables a user to capture a set of images of a physical structure (e.g., using a camera embedded within user device 110). The image capture session stores and evaluates each image after the image is captured. Each image captured during the image capture session can capture the physical structure from a different angle than other images in the set of images. As an illustrative example, a user may walk in a loop around a perimeter of the physical structure and periodically capture images during the image capture session. The set of images can include all of the images that the user captured as the user walked the loop around the perimeter of the physical structure.

At block 6120, the native application executing on user device 110 can detect features in each individual captured image, and then detect feature matches between each pair of images included in the set of images. For example, in one image, the native application can detect a corner point at which a rake line intersects with a fascia line of a roof of the physical structure. In the next-captured image, the native application can detect the same corner point, but at a different angle than the preceding image. The native application can execute a feature matching technique (e.g., a FLANN matcher) to associate the corner point in each image as representing the same 3D point.

At block 6130, the native application executing on user device 110 can transform the set of images into a graph structure based on the feature matches detected at block 6120. The graph structure can include a set of nodes, and each node can represent an image. Two nodes can be connected by a node connection (e.g., an edge) when the two images corresponding to the two nodes share at least one feature match between them. Further, each node connection can be assigned a weight, which is determined based on the number and quality (e.g., confidence) of feature matches between the two images.

At block 6140, the native application executing on user device 110 can perform a clustering operation on the graph structure. As an illustrative example, the clustering operation can include spectral clustering of the graph structure. The clustering operation causes one or more node connections between nodes of the graph structure to be pruned. The pruning of a node connection can be based on the weight assigned to the node connection. For example, if the weight is below a threshold value, then the node connection can be pruned or removed, while the two nodes remain. The clustering operation forms one or more clusters of nodes of the graph structure.

At block 6150, the native application executing on user device 110 can generate a 3D coverage metric based on number of clusters formed after performing the clustering operation. For example, the 3D coverage metric can be a value that is inversely proportional to the number of clusters formed after performing the clustering operation. Forming multiple clusters indicates that at least one image of the set of images does not share a sufficient number or quality of feature correspondences with another image of the set of images. Further, when multiple clusters are formed, the number or quality of feature correspondences between two images is not maximized, which reduces the image data reconstruction quality to 3D model reconstruction system 280, thereby hindering reconstruction of the 3D model. If the clustering operation results in the formation of one cluster of images, that one cluster is indicative of sufficient feature matches between pairs of images included in the set of images. Therefore, the 3D coverage metric indicates a high degree of suitability for 3D model reconstruction when the clustering operation forms a single cluster.

At block 6160, the native application executing on user device 110 can determine whether or not to capture additional images to add to the set of images based on the 3D coverage metric. As an illustrative example, if the 3D coverage metric is below a threshold value, then the native application can generate a feedback notification to the user instructing or prompting the user to capture one or more additional images to improve the number of feature correspondences between pairs of images of the set of images.

Figure 62:
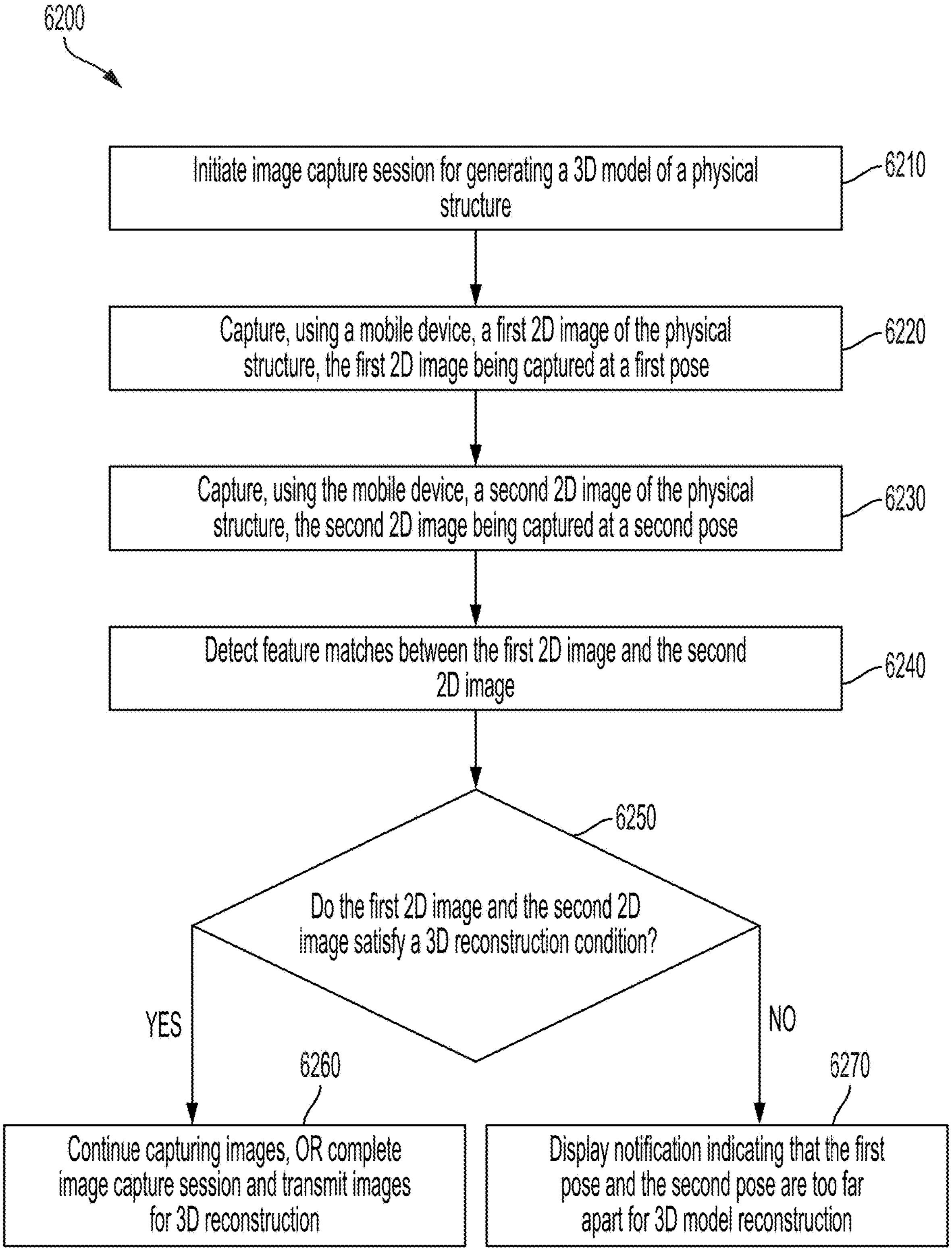
FIG. 62 is a flowchart illustrating an example of a process for guiding a user to capture images that maximize feature correspondences during an image capture session, according to certain aspects of the present disclosure.

FIG. 62 is a flowchart illustrating an example of a process for generating a feedback notifications that guide a user to capture images during an active image capture session. Process 6000 can be performed by any components described herein, for example, any component described with respect to FIG. 1, 2, or 52. As an illustrative example, process 6200 is described as being performed entirely on user device 110, however, process 6200 can be performed entirely on server 120 instead. Further, process 6200 can be performed to generate real-time guidance to a user while the user is capturing images during the image capture session. The guidance can enable the user to capture images that maximize the feature correspondences between the images. Process 6200 can be performed while the image capture session is active (e.g., before the image capture session terminates and the set of images is complete).

Process 6200 begins at block 6210, where user device 110 executes a native application to initiate an image capture session for generating a 3D model of a physical structure. The image capture session enables the user to capture images of the physical structure from various angles. The images captured during the image capture session can be saved locally on user device 110 and potentially can be individually uploaded to server 120.

At block 6220, the native application executing on user device 110 can capture a first 2D image of the physical structure from a first pose. A pose can represent a position and orientation of an object. In some implementations, the user can actively capture the first 2D image, for example, by pressing a trigger button on a camera or selecting a trigger button on a camera application operating on a mobile device. In other implementations, the native application can execute one or more image segmentation techniques to classify pixels within a viewfinder as a physical structure. Upon classifying certain pixels of the viewfinder as relating to a physical structure, the native application can then guide or ensure the proper framing of the physical structure and automatically capture the image (without the user needing to select or press any buttons). At block 6230, the native application executing on user device 110 can capture a second 2D image of the physical structure from a second pose. The second 2D image can be captured at a later time than the first 2D image. Using FIG. 1 as an example, at block 6220, the user captures an image from position A, and then walks to position B. At block 6230, while the user is located at position B, the user captures an image from position B.

At block 6240, the native application executing on user device 110 can detect feature matches between the first 2D image and the second 2D image using feature detection and feature matching techniques, as described above. At block 6250, the native application executing on user device 110 can determine whether the first 2D image and the second 2D image satisfy a 3D reconstruction condition. To illustrate and only as a non-limiting example, the 3D reconstruction condition can be a condition that the number of feature matches be at or above a threshold value. As another illustrative example, the 3D reconstruction condition can be a condition that the feature matches be detected on three or more different planes or lines to ensure planar diversity of feature matches, or captured from a different angular perspective.

If the first 2D image and the second 2D image do not satisfy the 3D reconstruction condition (e.g., "No" branch out of block 6250), then process 6200 proceeds to block 6270. At block 6270, the native application executing on user device 110 displays a notification indicating that the first pose and the second pose are too far apart for 3D reconstruction. Accordingly, the image capture session does not capture and store the second 2D image, and thus, the user has to find another location to recapture the second 2D image. In some implementations, the native application can detect a new location and guide the user to walk towards the new location to recapture the second 2D image. If the first 2D image and the second 2D image do satisfy the 3D construction condition (e.g., "Yes" branch out of block 6250), then process 6200 proceeds to block 6260. At block 6260, the native application causes the image capture session to capture and store the second 2D image and instructs the user to continue on to the next location to capture the next image of the physical structure. In some implementations, the second 2D image may be the last image in the complete set of image, and thus, the native application can terminate the image capture session and transmits the images to server 120 for reconstruction.

The technology as described herein may have also been described, at least in part, in terms of one or more embodiments, none of which is deemed exclusive to the other. Various configurations may omit, substitute, or add various procedures or components as appropriate. For instance, in alternative configurations, the methods may be performed in an order different from that described, or combined with other steps, or omitted altogether. This disclosure is further non-limiting and the examples and embodiments described herein does not limit the scope of the invention.

It is further understood that modifications and changes to the disclosures herein are suggested to persons skilled in the art, and are included within the scope of this description and the appended claims.

What is claimed is:

1. A method of generating metadata for a parameter for training images used to train a network to identify a particular object among a plurality of objects with a common classification, the method comprising:
providing an image of a representative object and a ground truth segmentation mask corresponding to the representative object in the image;
convolving a filter overlay with the ground truth segmentation mask to identify valid pixel locations for a center of at least one augmented crop image in the image, wherein a valid pixel location for the center is a location on the ground truth segmentation mask that corresponds to a center of the filter overlay when a majority of pixels in the filter overlay belong to the representative object; and
aggregating the valid pixel locations into a crop image center region.

2. The method of claim 1, wherein the filter overlay has a gaussian distribution from the center of the filter overlay.

3. The method of claim 1, wherein the filter overlay is entirely within the ground truth segmentation mask when the center of the filter overlay is at the valid pixel location.

4. The method of claim 1, wherein convolving the filter overlay with the ground truth segmentation mask further comprises validating a pixel location when the filter overlay is at the valid pixel location and the filter overlay includes less than all pixels belonging to the representative object.

5. The method of claim 1, further comprising providing a candidate crop size for the image of the representative object.

6. The method of claim 5, wherein providing the candidate crop size comprises providing the candidate crop size with dimensions in a proportion different from proportions of the image of the representative object.

7. The method of claim 5, further comprising providing the filter overlay according to dimensions of the candidate crop size.

8. The method of claim 5, further comprising generating the at least one augmented crop image based on the candidate crop size and a validated pixel location selected from the crop image center region.

9. The method of claim 8, further comprising training a machine-learning model using the at least one augmented crop image.

10. A system for generating metadata for a parameter for training images used to train a network to identify a particular object among a plurality of objects with a common classification, the system comprising:
one or more processors;
a non-transitory computer-readable medium comprising instructions that, when executed by the one or more processors, cause the one or more processors to perform operations comprising:
providing an image of a representative object and a ground truth segmentation mask corresponding to the representative object in the image;
convolving a filter overlay with the ground truth segmentation mask to identify valid pixel locations for a center of at least one augmented crop image in the image, wherein a valid pixel location for the center is a location on the ground truth segmentation mask that corresponds to a center of the filter overlay when a majority of pixels in the filter overlay belong to the representative object; and
aggregating the valid pixel locations into a crop image center region.

11. The system of claim 10, wherein the filter overlay has a gaussian distribution from the center of the filter overlay.

12. The system of claim 10, wherein the filter overlay is entirely within the ground truth segmentation mask when the center of the filter overlay is at the valid pixel location.

13. The system of claim 10, wherein convolving the filter overlay with the ground truth segmentation mask further comprises validating a pixel location when the filter overlay is at the valid pixel location and the filter overlay includes less than all pixels belonging to the representative object.

14. The system of claim 10, wherein the operations further comprise providing a candidate crop size for the image of the representative object.

15. The system of claim 14, wherein providing the candidate crop size comprises providing a candidate crop size with dimensions in a proportion different from proportions of the image of the representative object.

16. The system of claim 14, wherein the operations further comprise providing the filter overlay according to dimensions of the candidate crop size.

17. The system of claim 14, wherein the operations further comprise generating the at least one augmented crop image based on the candidate crop size and a validated pixel location selected from the crop image center region.

18. The system of claim 17, further comprising training a machine-learning model using the at least one augmented crop image.

19. One or more non-transitory computer-readable media storing instructions that, when executed by one or more processors, cause the one or more processors to perform operations comprising:
providing an image of a representative object and a ground truth segmentation mask corresponding to the representative object in the image;
convolving a filter overlay with the ground truth segmentation mask to identify valid pixel locations for a center of at least one augmented crop image in the image, wherein a valid pixel location for the center is a location on the ground truth segmentation mask that corresponds to a center of the filter overlay when a majority of pixels in the filter overlay belong to the representative object; and
aggregating the valid pixel locations into a crop image center region.

20. The one or more non-transitory computer-readable media of claim 19, wherein the operations further comprise:
providing a candidate crop size for the image of the representative object with dimensions in a proportion different from proportions of the image of the representative object;
providing the filter overlay according to the dimensions of the candidate crop size;
generating the at least one augmented crop image based on the candidate crop size and a validated pixel location selected from the crop image center region; and training a machine-learning model using the at least one augmented crop image.

* * * * *